(12) United States Patent
Miura

(10) Patent No.: US 9,615,276 B2
(45) Date of Patent: *Apr. 4, 2017

(54) RADIO TERMINAL, RADIO COMMUNICATION SYSTEM, AND RADIO BASE STATION

(71) Applicant: KYOCERA Corporation, Kyoto (JP)

(72) Inventor: Takanori Miura, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 367 days.

This patent is subject to a terminal disclaimer.

(21) Appl. No.: 14/262,587

(22) Filed: Apr. 25, 2014

(65) Prior Publication Data

US 2014/0233415 A1    Aug. 21, 2014

Related U.S. Application Data

(63) Continuation of application No. 13/260,125, filed as application No. PCT/JP2010/055430 on Mar. 26, 2010, now Pat. No. 8,743,722.

(30) Foreign Application Priority Data

Mar. 26, 2009 (JP) .................... 2009-077744
May 26, 2009 (JP) .................... 2009-127064
(Continued)

(51) Int. Cl.
H04W 72/02 (2009.01)
H04W 88/06 (2009.01)
(Continued)

(52) U.S. Cl.
CPC ......... *H04W 24/08* (2013.01); *H04J 11/0023* (2013.01); *H04L 27/2647* (2013.01);
(Continued)

(58) Field of Classification Search
None
See application file for complete search history.

(56) References Cited

U.S. PATENT DOCUMENTS 7,042,858 B1 * 5/2006 Ma ................ H04L 1/0618
370/208
7,313,116 B2  12/2007 Lee et al.
(Continued)

FOREIGN PATENT DOCUMENTS

EP      1811793 B1    6/2012
JP   2003-234789 A    8/2003
(Continued)

OTHER PUBLICATIONS

Office Action dated Sep. 16, 2014 issued for counterpart Japanese patent application No. 2013-255236.
(Continued)

*Primary Examiner* — Candal Elpenord
(74) *Attorney, Agent, or Firm* — Procopio Cory Hargreaves and Savitch LLP

(57) ABSTRACT

A radio terminal comprises a communication unit, a measurement unit, a measurement unit, and a control unit. The communication unit selects the CDMA or OFDM scheme as a communication scheme to be used in a cell formed by a radio base station and performs radio communication. The measurement unit measures the receiving quality relating to the time difference between the preceding and delayed wave of a received signal in the OFDM scheme and measures the receiving quality of a received signal in the CDMA scheme. When the OFDM scheme is used in an idle state, when the receiving quality relating to the time difference which is obtained by the measurement unit is deteriorated below a threshold value corresponding to a guard interval used in the OFDM scheme, the control unit causes the measurement
(Continued)

unit to measure the receiving quality of the received signal in the CDMA scheme.

4 Claims, 36 Drawing Sheets

(30) Foreign Application Priority Data

May 26, 2009 (JP) ................................ 2009-127068
Nov. 27, 2009 (JP) ................................ 2009-269471

(51) Int. Cl.
*H04W 24/08* (2009.01)
*H04J 11/00* (2006.01)
*H04L 27/26* (2006.01)
*H04W 72/08* (2009.01)

(52) U.S. Cl.
CPC ........... *H04W 72/02* (2013.01); *H04W 88/06* (2013.01); *H04B 2201/709709* (2013.01); *H04W 72/085* (2013.01)

(56) References Cited

U.S. PATENT DOCUMENTS

| | | | |
|---|---|---|---|
| 7,643,565 B2 | 1/2010 | Mukai | |
| 7,864,735 B2 | 1/2011 | Ma et al. | |
| 7,953,042 B2 | 5/2011 | Kwak et al. | |
| 7,961,590 B2 | 6/2011 | Gerlach | |
| 8,036,162 B2 | 10/2011 | Suzuki et al. | |
| 8,064,403 B2 | 11/2011 | Zhao et al. | |
| 8,364,148 B2 | 1/2013 | Dravida et al. | |
| 8,385,216 B1* | 2/2013 | Shetty | H04W 36/14 370/252 |
| 8,488,572 B2 | 7/2013 | Cheng et al. | |
| 8,615,276 B2 | 12/2013 | Tanaka et al. | |
| 9,001,791 B2* | 4/2015 | Lindoff | H04L 25/022 370/332 |
| 2004/0179469 A1 | 9/2004 | Attar et al. | |
| 2007/0230599 A1 | 10/2007 | Koga et al. | |
| 2009/0005029 A1 | 1/2009 | Wang et al. | |
| 2009/0042601 A1 | 2/2009 | Wang et al. | |
| 2009/0067386 A1 | 3/2009 | Kitazoe | |
| 2009/0207812 A1* | 8/2009 | Gupta | H04W 36/0094 370/332 |
| 2009/0279504 A1 | 11/2009 | Chin et al. | |
| 2009/0310562 A1* | 12/2009 | Medapalli | H04W 36/14 370/331 |
| 2010/0238903 A1* | 9/2010 | Kitazoe | H04W 36/0038 370/332 |

FOREIGN PATENT DOCUMENTS

| | | |
|---|---|---|
| JP | 2004-343559 A | 12/2004 |
| JP | 2005-136773 A | 5/2005 |
| JP | 2006-319900 A | 11/2006 |
| JP | 2009-500956 A | 1/2009 |
| WO | 2006/051587 A1 | 5/2006 |
| WO | 2007/125570 A1 | 11/2007 |
| WO | 2008/008449 A3 | 2/2008 |
| WO | 2008/157576 A1 | 12/2008 |
| WO | 2009/057782 A2 | 5/2009 |
| WO | 2009/069177 A1 | 6/2009 |
| WO | 2009/114421 A3 | 12/2009 |

OTHER PUBLICATIONS

Office Action dated Jun. 17, 2014 issued in counterpart Japanese application No. 2013-127109.
International Search Report and Written Opinion dated Jun. 29, 2010 issued by the Japanese Patent Office for International Application No. PCT/JP2010/055430.
Notification of Reasons for Refusal dated Apr. 9, 2013, issued in counterpart Japanese Application No. 2009-077744.
Japanese Office Action dated Aug. 20, 2013 issued for a Japanese counterpart application No. 2009-127064.
Japanese Office Action dated Aug. 20, 2013 issued for a Japanese counterpart application No. 2009-127068.
Japanese Office Action dated Sep. 24, 2013 issued for a Japanese counterpart application No. JP2009-269471.
Furudate et al., "Throughput performance of Adaptive Downlink Modulation Using OFDM and MC-CDMA for Future Mobile Communications System", IEICE Technical Report, vol. 103, pp. 107-112, RC2003-371.

* cited by examiner (a)            (b)

FIG. 3
(a)
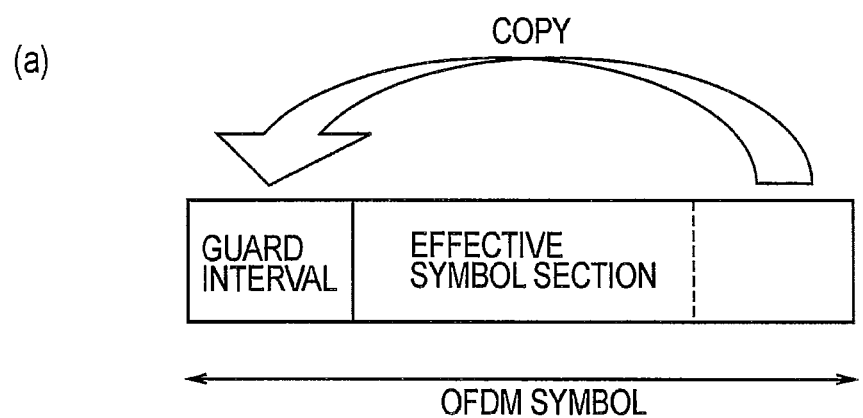
(b)
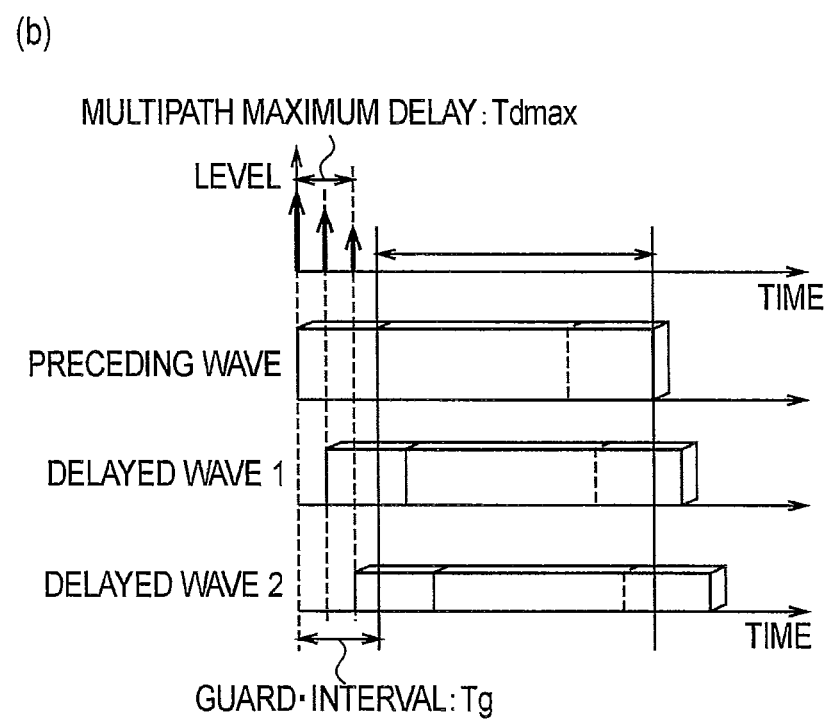

(a)

(b)

| MODULATION MODE | UNIT | ERROR LEVEL |
|---|---|---|
| QPSK | % | 17.5 |
| 16QAM | % | 12.5 |
| 64QAM | % | TBD |

(c)
$$EVM = \sqrt{\frac{\sum_{k=1}^{M} |Z(k) - R(k)|^2}{\sum_{k=1}^{M} |R(k)|^2}}$$

Z(k): DEMODULATION SIGNAL
 (COMPLEX NUMBER INCLUDING I,Q COMPONENTS)
R(k): KNOWN IDEAL SIGNAL
 (COMPLEX NUMBER INCLUDING I,Q COMPONENTS)
M: OFDM SUB-CARRIER NUMBER

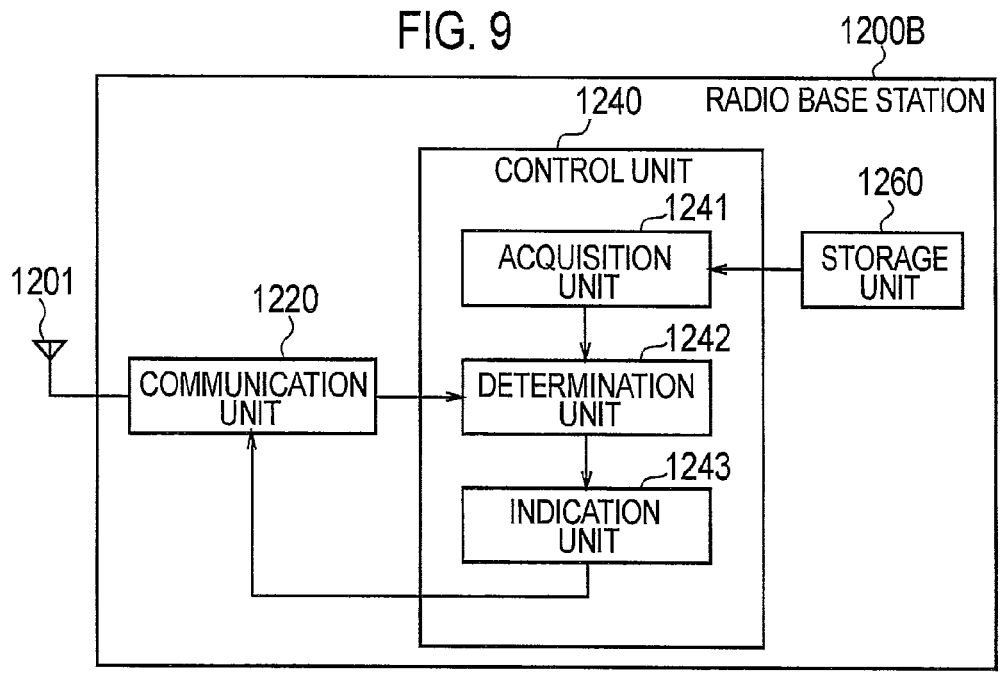
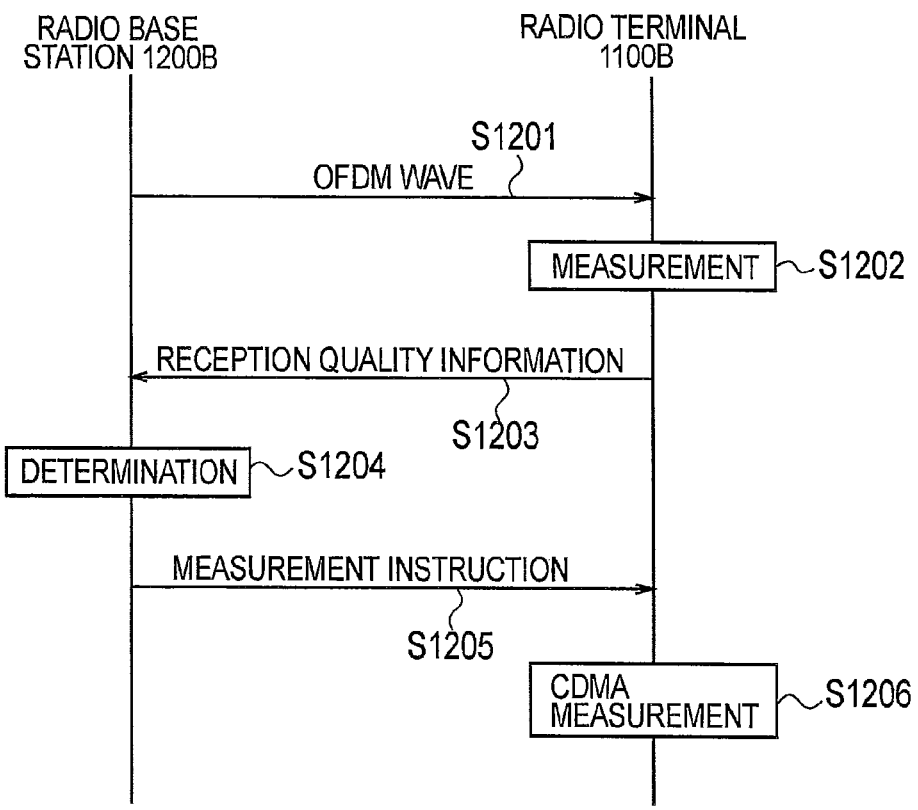

FIG. 12
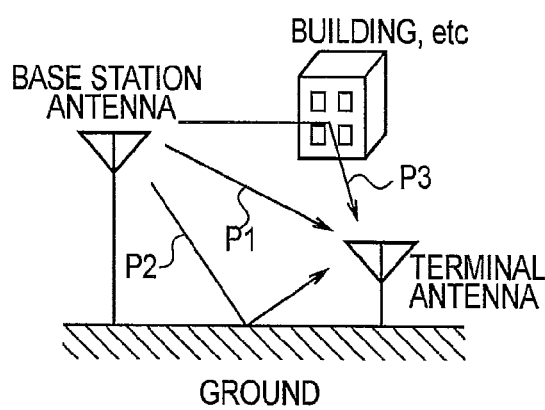
(a)
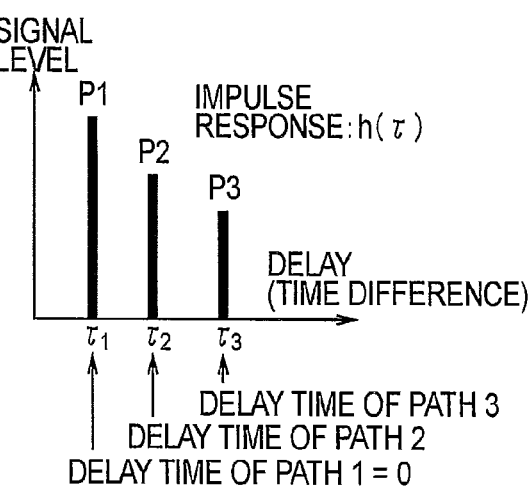
(b)

FIG. 13
(a)
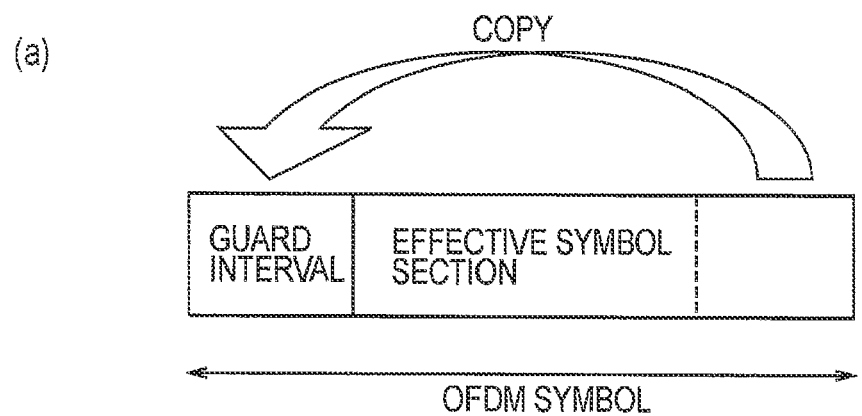
(b)
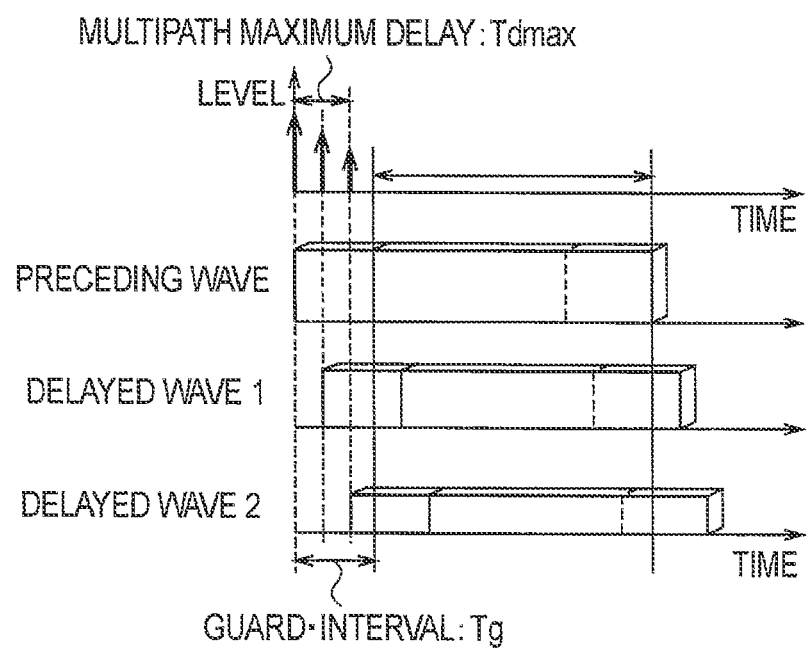

(a)

(b)

| MODULATION MODE | UNIT | ERROR LEVEL |
|---|---|---|
| QPSK | % | 17.5 |
| 16QAM | % | 12.5 |
| 64QAM | % | TBD |

(c)
$$EVM = \sqrt{\frac{\sum_{k=1}^{M} |Z(k) - R(k)|^2}{\sum_{k=1}^{M} |R(k)|^2}}$$

Z(k): DEMODULATION SIGNAL
   (COMPLEX NUMBER INCLUDING I,Q COMPONENTS)
R(k): KNOWN IDEAL SIGNAL
   (COMPLEX NUMBER INCLUDING I,Q COMPONENTS)
M: OFDM SUB-CARRIER NUMBER

FIG. 21
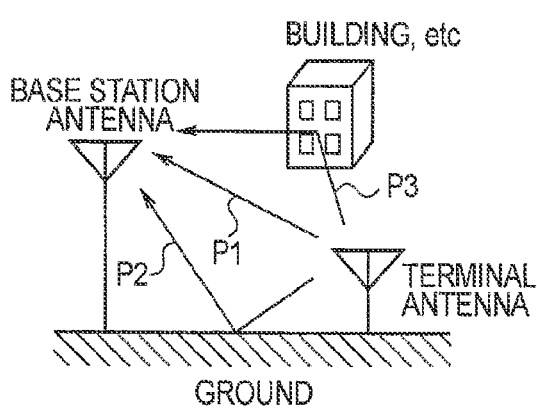
(a)
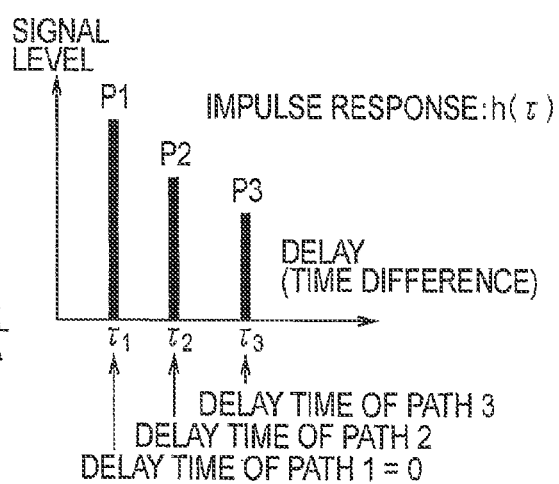
(b)

FIG. 22
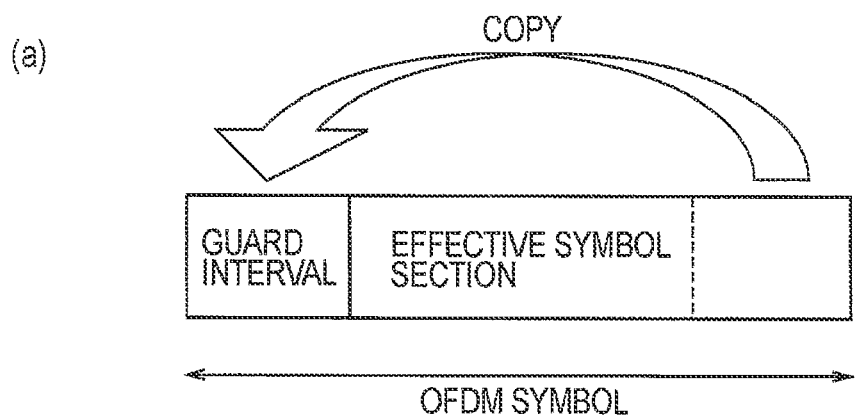
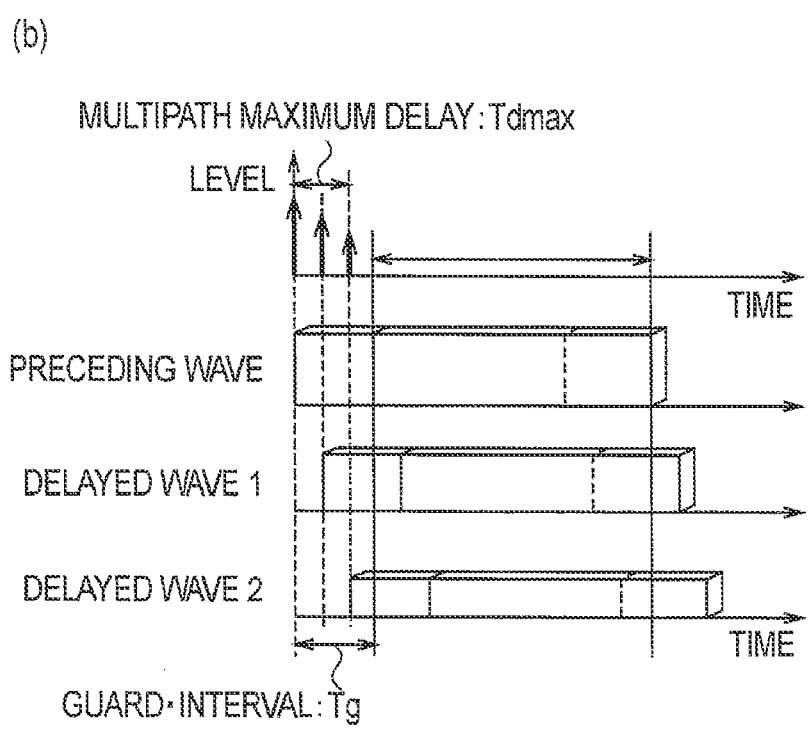

(a)

(b)

| MODULATION MODE | UNIT | ERROR LEVEL |
|---|---|---|
| QPSK | % | 17.5 |
| 16QAM | % | 12.5 |
| 64QAM | % | TBD |

(c)
$$EVM = \sqrt{\frac{\sum_{k=1}^{M} |Z(k) - R(k)|^2}{\sum_{k=1}^{M} |R(k)|^2}}$$

Z(k): DEMODULATION SIGNAL
 (COMPLEX NUMBER INCLUDING I,Q COMPONENTS)
R(k): KNOWN IDEAL SIGNAL
 (COMPLEX NUMBER INCLUDING I,Q COMPONENTS)
M: SUB-CARRIER NUMBER

FIG. 31
(a)
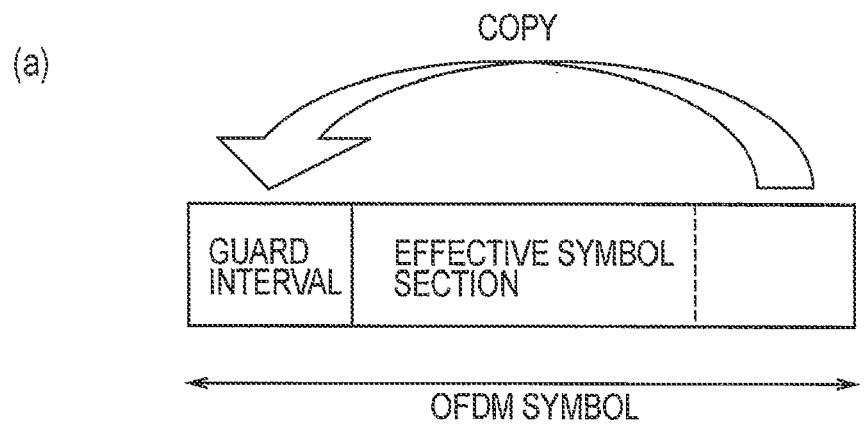
(b)
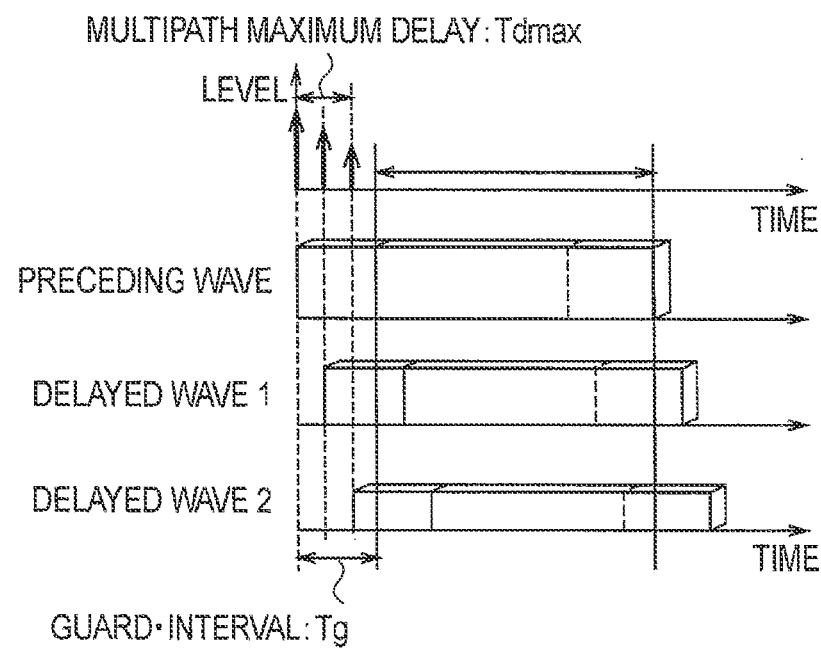

RADIO TERMINAL, RADIO COMMUNICATION SYSTEM, AND RADIO BASE STATION

CROSS REFERENCE TO RELATED APPLICATIONS

This is a continuation application of U.S. application Ser. No. 13/260,125 which is the U.S. National Stage application of PCT application PCT/JP2010/055430 filed on Mar. 26, 2010, which claims priority under 35 U.S.C. §119 to Japanese Patent Application No. 2009-077744 filed on Mar. 26, 2009, Japanese Patent Application No. 2009-127064 filed on May 26, 2009, Japanese Patent Application No. 2009-127068 filed on May 26, 2009, and Japanese Patent Application No. 2009-269471 filed on Nov. 27, 2009. The contents of each of these applications are incorporated herein by reference in their entirety.

TECHNICAL FIELD

The present invention relates to a radio terminal, a radio communication system, and a radio base station which employ a CDMA scheme or an OFDM scheme.

BACKGROUND ART

Currently, 3G (or 3.5G) cellular phone systems employing a CDMA (Code Division Multiple Access) scheme are widely used.

In recent years, an OFDM (Orthogonal Frequency Division Multiplexing) scheme to transmit data in parallel by using multiple subcarriers orthogonal to each other has drawn attention as a new communication scheme. The OFDM scheme is able to exert higher communication performances than the CDMA scheme, and is therefore used for 4G (or 3.9G) cellular phone systems and the like.

Since installation of radio base stations supporting a new communication scheme in a radio communication system such as a cellular phone system gradually advances, it is expected that radio terminals supporting both of the CDMA scheme and the OFDM scheme will be widely used in a transitional period from the third generation to the fourth generation.

Conventionally, a radio terminal supporting two communication schemes (so-called a dual terminal) switches a communication scheme used for radio communication with a radio base station (hereinafter referred to as a used communication scheme) by using the following method. For example, the dual terminal compares reception powers measured for the respective communication schemes and switches the used communication scheme from the communication scheme with lower reception power to the communication scheme with higher reception power (see Patent Document 1).

PRIOR ART DOCUMENT

Patent Document

Patent Document 1: Japanese Patent Application Publication No. 2009-500956

SUMMARY OF INVENTION

A receiver side in the radio communication system receives a composite wave including multiple radio waves (multipath waves) taking different paths from a sender side. For this reason, in the OFDM scheme, the sender side adds a guard interval for absorbing a time difference between a preceding wave and a delayed wave to each OFDM symbol.

However, if a delayed wave delays for longer than a time length of the guard interval, OFDM symbols successive in time sequence in a reception signal of a receiver side causes an interference (so-called an intersymbol interference) and a communication performance is thereby degraded.

Here, the conventional dual terminal simply selects the communication scheme with higher reception power. Accordingly, if the reception power in the OFDM scheme is higher than that in the CDMA scheme, the OFDM scheme is used. However, there is a problem that if the intersymbol interference occurs in the OFDM scheme, the OFDM scheme fails to exert the intrinsic communication performance and only exerts a lower communication performance than the CDMA scheme. In addition, in light of the intersymbol interference, there is a problem that even though the dual terminal establishes connection by switching to a CDMA radio base station due to the intersymbol interference, the dual terminal is affected by the intersymbol interference again if switching to the OFDM scheme in the same location as the switching location.

Accordingly, it is an objective of the present invention to provide a radio terminal, a radio communication system, and a radio base station, which are capable of preventing deterioration in a communication performance due to an intersymbol interference.

The feature of a radio terminal according to the present invention is summarized as a radio terminal comprising: a communication unit (communication unit 1120) configured to perform radio communication by selecting any of a CDMA scheme and an OFDM scheme as a used communication scheme to be used in a cell formed by a radio base station; a first measurement unit (measurement unit 1140A) configured to measure reception quality related to a time difference (Tdmax) between a preceding wave and a delayed wave of a reception signal of the OFDM scheme; a second measurement unit (measurement unit 1140B) configured to measure reception quality of a reception signal of the CDMA scheme; and a control unit (control unit 1160A) configured to cause the second measurement unit to measure the reception quality of the reception signal of the CDMA scheme when the OFDM scheme is selected as the used communication scheme in an idle state and when the reception quality related to the time difference obtained by the first measurement unit is lowered to less than a threshold corresponding to a guard interval (Tg) used in the OFDM scheme.

According to the above-described feature, the control unit causes the second measurement unit to measure the reception quality of the reception signal of the CDMA scheme when the reception quality related to the time difference between the preceding wave and the delayed wave deteriorates below the threshold. Therefore, it is possible to prepare for switching to the CDMA scheme in a situation where an intersymbol interference is deemed to occur. In the meantime, since the OFDM scheme is used until the reception quality related to the time difference between the preceding wave and the delayed wave deteriorates below the threshold, it is possible to establish a state where the communication performance of the OFDM scheme can be exerted. Accordingly, there is provided the radio terminal which can prevent deterioration in the communication performance due to an intersymbol interference while utilizing the OFDM scheme when the radio terminal supports both of the CDMA scheme and the OFDM scheme.

The feature of a radio communication system according to the present invention is summarized as a radio communication system (radio communication system 2010) comprising: a first radio base station (radio base station 2200) supporting an OFDM scheme; a second radio base station (radio base station 2300) supporting a CDMA scheme; and a radio terminal (radio terminal 2100) supporting both of the OFDM scheme and the CDMA scheme and connected to the first radio base station, wherein the radio terminal comprises: a terminal reception unit (reception unit 2124) configured to receive signals of the CDMA scheme and the OFDM scheme; a first measurement unit (OFDM measurement unit 2141) configured to measure a reception parameter indicative of a time difference between a preceding wave and a delayed wave of a reception signal of the OFDM scheme; a second measurement unit (measurement unit 2142) configured to measure CDMA reception quality being reception quality of a reception signal of the CDMA scheme; and a terminal transmission unit (transmission unit 2122) configured to transmit, to the first radio base station, the reception parameter measured by the first measurement unit and the CDMA reception quality measured by the second measurement unit, the first radio base station comprises: a base-station reception unit (reception unit 2224) configured to receive the reception parameter and the CDMA reception quality from the radio terminal; and a base-station transmission unit (transmission unit 2222) configured to transmit, to the radio terminal, an instruction for a handover to the second radio base station when a value corresponding to the reception parameter received by the base-station reception unit exceeds a threshold determined based on the guard interval used in the OFDM scheme and when the CDMA reception quality received by the base-station reception unit is favorable.

According to the above-described feature, it is possible to prevent deterioration in the communication performance due to an intersymbol interference while utilizing the OFDM scheme when using the radio terminal supporting both of the CDMA scheme and the OFDM scheme.

The feature of a radio base station according to the present invention is summarized as a radio base station (radio base station 2200) to which a radio terminal (radio terminal 2100) supporting both of a CDMA scheme and an OFDM scheme is connected, the radio base station supporting the OFDM scheme, comprising: a base-station reception unit (reception unit 2224) configured to receive, from the radio terminal, a reception parameter indicative of a time difference between a preceding wave and a delayed wave of a reception signal of the OFDM scheme and CDMA reception quality being reception quality of a reception signal of the CDMA scheme; and a base-station transmission unit (transmission unit 2222) configured to transmit, to the radio terminal, an instruction for a handover to a radio base station supporting the CDMA scheme when a value corresponding to the reception parameter received by the base-station reception unit exceeds a threshold determined based on a guard interval used in the OFDM scheme and when the CDMA reception quality received by the base-station reception unit is favorable.

The feature of a radio terminal according to the present invention is summarized as a radio terminal (radio terminal 2100) supporting both of a CDMA scheme and an OFDM scheme and connected to a radio base station (radio base station 2200) supporting the OFDM scheme, comprising: a terminal reception unit (reception unit 2124) configured to receive signals of the CDMA scheme and the OFDM scheme; a first measurement unit (OFDM measurement unit 2141) configured to measure a reception parameter indicative of a time difference between a preceding wave and a delayed wave of a reception signal of the OFDM scheme; a second measurement unit (CDMA measurement unit 2142) configured to measure CDMA reception quality being reception quality of a reception signal of the CDMA scheme; and a terminal transmission unit (transmission unit 2122) configured to transmit, to the radio base station, the reception parameter measured by the first measurement unit and the CDMA reception quality measured by the second measurement unit.

The feature of a radio base station according to the present invention is summarized as a radio base station (radio base station 3200) to which a radio terminal (radio terminal 3100) is connected, the radio terminal supporting a predetermined communication scheme (next-generation communication scheme) that is any of an OFDM scheme and a SC-FDMA scheme and also supporting a CDMA scheme, the radio base station supporting the predetermined communication scheme, comprising: a reception unit (reception unit 3224) configured to receive a signal of the predetermined communication scheme from the radio terminal; a measurement unit (measurement unit 3250) configured to measure a reception parameter indicative of a time difference between a preceding wave and a delayed wave of the signal received by the reception unit, and a transmission unit (transmission unit 3222) configured to transmit, to the radio terminal, an instruction for a handover to a radio base station supporting the CDMA scheme when the reception parameter measured by the measurement unit exceeds a threshold determined based on a guard interval used in the predetermined communication scheme.

According to the above-described feature, it is possible to prevent deterioration in the communication performance due to an intersymbol interference, in the case of using the radio terminal supporting the CDMA scheme and the given communication scheme (the next-generation communication scheme) serving as either of the OFDM scheme and the SC-FDMA scheme.

A radio terminal according to the present invention is a radio terminal capable of communicating with an OFDM radio base station supporting an OFDM scheme and communicating with a CDMA radio base station supporting a CDMA scheme, comprising: a control unit configured to control the radio terminal in a way that, when the control unit determines that the radio terminal is moved after connection to the OFDM radio base station having an intersymbol interference is switched to connection to the CDMA radio base station, the radio terminal switches to connection to the OFDM radio base station.

BRIEF DESCRIPTION OF DRAWINGS

FIG. 3 is a view for explaining a guard interval in the OFDM scheme.

FIG. 9 is a block diagram showing a configuration of a radio base station according to the second embodiment.

FIG. 10 is a sequence chart showing operations of the radio terminal and the radio base station according to the second embodiment.

FIG. 12 is a view for explaining an OFDM signal to be received by a radio terminal according to the third embodiment.

FIG. 13 is a view for explaining a guard interval in the OFDM scheme.

FIG. 21 is a view for explaining a SC-FDMA signal to be received by a radio base station according to the fourth embodiment.

FIG. 22 is a view for explaining a guard interval.

FIG. 31 is a view for explaining a guard interval in the OFDM scheme.

DESCRIPTION OF EMBODIMENTS

First to fifth embodiments and other embodiments of the present invention will be described with reference to the accompanying drawings. In the following description of the drawings, same or similar reference signs denote same or similar elements and portions.

First Embodiment

In a first embodiment, (1) Outline of Radio Communication System, (2) Configuration of Radio Terminal, (3) Detailed Operations of Radio Terminal, and (4) Operation and Effect will be described.

(1) Outline of Radio Communication System

Figure 1:
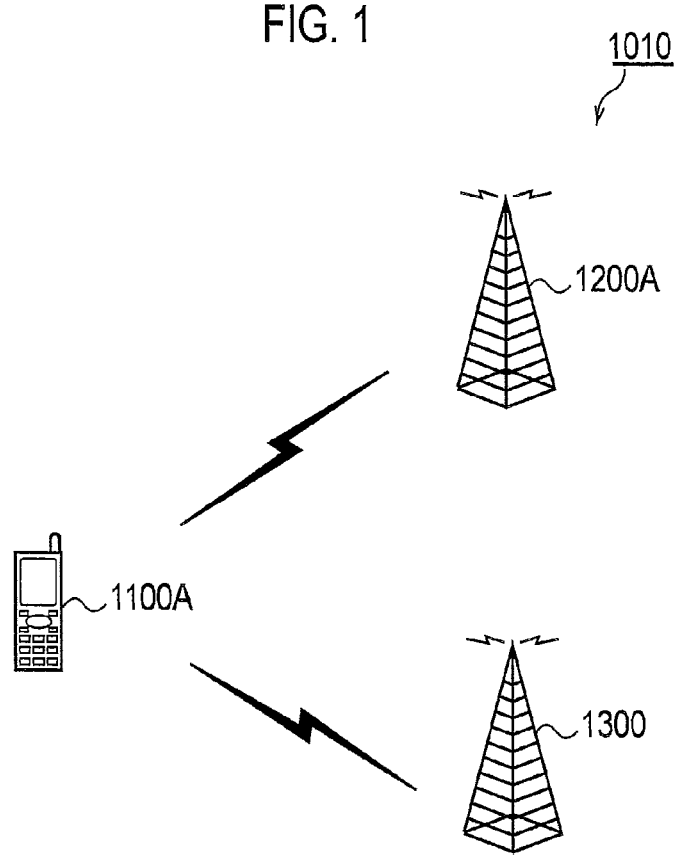
FIG. 1 is an overall schematic diagram showing a radio communication system according to a first embodiment.

FIG. 1 is an overall schematic diagram showing a radio communication system 1010 according to a first embodiment. As shown in FIG. 1, the radio communication system 1010 includes a radio terminal 1100A, a radio base station 1200A, and a radio base station 1300.

The radio terminal 1100A supports both of a CDMA scheme and an OFDM scheme. In FIG. 1, a cellular phone terminal is indicated as an example of the radio terminal 1100A. However, the radio terminal 1100A is not limited only to the cellular phone terminal but may be a terminal equipped with communication devices according to the CDMA scheme and the OFDM scheme, for example. The radio base station 1200A supports the OFDM scheme. Note that an OFDMA (Orthogonal Frequency Division Multiplexing Access) scheme is assumed to be included in the OFDM scheme in this embodiment. Meanwhile, the radio base station 1300 supports the CDMA scheme such as a cdma 2000 scheme or a W-CDMA scheme. Each of the radio base stations 1200A and 1300 forms a cell which is a communication area.

The radio communication system 1010 has a structure which is based on the LTE (Long Term Evolution) standardized by 3GPP (3rd Generation Partnership Project), for example. In the LTE, the OFDM scheme is used for downlink communication while the SC-FDMA (Single-Carrier Frequency-Division Multiple Access) is used for uplink communication. In the following, the downlink communication will be mainly described.

The OFDM scheme is the scheme configured to distribute data to multiple subcarriers that are orthogonal to one another and then to modulate the subcarriers. A sender side generates an OFDM signal by subjecting the subcarriers to multi-phase PSK modulation or multi-value QAM modulation and then subjecting the subcarriers to inverse fast Fourier transform (IFFT). A receiver side performs demodulation by subjecting the OFDM signal to fast Fourier transform (FFT).

Figure 2:
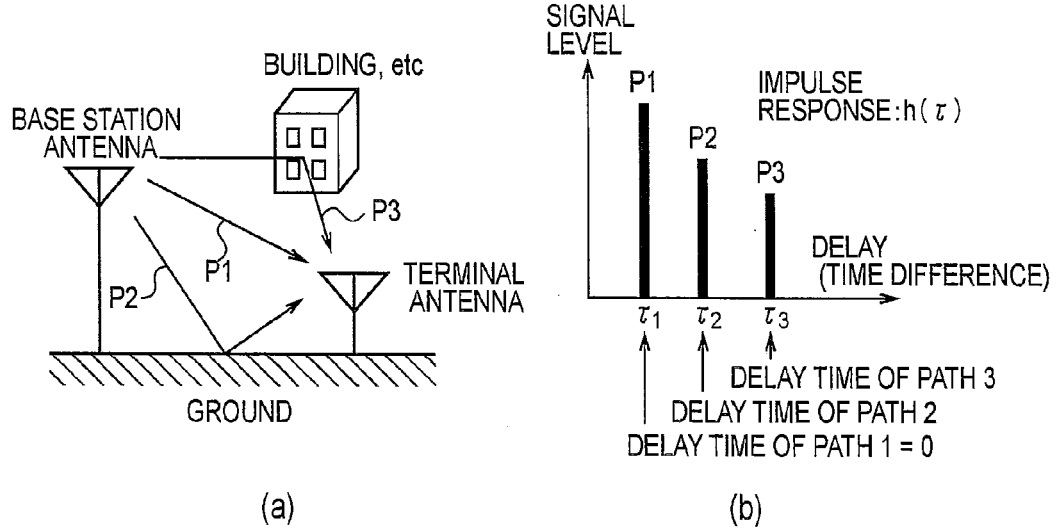
FIG. 2 is a view for explaining a state of a composite wave to be received by a radio terminal according to the first embodiment.

When the radio terminal 1100A and the radio base station 1200A perform radio communication in an environment unable to see each other directly, for example, an antenna of the radio terminal 1100A receives multiple radio waves (multipath waves) taking different paths as shown in FIG. 2(a). In the example of FIG. 2(a), a path P1 directly reaching the antenna of the radio terminal 1100A and paths P2 and P3 reaching the antenna of the radio terminal 1100A after reflection by a building or the ground are formed between an antenna of the radio base station 1200A and the antenna of the radio terminal 1100A.

The radio wave received by the antenna of the radio terminal 1100A through the path P1 is a preceding wave (a direct wave). The radio waves received by the antenna of the radio terminal 1100A through the paths P2 and the P3 are delayed waves which are delayed from the preceding wave.

As shown in FIG. 2(b), the radio waves on the paths have mutually different delay time. In the example shown in FIG. 2(b), the antenna of the radio terminal 1100A receives the radio wave (the direct wave) on the path P1 at delay time T1, receives the radio wave (the reflected wave) on the path P2 at delay time T2, and receives the radio wave (the reflected wave) on the path P3 at delay time T3. The antenna of the radio terminal 1100A receives these waves collectively as a composite wave.

In the OFDM scheme, the sender side adds a redundant signal section called a guard interval to each symbol in order to absorb a delay time difference attributable to the above-described multiple paths.

FIG. 3(a) is a view showing a symbol structure in the OFDM scheme. As shown in FIG. 3(a), a symbol in the OFDM scheme (hereinafter an OFDM symbol) includes an effective symbol section in a finite time generated by IFFT and the guard interval obtained by copying part of the effective symbol section.

By using the guard interval, if a time difference Tdmax (hereinafter referred to as a "delay time difference") between time of reception of the preceding wave and time of reception of the latest delayed wave falls within a time length of the guard interval (hereinafter referred to as a "guard interval length") Tg as shown in FIG. 3(b), the FFT functions normally on the receiver side whereby it is possible to avoid occurrence of an intersymbol interference.

On the other hand, if there arises a delayed wave exceeding the guard interval length Tg, an intersymbol interference occurs and the FFT does not function normally on the receiver side. Hence a large strain is generated and a communication performance is deteriorated.

Accordingly, when it is estimated that there arises the intersymbol interference, the radio terminal 1100A according to the first embodiment switches the used communication scheme from the OFDM scheme to the CDMA scheme.

(2) Configuration of Radio Terminal

Next, a configuration of the radio terminal 1100A will be described in the order of (2. 1) Schematic Configuration, (2. 2) Configuration of Communication Unit, and (2. 3) Configuration of Control Unit.

(2. 1) Schematic Configuration

Figure 4:
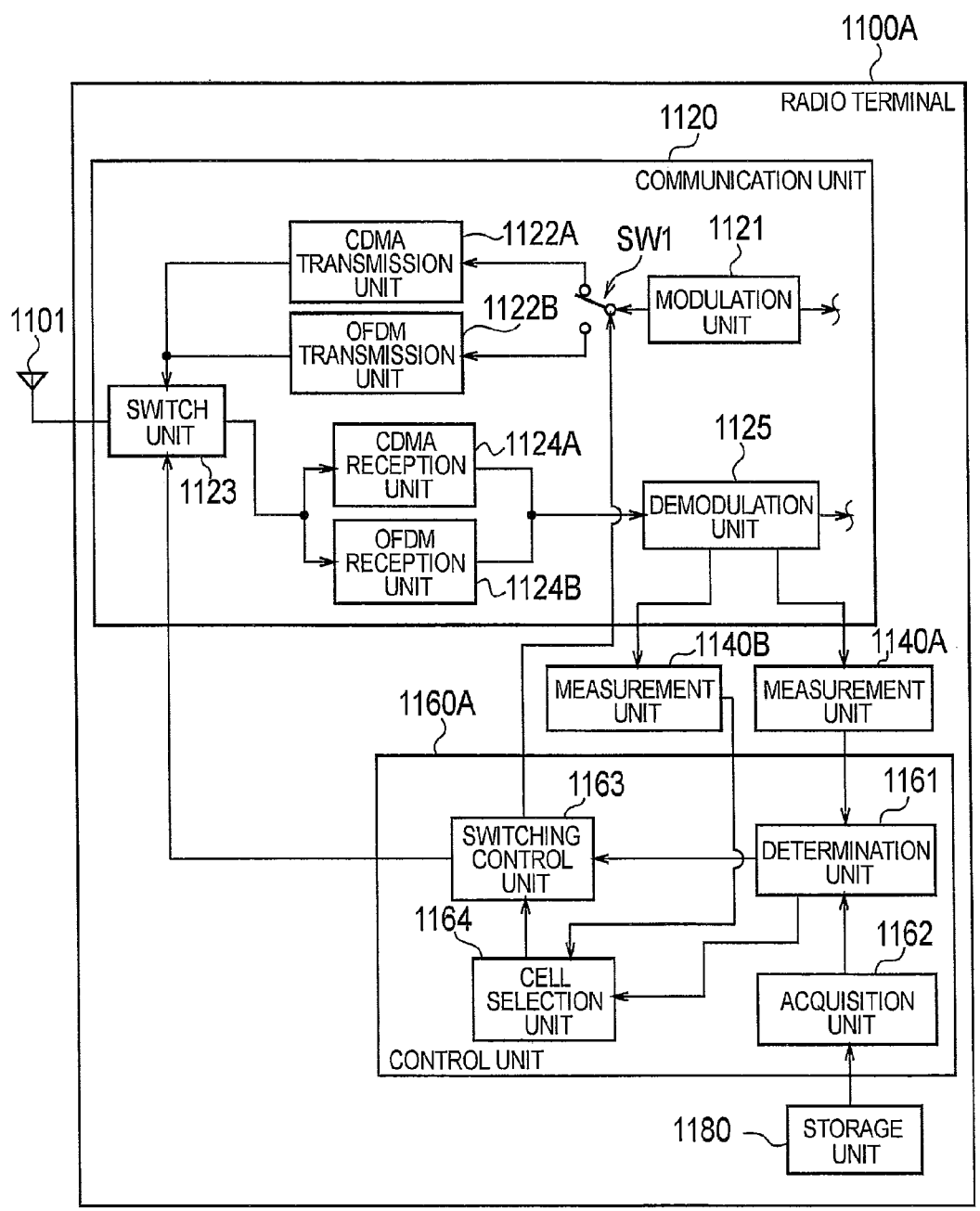
FIG. 4 is a block diagram showing a configuration of the radio terminal according to the first embodiment.

FIG. 4 is a block diagram showing a configuration of the radio terminal 1100A. As shown in FIG. 4, the radio terminal 1100A includes an antenna 1101, a communication unit 1120, measurement units 1140, a control unit 1160A, and a storage unit 1180. Here, the number of antennas 1101 is not limited only to one but may be plural.

The communication unit 1120 performs radio communication with the radio base station 1200A or the radio base station 1300 through the antenna 1101. The communication unit 1120 performs the radio communication with the radio base station 1200A by using any of the CDMA scheme or the OFDM scheme.

The measurement unit 1140A measures reception quality of the composite wave including the preceding wave and the delayed waves received by the communication unit 1120.

The measurement unit 1140A measures a value (EVM (Error Vector Magnitude)) indicative of a difference between the OFDM symbol (namely, an effective symbol section) included in the composite wave received by the communication unit 1120 and a reference point of the OFDM symbol as the reception quality. Details of the EVM will be described later.

Meanwhile, the measurement unit 1140A measures a state of a voltage waveform of the composite wave received by the communication unit 1120 at a timing corresponding to each of the guard intervals.

The measurement unit 1140B measures reception quality of a radio signal corresponding to the CDMA scheme, which is received by the communication unit 1120.

The control unit 1160A is formed by use of a CPU, for example, and is configured to control various functions incorporated in the radio terminal 1100A. The control unit 1160A controls the communication unit 1120 so as to switch the used communication scheme between the OFDM scheme and the CDMA scheme.

The storage unit 1180 is formed by use of a memory, for example, and is configured to store a variety of information used for the control by the control unit 1160A.

(2. 2) Configuration of Communication Unit

Next, a configuration of the communication unit 1120 will be described. The communication unit 1120 includes a modulation unit 1121, a switch SW1, a CDMA transmission unit 1122A, an OFDM transmission unit 1122B, a switch unit 1123, a CDMA reception unit 1124A, an OFDM reception unit 1124B, and a demodulation unit 1125.

The modulation unit 1121 modulates and encodes transmission data to the radio base station 1200A. The modulation unit 1121 has a configuration suitable for adaptive modulation. In the adaptive modulation, multiple modulation schemes are predetermined based on a combination of a modulation multi-value number and an encoding ratio. The modulation schemes are also called modulation classes or MCS levels. The modulation unit 1121 modulates and encodes the transmission data in accordance with a certain modulation scheme selected from the multiple modulation schemes.

The switch SW1 inputs the transmission data outputted from the modulation unit 1121 to any of the CDMA transmission unit 1122A or the OFDM transmission unit 1122B in accordance with the control by the control unit 1160A. The switch SW1 inputs the transmission data to the CDMA transmission unit 1122A when the used transmission scheme is the CDMA scheme, or inputs the transmission data to the OFDM transmission unit 1122B when the used transmission scheme is the OFDM scheme.

The CDMA transmission unit 1122A subjects the inputted transmission data to spread spectrum in accordance with the CDMA scheme and to conversion into a radio frequency band as well as to amplification processing, thereby generating a CDMA signal at the radio frequency band (hereinafter a CDMA wave). The generated CDMA wave is transmitted to the radio base station 1200A via the switch unit 1123 and the antenna 1101.

The OFDM transmission unit 1122B subjects the inputted transmission data to multi-carrier modulation in accordance with the OFDM scheme and to conversion into a radio frequency band as well as to amplification processing, thereby generating an OFDM signal at the radio frequency band (hereinafter an OFDM wave). The generated OFDM wave is transmitted to the radio base station 1200A via the switch unit 1123 and the antenna 1101.

In accordance with the control by the control unit 1160A, the switch unit 1123 inputs the CDMA wave generated by the CDMA transmission unit 1122A or the OFDM wave generated by the OFDM transmission unit 1122B to the antenna 1101. The switch unit 1123 inputs the CDMA wave to the antenna 1101 when the used transmission scheme is the CDMA scheme, or inputs the OFDM wave to the antenna 1101 when the used transmission scheme is the OFDM scheme.

On the other hand, at the time of reception, the switch unit 1123 inputs a radio signal received by the antenna 1101 to the CDMA reception unit 1124A and the OFDM reception unit 1124B.

The CDMA reception unit 1124A subjects the inputted CDMA wave to conversion into a baseband and amplification processing, and performs inverse diffusion in accordance with the CDMA scheme. Moreover, the CDMA reception unit 1124A performs RAKE reception which is processing for combining the preceding wave and the delayed waves included in the CDMA wave received from the radio base station 1200A. In the RAKE reception, the reception quality is improved by combining the preceding wave and the delayed waves while aligning phases thereof. Reception data thus obtained are inputted to the demodulation unit 1125.

The OFDM reception unit 1124B subjects the inputted OFDM wave to conversion into the baseband and the amplification processing, and performs multi-carrier demodulation in accordance with the OFDM scheme. Moreover, the OFDM reception unit 1124B removes the guard intervals included in the OFDM wave. The reception data thus obtained are inputted to the demodulation unit 1125.

The demodulation unit 1125 demodulates and decodes the inputted reception data. The demodulation unit 1125 demodulates and decodes the reception data in accordance with a method corresponding to the certain modulation scheme selected from the multiple modulation schemes. Moreover, the demodulation unit 1125 subjects the inputted reception data to symbol determination.

(2. 3) Configuration of Control Unit

Next, a configuration of the control unit 1160A will be described. The control unit 1160A includes a determination unit 1161, an acquisition unit 1162, a switching control unit 1163, and a cell selection unit 1164.

When the used communication scheme in an idle state is the OFDM scheme, the determination unit 1161 performs processing for determination (hereinafter determination processing) based on the EVM measured by the measurement unit 1140A as to whether or not the delay time difference Tdmax exceeds the guard interval length Tg. The determination unit 1161 determines whether or not the EVM measured by the measurement unit 1140A is equal to or above an EVM threshold. In this embodiment, the EVM is reception quality related to a time difference between a preceding wave and a delayed wave of the received OFDM signal. In this embodiment, the EVM threshold is a threshold corresponding to the guard interval.

For example, the EVM threshold is preset to a value of the EVM at which the delay time difference Tdmax exceeds the guard interval length Tg. The value of the EVM at which the delay time difference Tdmax exceeds the guard interval length Tg can be obtained on an experimental or an empirical basis.

On the basis of the modulation scheme used for the radio communication (namely, the downlink communication), the acquisition unit 1162 acquires from the storage unit 1180 the EVM threshold to be used for the determination by the determination unit 1161. The acquisition unit 1162 sets the acquired EVM threshold to the determination unit 1161.

The switching control unit 1163 controls the switch SW1 of the communication unit 1120 and the switch unit 1123. The switching control unit 1163 controls the communication unit 1120 (namely, the switch SW1 and the switch unit 1123) so as to switch the used communication scheme from the OFDM scheme to the CDMA scheme.

The cell selection unit 1164 selects the cell representing a communication area formed by the radio base station 1300 supporting the CDMA scheme. For example, if the reception quality (the EVM) from a radio base station supporting the OFDM scheme (a radio base station located in the neighborhood) falls below a predetermined threshold (the EVM threshold), the cell selection unit 1164 reselects the cell to be formed by the radio base station 1300.

(3) Detailed Operations of Radio Terminal

Figure 5:
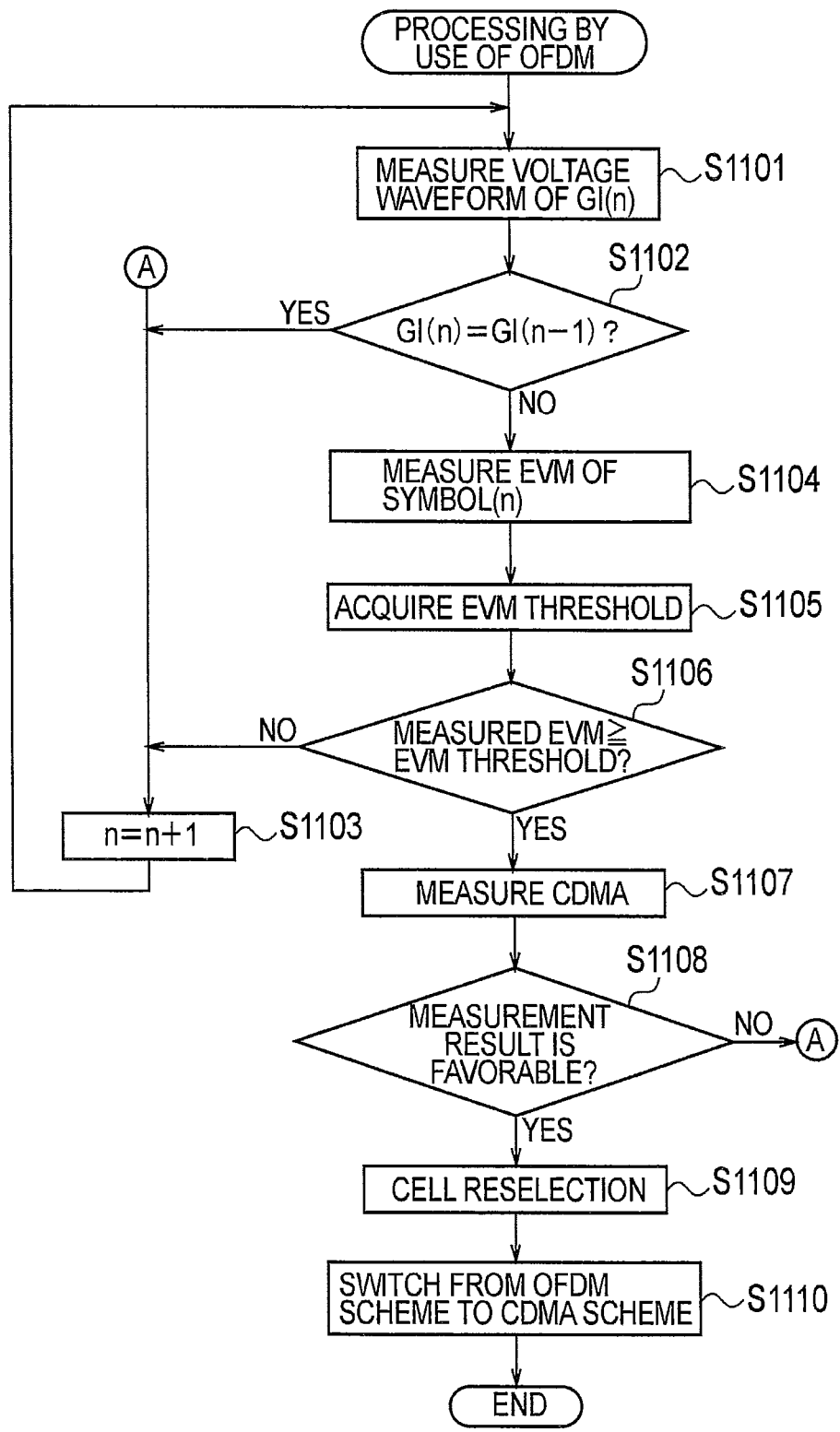
FIG. 5 is a flowchart showing operations of the radio terminal according to the first embodiment.

Next, detailed operations of the radio terminal 1100A will be described. FIG. 5 is a flowchart showing operations of the radio terminal 1100A when the used communication scheme is the OFDM scheme. This operation flow is executed in a period when the radio terminal 1100A is in the idle state, or in a period when the radio terminal 1100A is standing by without communicating with a communication party except for the radio base station, for example.

In step S1101, the measurement unit 1140A measures the state of the voltage waveform of the OFDM wave received by the OFDM reception unit 1124B.

Figure 6:
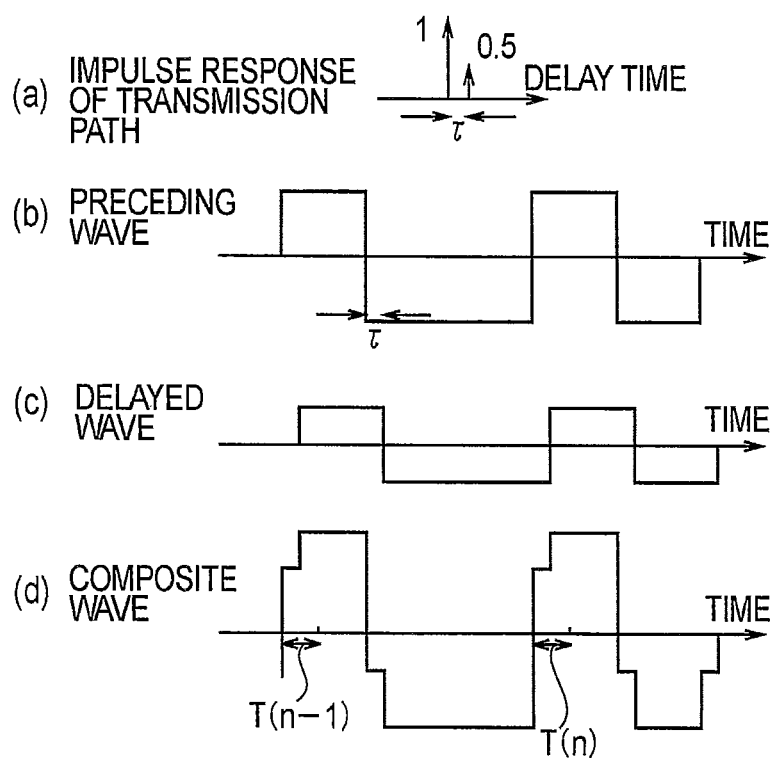
FIG. 6 is a view for explaining waveform measurement processing by a measurement unit according to the first embodiment.

The waveform measurement processing by the measurement unit 1140A is shown in FIG. 6. In the example of FIG. 6, the delay time difference is T as shown in FIG. 6(*a*), and the preceding wave shown in FIG. 6(*b*) is combined with the delayed wave shown in FIG. 6(*c*) whereby the OFDM wave shown in FIG. 6(*d*) is received. The measurement unit 1140A specifies a guard interval period of the preceding wave in response to a result of symbol synchronization, for example, and measures the state of the voltage wave form (a voltage value) of the OFDM wave at a measurement timing corresponding to the guard interval period. This measurement is performed at each measurement timing corresponding to each guard interval period.

In step S1102, the measurement unit 1140A determines whether or not the state of the voltage waveform measured at a current measurement timing T(n) is equal to a state of the voltage waveform measured at a measurement timing (hereinafter referred to as a "precedent measurement timing") T(n−1) which is precedent to the current measurement timing. The process goes to step S1103 when the state of the voltage waveform measured at the current timing T(n) is equal to the state of the voltage waveform measured at the precedent measurement timing T(n−1). In step S1103, the value n is incremented and the process goes to subsequent measurement of the voltage waveform. On the other hand, the process goes to step S1104 if the state of the voltage waveform measured at the current timing T(n) is different from the state of the voltage waveform measured at the precedent measurement timing T(n−1).

Figure 7:
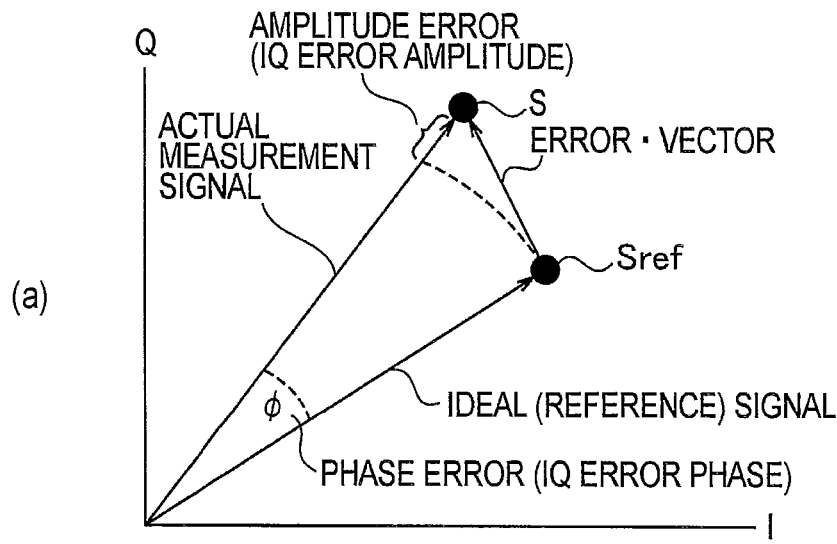
FIG. 7 is a view for explaining EVM measurement processing by the measurement unit according to the first embodiment.

In step S1104, the measurement unit 1140A measures the EVM of the OFDM symbol corresponding to the current measurement timing T(n). The EVM is called modulation accuracy, which represents an amount of deviation for the phase and the amplitude of an observed symbol point S from a symbol reference point Sref where the symbol point is supposed to be located, as shown in FIG. 7(a). Specifically, the EVM is an effective value of an error vector and is expressed as square root percentage of average power of an ideal signal. FIG. 7(c) shows a calculation formula for the EVM.

In step S1105, the acquisition unit 1162 acquires the EVM threshold from the storage unit 1180. The storage unit 1180 stores a table which links the modulation schemes with the EVM thresholds as shown in FIG. 7(b). A modulation scheme which can achieve communication at a higher speed (a modulation scheme involving a larger bit number per symbol) has stricter restrictions on phase and amplitude errors. Accordingly, the EVM threshold is set to a lower value as the modulation scheme can achieve communication at a higher speed. Here, a modulation scheme (such as QPSK) at the slowest communication speed is used at initial connection. Therefore, an EVM threshold corresponding to that modulation scheme may be used fixedly.

In step S1106, the determination unit 1161 determines whether or not the EVM measured in step S1104 is equal to or above the EVM threshold acquired and set in step S1105. The process goes to step S1107 upon determination that the EVM measured in step S1104 is equal to or above the EVM threshold acquired and set in step S1105. On the other hand, the process goes to step S1103 upon determination that the EVM measured in step S1104 is below the EVM threshold which is acquired and set in step S1105.

In step S1107, the cell selection unit 1164 causes the measurement unit 1140B to measure the reception quality of the radio signal corresponding to the CDMA scheme. When the result of measurement is a favorable result in step S1108 (when a measured RSSI is equal to or above a given threshold, for example), the cell selection unit 1164 performs reselection of the cell to be formed by the radio base station 1300 in step S1109, and the switching control unit 1163 controls the communication unit 1120 (namely, the switch SW1 and the switch unit 1123) in step S1110 so as to switch the used communication scheme from the OFDM scheme to the CDMA scheme. The communication unit 1120 transmits a connection request to a CDMA-supporting radio base station showing a favorable result of measurement by the measurement unit 1140B at the time of switching the used communication scheme from the OFDM scheme to the CDMA scheme. If there are multiple radio base stations to transmit the connection request, it is preferable to transmit the request to the station showing the best measurement result. Meanwhile, step S1107 is executed when the measured EVM from each of OFDM-supporting radio base stations located near the radio terminal 1100A is equal to or above the EVM threshold. Steps S1107 to S1110 may be the processing that complies with 3GPP TS36.300 standards and the like.

(4) Operation and Effect

According to the first embodiment, the control unit 1160A checks that the reception quality of the reception quality of the CDMA scheme is favorable under the situation where the delay time difference Tdmax is estimated to exceed the guard interval length Tg, and then controls the communication unit 1120 to switch the used communication scheme from the OFDM scheme to the CDMA scheme.

For this reason, it is possible to avoid an intersymbol interference in the OFDM scheme and to prevent deterioration in a communication performance. Moreover, it is possible to utilize the excellent communication performance of the OFDM scheme until the delay time difference Tdmax is estimated to exceed the guard interval length Tg.

Therefore, it is possible to provide a radio terminal which supports both of the CDMA scheme and the OFDM scheme and is capable of preventing deterioration in the communication performance due to the intersymbol interference while utilizing the OFDM scheme.

In the first embodiment, the cell selection unit 1164 causes the measurement unit 1140B to measure the reception quality of the radio signal of the CDMA scheme when the measured EVM is equal to or above the EVM threshold.

The EVM has advantageous features that it can be measured with a smaller amount of operation and that a shorter time is required for the measurement as compared to other reception quality indices including a SNR (Signal to Noise ratio), a BER (Bit Error Rate), a channel estimation value, and the like.

For this reason, by using the EVM as the reception quality index, it is possible to determine whether or not the delay time difference Tdmax exceeds the guard interval length Tg easily and instantaneously. Therefore, it is possible to reduce a processing load and power consumption of the radio terminal 1100A as compared to the case of using other reception quality indices, and to shorten a period of deterioration in the communication performance due to the intersymbol interference.

In the first embodiment, when the communication unit 1120 performs the radio communication using the adaptive modulation, the acquisition unit 1162 sets the EVM threshold based on the modulation scheme used for the radio communication. For this reason, it is possible to set the EVM threshold appropriately even in the case of using the adaptive modulation.

In the first embodiment, the measurement unit 1140A measures the reception quality (the EVM) only when the state of the voltage waveform measured at the current measurement timing T(n) is different from the state of the voltage waveform measured at the precedent measurement timing T(n−1).

When the state of the voltage waveform measured at the current measurement timing T(n) is equal to the state of the voltage waveform measured at the precedent measurement timing T(n−1), it is possible to consider that the multipath state remains unchanged. Accordingly, in such a case, it is possible to reduce the processing load and the power consumption of the radio terminal 1100A by omitting the measurement of the EVM as well as the determination processing.

Further, in the case of performing the determination only by use of the reception quality (the EVM), there is a risk of erroneous determination in the determination processing if the EVM varies due to a factor (such as a circuit factor) other than a change in the multipath state. Accordingly, it is possible to improve determination accuracy by measuring the EVM only when the state of the voltage waveform measured at the current measurement timing T(n) is different from the state of the voltage waveform measured at the precedent measurement timing T(n−1).

In the first embodiment, the CDMA reception unit 1124A performs the RAKE reception for combining the preceding wave and the delayed waves included in the CDMA wave received from the radio base station 1200A when the used communication scheme is the CDMA scheme. Specifically, in the CDMA scheme, a path diversity effect attributable to the RAKE reception is obtained when there is a large time difference between the preceding wave and the delayed waves.

Therefore, it is possible to utilize the characteristics of the CDMA scheme and to effectively suppress deterioration in the communication performance by switching the used communication method from the OFDM scheme to the CDMA scheme.

Second Embodiment

A second embodiment is an embodiment configured to perform the determination processing on the radio base station side. In the following, (1) Configuration of Radio Terminal, (2) Configuration of Radio Base Station, (3) Operations of Radio Communication System, and (4) Operation and Effect will be described. It is to be noted, however, that only different features from those in the first embodiment will be described below and duplicate explanation will be omitted.

(1) Configuration of Radio Terminal

Figure 8:
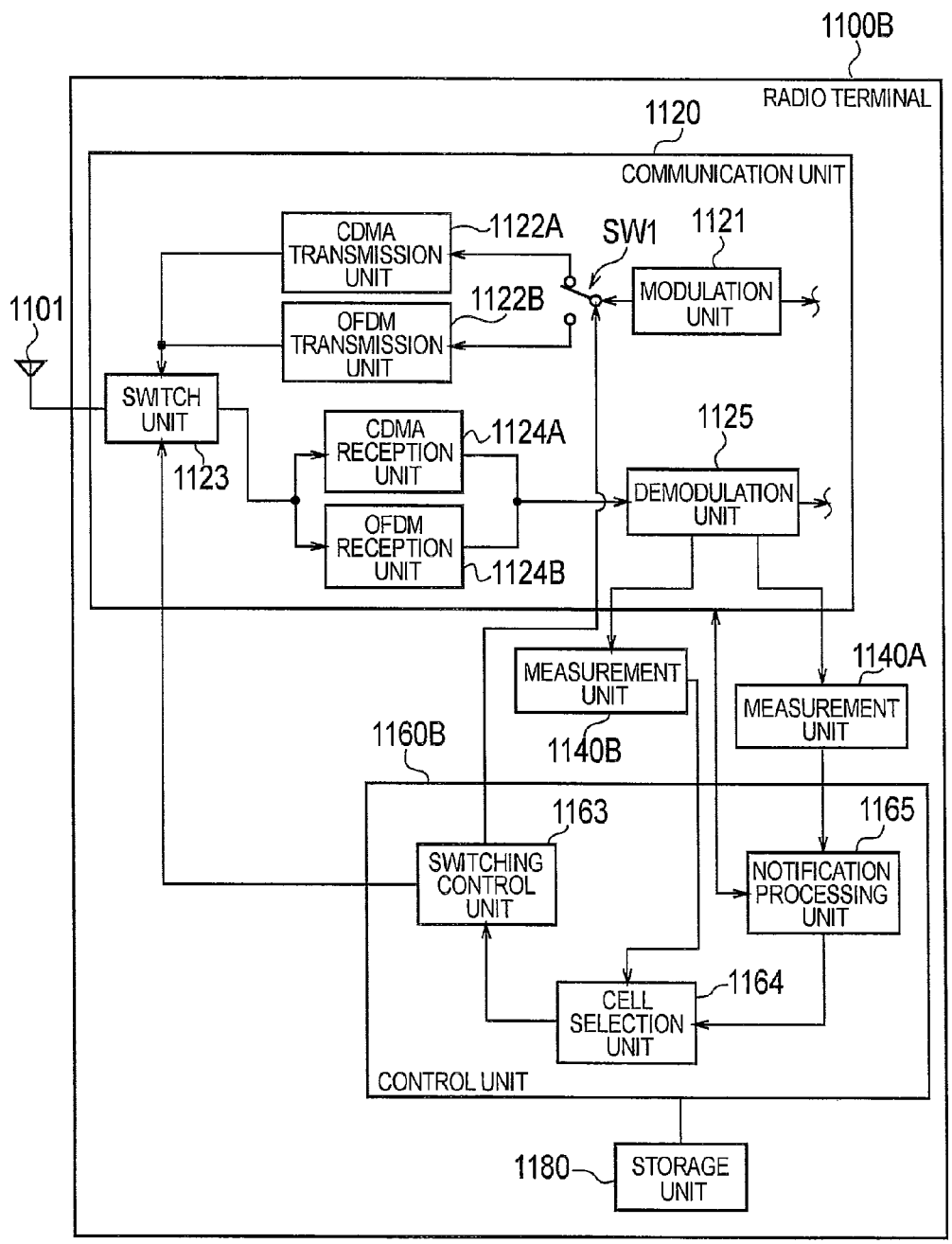
FIG. 8 is a block diagram showing a configuration of a radio terminal according to a second embodiment.

FIG. 8 is a block diagram showing a configuration of a radio terminal 1100B according to a second embodiment. As shown in FIG. 8, a control unit 1160B of the radio terminal 1100B does not include the determination unit 1161 and the acquisition unit 1162 as described in the first embodiment. Instead, the control unit 1160B includes a notification processing unit 1165 configured to exchange a variety of notification with a radio base station 1200B (see FIG. 9) according to the second embodiment. The notification processing unit 1165 notifies reception quality information indicative of the EVM measured by the measurement unit 1140 to the radio base station 1200B by use of the communication unit 1120.

(2) Configuration of Radio Base Station

FIG. 9 is a block diagram showing a configuration of a radio base station 1200B according to the second embodiment. As shown in FIG. 9, the radio base station 1200B includes an antenna 1201, a communication unit 1220, a control unit 1240, and a storage unit 1260.

The communication unit 1220 performs radio communication with the radio terminal 1100B through the antenna 1201. The Control unit 1240 is formed by use of a CPU, for example, and is configured to control various functions incorporated in the radio base station 1200B. The storage unit 1260 is formed by use of a memory, for example, and is configured to store a variety of information used for the control by the control unit 1240.

The communication unit 1220 receives from the radio terminal 1100B the reception quality information indicative of the EVM measured by the radio terminal 1100B.

The control unit 1240 includes an acquisition unit 1241, a determination unit 1242, and an indication unit 1243.

The determination unit 1242 determines whether or not the EVM indicated in the reception quality information received by the communication unit 1220 is equal to or above the EVM threshold.

On the basis of the modulation scheme used for the radio communication (namely, the downlink communication), the acquisition unit 1241 acquires from the storage unit 1260 the threshold to be used for the determination by the determination unit 1242. The acquisition unit 1241 sets the acquired threshold to the determination unit 1242.

The instruction unit 1243 generates a measurement instruction for instructing the measurement of the reception quality of the reception quality of the OFDM scheme when the determination unit 1242 determines that the EVM is equal to or above the EVM threshold.

The measurement instruction generated by the instruction unit 1243 is transmitted to the radio terminal 1100B by the communication unit 1220.

(3) Operations of Radio Communication System

FIG. 10 is a sequence chart showing operations of the radio terminal 1100B and the radio base station 1200B.

In step S1201, the communication unit 1220 of the radio base station 1200B transmits the OFDM wave to the radio terminal 1100B. The OFDM reception unit 1124B of the radio terminal 1100B receives the OFDM wave.

In step S1202, the measurement unit 1140 of the radio terminal 1100B measures the state of the voltage waveform of the OFDM wave received by the OFDM reception unit 1124B at a measurement timing corresponding to each of the guard intervals. The measurement unit 1140 measures the EVM only when the state of the voltage waveform measured at the current measurement timing (T(n)) is different from the state of the voltage waveform measured at the measurement timing (T(n−1)) precedent to the current measurement timing.

In step S1203, the notification processing unit 1165 of the radio terminal 1100B notifies the reception quality information indicative of the EVM measured by the measurement unit 1140 to the radio base station 1200B by using the OFDM transmission unit 1122B of the communication unit 1120.

In step S1204, the determination unit 1242 of the radio base station 1200B determines whether or not the EVM indicated in the reception quality information received by the communication unit 1220 is equal to or above the EVM threshold. Here, an assumption is made that the EVM is determined to be equal to or above the EVM threshold.

In step S1205, the communication unit 1220 of the radio base station 1200B transmits the measurement instruction generated by the instruction unit 1243 to the radio terminal 1100B. The OFDM reception unit 1124B of the radio terminal 1100B receives the measurement instruction. The measurement instruction received by the OFDM reception unit 1124B is forwarded to the notification processing unit 1165.

In step S1206, the cell selection unit 1164 of the radio terminal 1100B causes the measurement unit 1140B to measure the reception quality of the reception signal of the CDMA scheme in accordance with the measurement instruction forwarded to the notification processing unit 1165.

(4) Operation and Effect

According to the second embodiment, by performing the determination processing on the radio base station 1200B side, it is possible to reduce the processing load and the power consumption of the radio terminal 1100B as compared to the first embodiment.

Modified Examples of First Embodiment and Second Embodiment

The first embodiment and the second embodiment have described the example of individually providing the CDMA communication unit (the CDMA transmission unit 1122A and the CDMA reception unit 1124A) and the OFDM communication unit (the OFDM transmission unit 1122B and the OFDM reception unit 1124B). However, a configuration may be made so that the CDMA communication unit and the OFDM communication unit are formed collectively as one communication unit. For example, in a radio terminal called a cognitive terminal, the communication scheme can be switched by way of software by downloading software (SDR BB, Tunable RF) corresponding to the used communication scheme.

Meanwhile, in order to achieve reduction in the power consumption, the switching control unit 1163 may be configured to stop power supply to the communication unit of the CDMA communication unit (the CDMA transmission unit 1122A and the CDMA reception unit 1124A) and the OFDM communication unit (the OFDM transmission unit 1122A and the OFDM reception unit 1124B), which is not in the used communication scheme.

In the first embodiment and the second embodiment, the EVM is used as the reception quality index. However, another reception quality index (such as the SNR, the BER or the channel estimation value) may be used.

In the first embodiment and the second embodiment, the LTE has been described as the example of the radio communication system employing the OFDM scheme. However, without limitation to the LTE, it is also possible to use UMB (Ultra Mobile Broadband) standardized by 3GPP2, WiMAX standardized by IEEE 802.16, a next-generation PHS, and the like.

Third Embodiment

Next, a third embodiment of the present invention will be described. Specifically, (1) Outline of Radio Communication System, (2) Configuration of Radio Terminal, (3) Configuration of Radio Base Station, (4) Operations of Radio Communication System, (5) Effect of Third Embodiment, and (6) Modified Example of Third Embodiment will be described.

(1) Outline of Radio Communication System

Figure 11:
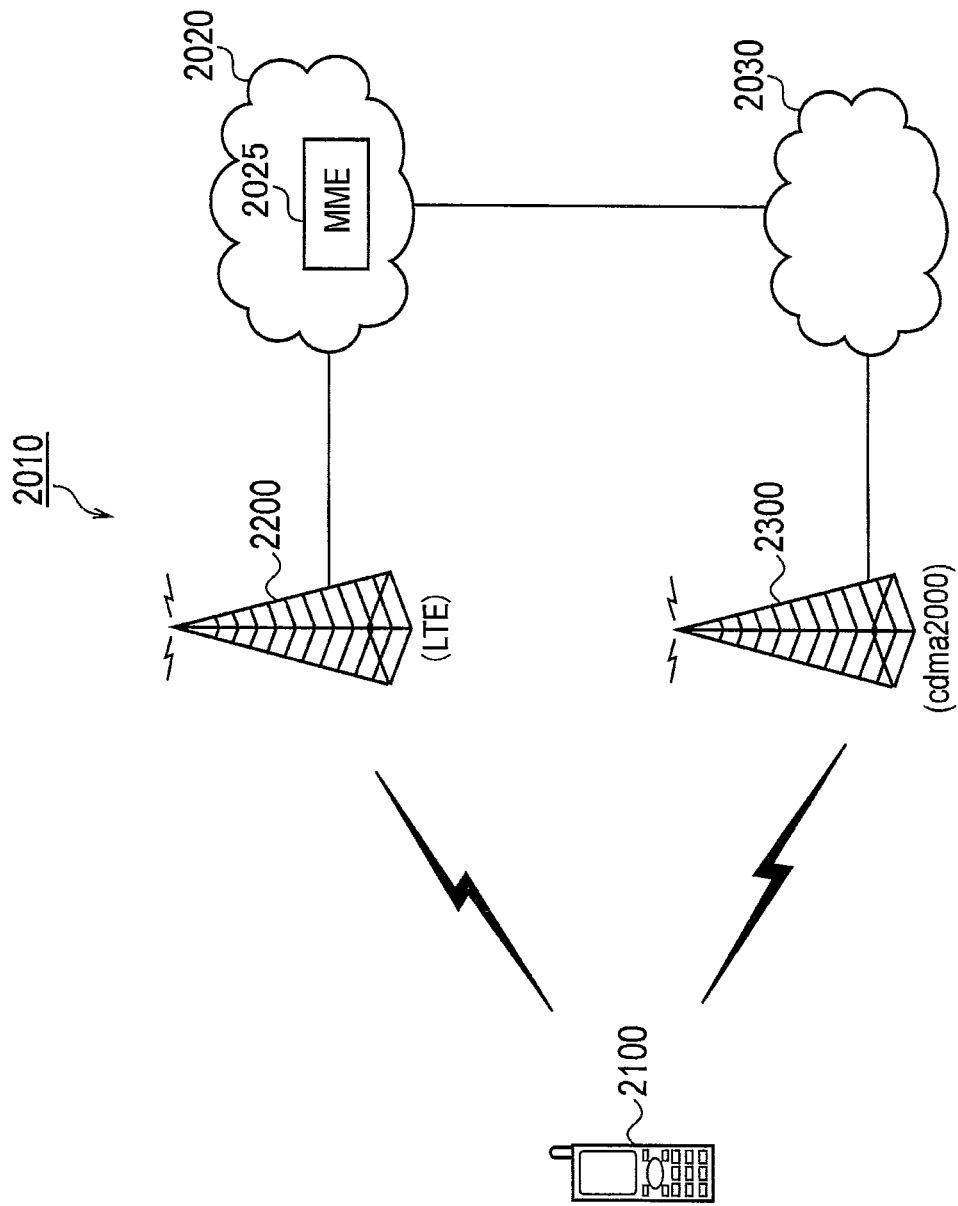
FIG. 11 is an overall schematic diagram of a radio communication system according to a third embodiment.

FIG. 11 is an overall schematic diagram showing a radio communication system 2010 according to a third embodiment.

As shown in FIG. 11, the radio communication system 2010 includes a radio terminal 2100, a radio base station 2200 (a first radio base station), and a radio base station 2300 (a second radio base station).

The radio terminal 2100 is a dual terminal supporting both of a CDMA scheme and an OFDM scheme. The radio base station 2200 supports the OFDM scheme, while the radio base station 2300 supports the CDMA scheme. Note that an OFDMA (Orthogonal Frequency Division Multiplexing Access) scheme is assumed to be included in the OFDM scheme in this embodiment.

In the third embodiment, the communication standard of the OFDM scheme is the LTE (Long Term Evolution) standardized by the 3GPP (3rd Generation Partnership Project). In the LTE, the OFDM scheme is used for the downlink. In the following, the downlink will be mainly described. Meanwhile, in the third embodiment, the communication standard in the CDMA scheme is cdma2000 standardized by 3GPP2. In the cdma2000, the CDMA scheme is used for both of the uplink (a reverse link) and the downlink (a forward link).

The radio base station 2200 constitutes part of a LTE network (called "E-UTRAN") 2020. The radio base station 2300 constitutes part of a cdma2000 network 2030. The LTE network 2020 includes a MME (Mobility Management Entity) 2025 which is a management device configured to manage mobility of the radio terminal 2100.

The radio terminal 2100 is in a connected state of being connected to the radio base station 2200 (hereinafter referred to as an "active scheme"). Specifically, the radio terminal 2100 is connected to the radio base station 2200 and is performing communication with a communication destination device (such as a server or a communication terminal) via the radio base station 2200. The radio terminal 2100 is located in a communicatable area of the radio base station 2200 and is also located in a communicatable area of the radio base station 2300.

The OFDM scheme is the scheme configured to distribute data to multiple subcarriers that are orthogonal to one another and to modulate the subcarriers. A sender side generates the OFDM signal by subjecting each of the subcarriers either to multi-phase PSK modulation or to multi-value QAM modulation and then by subjecting each of the subcarriers to inverse fast Fourier transform (IFFT). A receiver side performs demodulation by subjecting the OFDM signal to fast Fourier transform (FFT).

When the radio terminal 2100 and the radio base station 2200 perform radio communication in an environment unable to see each other directly, for example, an antenna 2101 (see FIG. 14) of the radio terminal 2100 receives multiple radio waves (multipath waves) taking different paths as shown in FIG. 12(*a*). In the example of FIG. 12(*a*), a path P1 directly reaching the antenna 2201 of the radio terminal 2100 and paths P2 and P3 reaching the antenna 2101 of the radio terminal 2100 after reflection by a building or the ground are formed between an antenna 2201 (see FIG. 15) of the radio base station 2200 and the antenna 2101 of the radio terminal 2100.

The radio wave received by the antenna 2101 of the radio terminal 2100 through the path P1 is the preceding wave (the direct wave). The radio waves received by the antenna 2101 of the radio terminal 2100 through the paths P2 and the P3 are the delayed waves which are delayed from the preceding wave.

As shown in FIG. 12(*b*), the radio waves on the respective paths have mutually different delay time. In the example shown in FIG. 12(*b*), the antenna 2101 of the radio terminal 2100 receives the radio wave (the direct wave) on the path P1 at delay time τ1, receives the radio wave (the reflected wave) on the path P2 at delay time τ2, and receives the radio wave (the reflected wave) on the path P3 at delay time τ3. The antenna 2101 of the radio terminal 2100 receives these waves collectively as the composite wave.

In the OFDM scheme, the sender side adds the redundant signal section called the guard interval to each symbol in order to absorb the delay time difference attributable to the above-described multiple paths.

FIG. 13(*a*) is a view showing a symbol structure in the OFDM scheme. As shown in FIG. 13(*a*), the symbol in the OFDM scheme (hereinafter the OFDM symbol) includes the effective symbol section in a finite time generated by the IFFT and the guard interval obtained by copying part of the effective symbol section.

By using the guard interval, if the time difference Tdmax (hereinafter referred to as the "delay time difference") between time of reception of the preceding wave and time of reception of the latest delayed wave falls within the time length of the guard interval Tg as shown in FIG. 13(*b*), the FFT functions normally on the receiver side whereby it is possible to avoid occurrence of an intersymbol interference.

On the other hand, if there arises a delayed wave exceeding the guard interval length Tg, an intersymbol interference occurs and the FFT does not function normally on the receiver side. Hence a large strain is generated and a communication performance is deteriorated. Accordingly, when it is estimated that there arises the intersymbol interference at the radio terminal 2100, the radio base station 2200 according to the third embodiment causes the radio terminal 2100 to execute a handover from the radio base station 2200 to the radio base station 2300.

(2) Configuration of Radio Terminal

Figure 14:
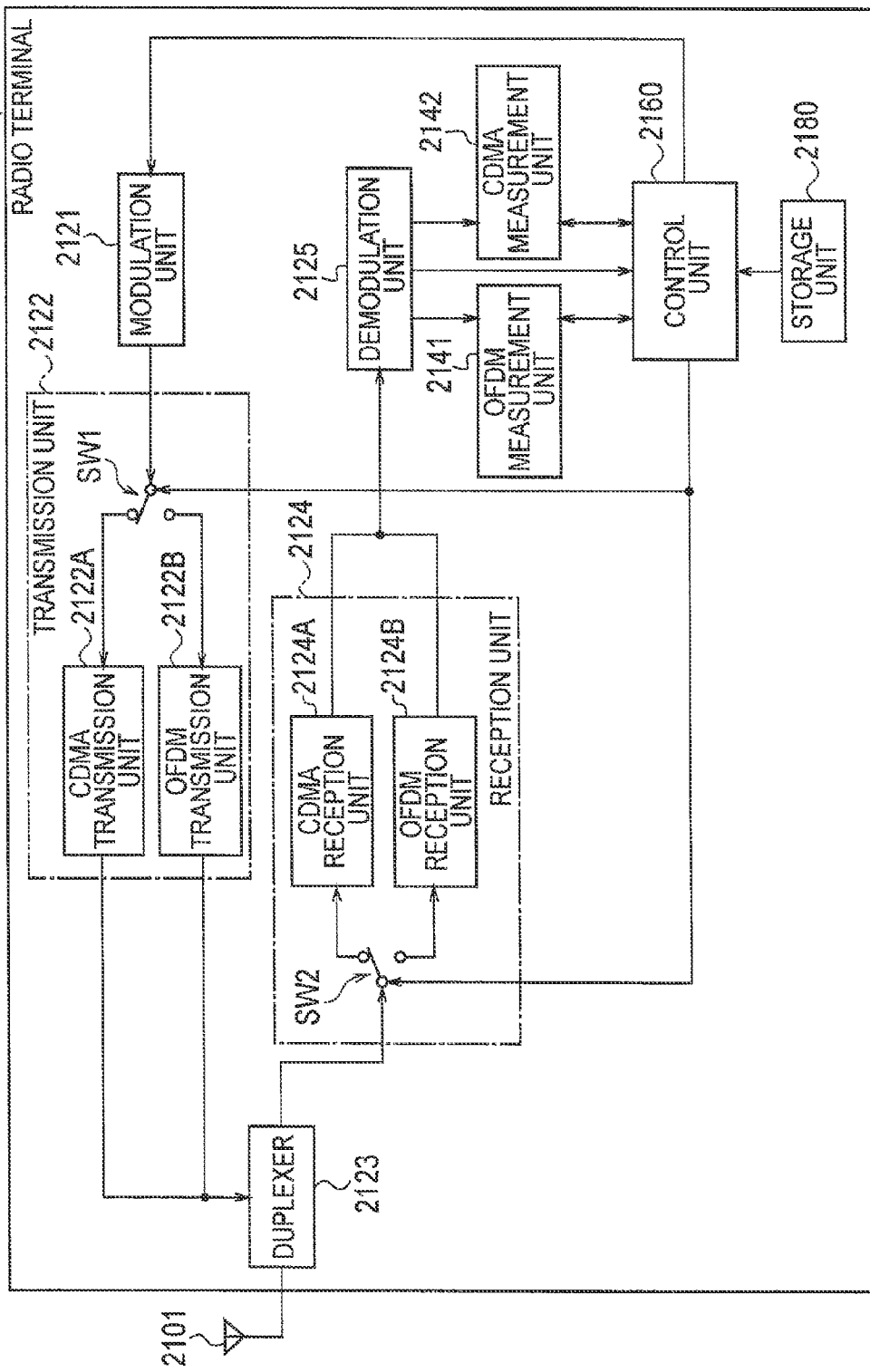
FIG. 14 is a block diagram showing a configuration of the radio terminal according to the third embodiment.

FIG. 14 is a block diagram showing a configuration of the radio terminal 2100.

As shown in FIG. 14, the radio terminal 2100 includes an antenna 2101, a modulation unit 2121, a transmission unit 2122 (terminal transmission unit), a duplexer 2123, a reception unit 2124 (terminal reception unit), a demodulation unit 2125, an OFDM measurement unit 2141 (a first measurement unit), a CDMA measurement unit 2142 (a second measurement unit), a control unit 2160, and a storage unit 2180. The transmission unit 2122 includes a switch SW1, a CDMA transmission unit 2122A, and an OFDM transmission unit 2122B. The reception unit 2124 includes a switch SW2, a CDMA reception unit 2124A, and an OFDM reception unit 2124B.

The modulation unit 2121 modulates and encodes transmission data from the control unit 2160. The modulation unit 2121 has a configuration suitable for adaptive modulation. In the adaptive modulation, multiple modulation schemes are predetermined based on a combination of a modulation multi-value number and an encoding ratio. The modulation schemes are also called modulation classes or MCS (Modulation and Coding Scheme) levels. The modulation unit 2121 modulates and encodes the transmission data in accordance with a certain modulation scheme selected from the multiple modulation schemes.

The switch SW1 inputs the transmission data outputted from the modulation unit 2121 to any of the CDMA transmission unit 2122A or the OFDM transmission unit 2122B in accordance with the control by the control unit 2160. The switch SW1 inputs the transmission data to the CDMA transmission unit 2122A when the used transmission scheme is the CDMA scheme, or inputs the transmission data to the OFDM transmission unit 2122B when the used transmission scheme is the OFDM scheme.

The CDMA transmission unit 2122A subjects the inputted transmission data to spread spectrum in accordance with the CDMA scheme and to conversion into a radio frequency band as well as to amplification processing, thereby generating a CDMA signal at the radio frequency band. The generated CDMA wave is transmitted via the duplexer 2123 and the antenna 2101.

The OFDM transmission unit 2122B subjects the inputted transmission data to multi-carrier modulation in accordance with the OFDM scheme and to conversion into a radio frequency band as well as to amplification processing, thereby generating an OFDM signal at the radio frequency band. The generated OFDM signal is transmitted via the duplexer 2123 and the antenna 2101.

The duplexer 2123 inputs the radio signal (either the CDMA signal or the OFDM signal) to the antenna 2101. Meanwhile, at the time of reception, the duplexer 2123 inputs the radio signal (either the CDMA signal or the OFDM signal) received by the antenna 2101 to the switch SW2.

The switch SW2 inputs the radio signal from the duplexer 2123 to any of the CDMA reception unit 2124A or the OFDM reception unit 2124B in accordance with the control by the control unit 2160. The switch SW2 inputs the radio signal from the duplexer 2123 to the CDMA reception unit 2124A when the used transmission scheme is the CDMA scheme, or inputs the radio signal from the duplexer 2123 to the OFDM reception unit 2124B when the used transmission scheme is the OFDM scheme.

The CDMA reception unit 2124A subjects the inputted radio signal (the CDMA signal) to conversion into the baseband and the amplification processing, and performs inverse diffusion in accordance with the CDMA scheme. Moreover, the CDMA reception unit 2124A performs the RAKE reception which is the processing for combining the preceding wave and the delayed waves included in the received CDMA signal. In the RAKE reception, the reception quality is improved by combining the preceding wave and the delayed waves while aligning the phases thereof. The reception data thus obtained are inputted to the demodulation unit 2125.

The OFDM reception unit 2124B subjects the inputted radio signal (the OFDM signal) to conversion into the baseband and the amplification processing, and performs multi-carrier demodulation in accordance with the OFDM scheme. Moreover, the OFDM reception unit 2124B removes the guard intervals included in the received OFDM signal. The reception data obtained as a consequence are inputted to the demodulation unit 2125.

The demodulation unit 2125 demodulates and decodes the inputted reception data. The demodulation unit 2125 demodulates and decodes the reception data in accordance with a method corresponding to the certain modulation scheme selected from the multiple modulation schemes. Moreover, the demodulation unit 2125 subjects the inputted reception data to the symbol determination.

The OFDM measurement unit 2141 measures reception parameters which indicate the time difference between the preceding wave and the delayed waves of the received OFDM signal. In the third embodiment, the reception parameters include an amplitude error and a phase error between the OFDM symbol S included in the received OFDM signal and the reference point Sref of the OFDM symbol as shown in FIG. 16(a). The values of the reception parameters (the amplitude error and the phase error) grow larger as the delay time difference Tdmax exceeds the guard interval Tg by a larger degree. The reception parameters measured by the OFDM measurement unit 2141 are inputted to the control unit 2160.

The CDMA measurement unit 2142 measures the reception quality of the CDMA signal. In the third embodiment, the received signal strength indicator (RSSI) is used as the reception quality of the CDMA signal. However, without limitation to the RSSI, it is also possible to use the received SNR (Signal to Noise ratio) and the like. The RSSI measured by the CDMA measurement unit 2142 is inputted to the control unit 2160.

The control unit 2160 is formed by use of a CPU, for example, and is configured to control various functions incorporated in the radio terminal 2100. The storage unit 2180 is formed by use of a memory, for example, and is configured to store a variety of information used for the control by the control unit 2160.

The control unit 2160 controls the switches SW1, 2. The control unit 2160 switches between the switches SW1, 2 when switching the used communication scheme between the OFDM scheme and the CDMA scheme. Moreover, the control unit 2160 may temporarily switches between the switches SW1, 2, when measuring the RSSI of the CDMA signal during the OFDM communication.

The control unit 2160 inputs the reception parameters measured by the OFDM measurement unit 2141 and the RSSI measured by the OFDM measurement unit 2141 to the modulation unit 2121. The OFDM transmission unit 2122B transmits the reception parameters and the RSSI after the modulation to the radio base station 2200. Such a report on the measurement results is called a "Measurement Report".

The control unit 2160 operates the OFDM measurement unit 2141 and the CDMA measurement unit 2142 in response to the instruction from the radio base station 2200, and executes the handover for switching from the radio base station 2200 to the radio base station 2300.

(3) Configuration of Radio Base Station

Figure 15:
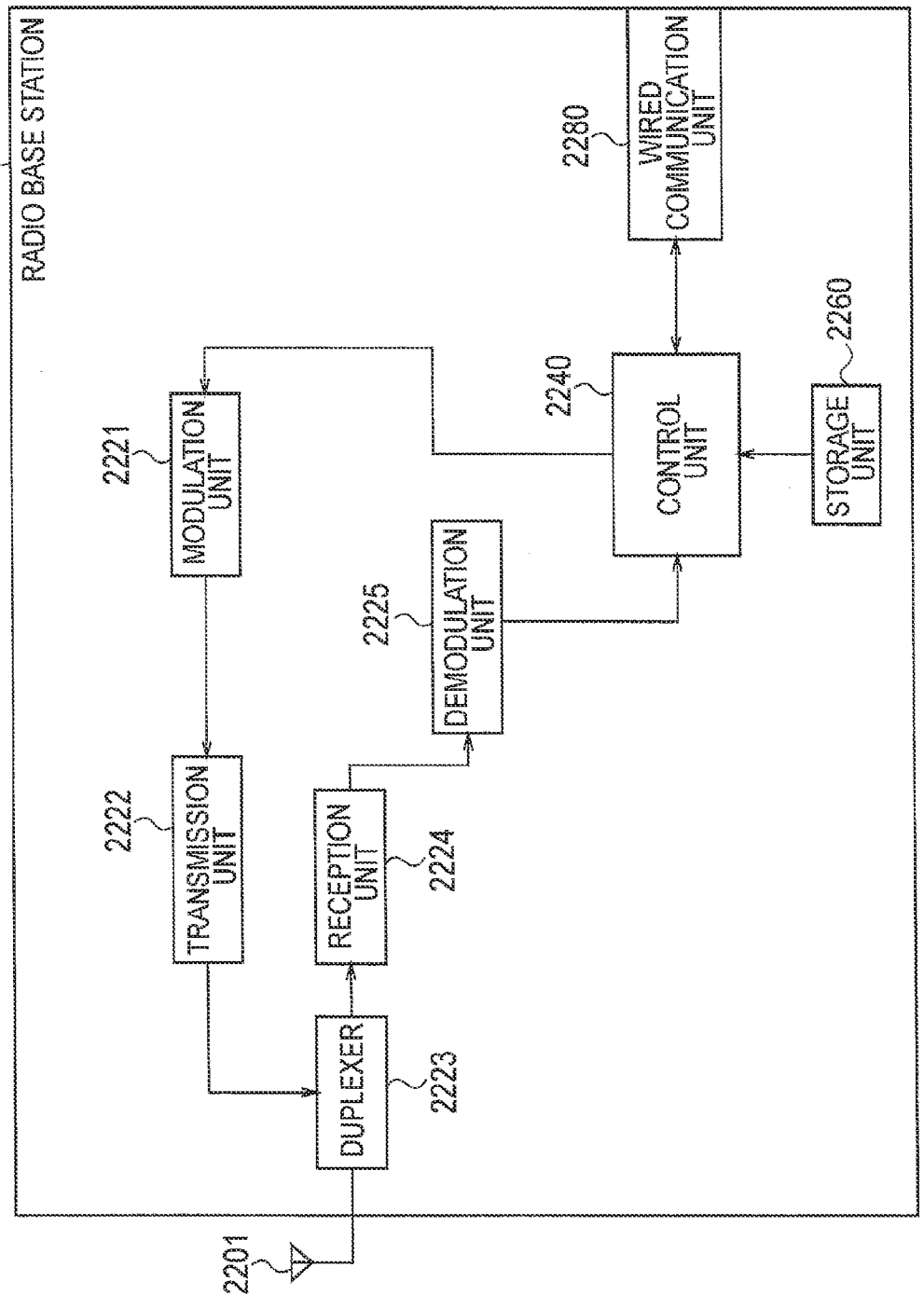
FIG. 15 is a block diagram showing a configuration of a radio base station according to the third embodiment.

FIG. 15 is a block diagram showing a configuration of the radio base station 2200.

As shown in FIG. 15, the radio base station 2200 includes an antenna 2201, a modulation unit 2221, a transmission unit 2222 (base-station transmission unit), a duplexer 2223, a reception unit 2224 (base-station reception unit), a demodulation unit 2225, a control unit 2240, a storage unit 2260, and a wired communication unit 2280.

The modulation unit 2221 modulates and encodes the transmission data from the control unit 2240. The modulation unit 2221 modulates and encodes the transmission data based on the certain modulation scheme selected from the multiple modulation schemes in accordance with the adaptive modulation.

The transmission unit 2222 subjects the inputted transmission data to multi-carrier modulation in accordance with the OFDM scheme and to conversion into a radio frequency band as well as to amplification processing, thereby generating an OFDM signal at the radio frequency band. The generated OFDM signal is transmitted via the duplexer 2223 and the antenna 2201.

The duplexer 2223 inputs the OFDM signal to the antenna 2201. Meanwhile, at the time of reception, the duplexer 2223 inputs the OFDM signal received by the antenna 2201 to the reception unit 2224.

The reception unit 2224 subjects the inputted OFDM signal to conversion into the baseband and the amplification processing, and performs multi-carrier demodulation in accordance with the OFDM scheme. Moreover, the reception unit 2224 removes the guard intervals included in the OFDM signal. The reception data thus obtained are inputted to the demodulation unit 2225.

The demodulation unit 2225 demodulates and decodes the inputted reception data. The demodulation unit 2225 demodulates and decodes the reception data in accordance with a method corresponding to the certain modulation scheme selected from the multiple modulation schemes. Moreover, the demodulation unit 2225 subjects the inputted reception data to the symbol determination.

The control unit 2240 is formed by use of a CPU, for example, and is configured to control various functions incorporated in the radio base station 2200. The storage unit 2260 is formed by use of a memory, for example, and is configured to store a variety of information used for the control by the control unit 2240. The wired communication unit 2280 performs communication with the LTE network 2020 side.

The control unit 2240 transmits the measurement instruction for the RSSI of the CDMA signal to the radio terminal 2100 by using the transmission unit 2222. In the third embodiment, the transmission unit 2222 transmits the measurement instruction either periodically or upon occurrence of a predetermined trigger.

The storage unit 2260 stores a neighbor list in advance, which includes information on radio base stations (hereinafter nearby base stations) located near the radio base station 2200. In the third embodiment, the neighbor list includes IDs, used channel information, and the like of the radio base stations (such as the radio base station 2300) supporting the CDMA scheme. The control unit 2240 incorporates the neighbor list in the measurement instruction and transmits the information from the transmission unit 2222.

The control unit 2240 acquires the reception parameters and the RSSI transmitted from the radio terminal 2100 in response to the measurement instruction via the reception unit 2224 and the demodulation unit 2225. The control unit 2240 determines whether or not to cause the radio terminal 2100 to perform the handover based on the reception parameters and the RSSI.

Specifically, the control unit 2240 calculates the EVM (Error Vector Magnitude) by use of the reception parameters and compares the calculated EVM with the EVM threshold. The EVM threshold is determined based on the guard interval used in the OFDM scheme and is stored in advance in the storage unit 2260.

The EVM threshold is preset to the value of the EVM when the delay time difference Tdmax exceeds the guard interval length Tg. The value of the EVM at which the delay time difference Tdmax exceeds the guard interval length Tg can be obtained on an experimental or an empirical basis.

Figure 16:
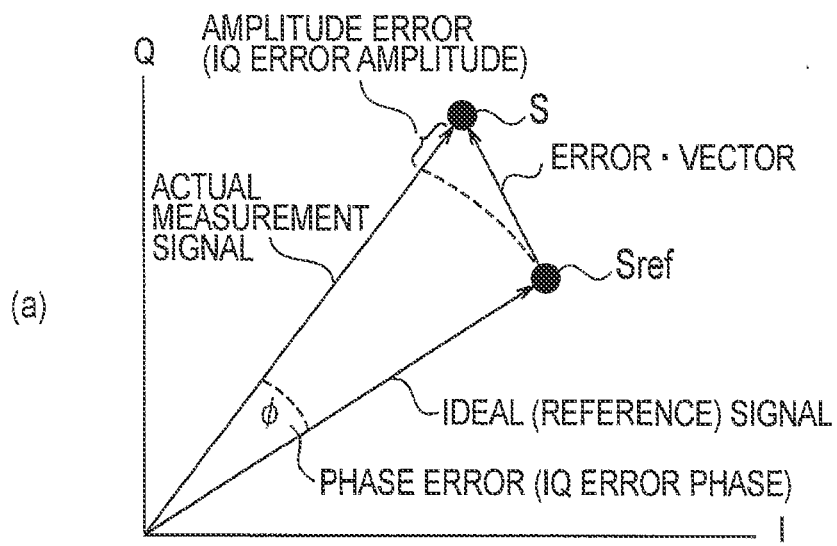
FIG. 16 is a view for explaining EVM and an EVM threshold according to the third embodiment.

In the third embodiment, the EVM threshold is provided for each of the modulation schemes to be used in the adaptive modulation. As shown in FIG. 16(*a*), the EVM is also referred to as the modulation accuracy, which represents an effective value of an error vector based on the amount of deviation (reception parameter) for the phase and the amplitude of the observed symbol point S from the symbol reference point Sref where the symbol point is supposed to be located and is expressed as square root percentage of average power of an ideal signal. FIG. 16(*c*) shows a calculation formula for the EVM.

The storage unit 2260 stores a table which links the modulation schemes with the EVM thresholds as shown in FIG. 16(*b*). A modulation scheme which can achieve communication at a higher speed (a modulation scheme involving a larger bit number per symbol) has stricter restrictions on phase and amplitude errors. Accordingly, the EVM threshold is set to a lower value as the modulation scheme can achieve communication at a higher speed.

The control unit 2240 acquires the EVM threshold from the storage unit 2260 based on the modulation scheme used for the downlink and compares the EVM threshold with the calculated EVM.

Moreover, the control unit 2240 compares the RSSI of the CDMA signal with a predetermined value. When the RSSI is higher than the predetermined value, it is possible to assume that the reception quality is favorable. The predetermined value is preset to the value of the RSSI with which the radio terminal 2100 can execute the communication.

Regarding the control unit 2240, when the calculated EVM exceeds the EVM threshold and the RSSI is higher than the predetermined value, the control unit 2240 of the radio base station 2200 decides to cause the radio terminal 2100 to execute the handover to the radio base station (such as the radio base station 2300) supporting the CDMA scheme. When causing the radio terminal 2100 to carry out the handover, the control unit 2240 transmits an instruction for the handover to the radio terminal 2100 by use of the transmission unit 2222 after checking that the handover is feasible.

(4) Operations of Radio Communication System

Next, operations of the radio communication system 2010 will be described by using (4. 1) Operation Pattern 1 and (4. 2) Operation Pattern 2 as examples. In the third embodiment, the operations of the radio communication system 2010 are based on the 3GPP TS36.300 standards and the like. The operation pattern 1 is an operation pattern configured to cause the radio terminal 2100 to measure the RSSI of the CDMA signal periodically. The operation pattern 2 is an operation pattern configured to cause the radio terminal 2100 to measure the RSSI of the CDMA signal by using a certain event as a trigger.

(4. 1) Operation Pattern 1

Figure 17:
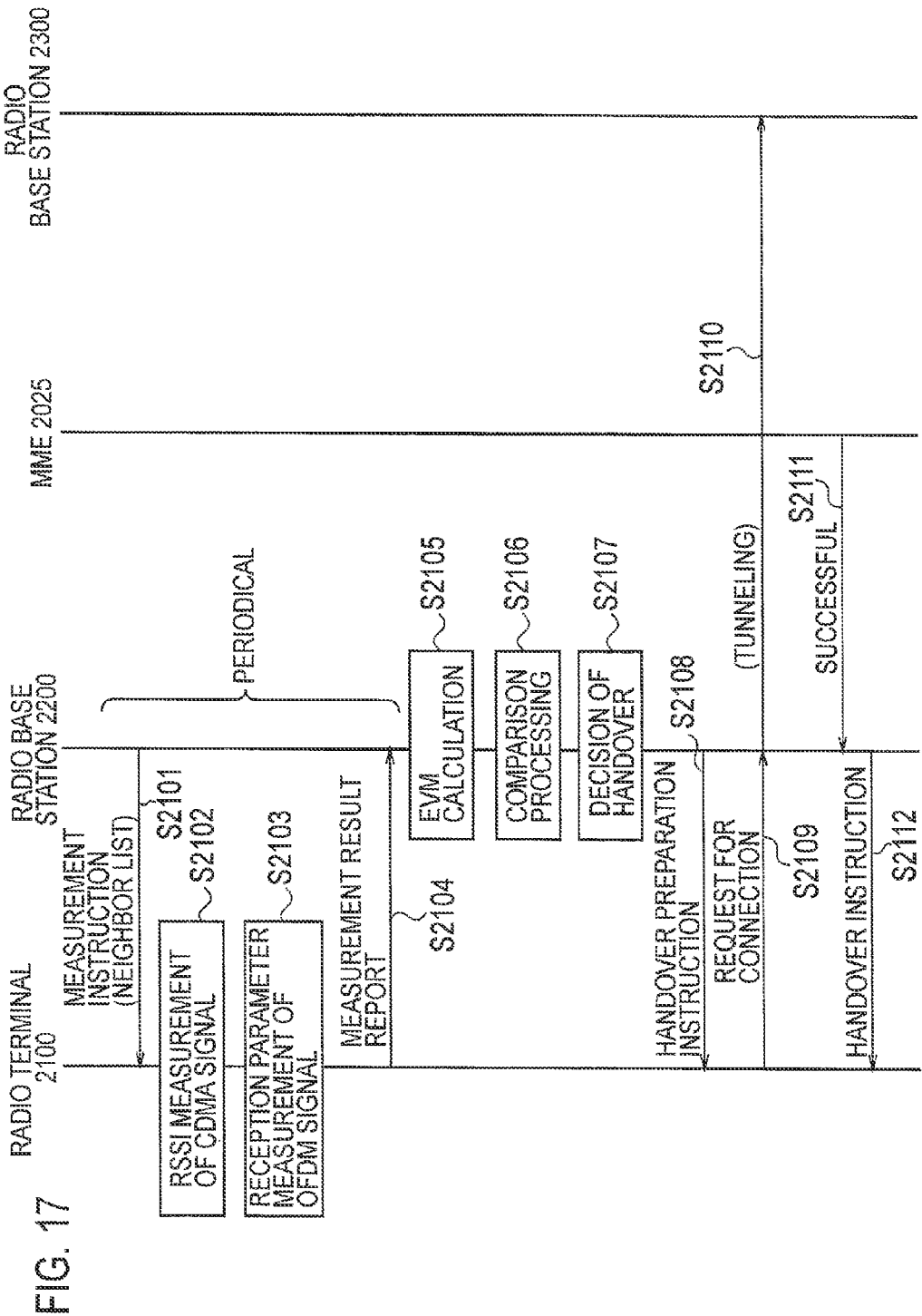
FIG. 17 is a sequence chart showing an operation pattern 1 of the radio communication system according to the third embodiment.

FIG. 17 is a sequence chart showing an operation pattern 1 of the radio communication system 2010. This sequence is executed when the radio terminal 2100 is in an active scheme.

In step S2101, the transmission unit 2222 of the radio base station 2200 transmits the measurement instruction to the radio terminal 2100. The above-described neighbor list is included in the measurement instruction. The OFDM reception unit 2124B of the radio terminal 2100 receives the measurement instruction.

In step S2102, the control unit 2160 of the radio terminal 2100 causes the CDMA measurement unit 2142 to measure the RSSI of the CDMA signal for each of the CDMA-supporting base stations corresponding to the IDs included in the neighbor list.

In step S2103, the control unit 2160 of the radio terminal 2100 causes the OFDM measurement unit 2141 to measure the reception parameters of the OFDM signal received from the radio base station 2200.

In step S2104, the OFDM transmission unit 2122B of the radio terminal 2100 transmits a measurement result report including the reception parameters measured by the OFDM measurement unit 2141 and the RSSI measured by the CDMA measurement unit 2142 to the radio base station 2200. The reception unit 2224 of the radio base station 2200 receives the measurement result report (the reception parameters and the RSSI).

In step S2105, the control unit 2240 of the radio base station 2200 calculates the EVM by use of the reception parameters which are received by the reception unit 2224 and demodulated by the demodulation unit 2225.

In step S2106, the control unit 2240 of the radio base station 2200 compares the calculated EVM with the EVM threshold corresponding to the modulation scheme. Meanwhile, the control unit 2240 of the radio base station 2200 compares the RSSI, which is received by the reception unit 2224 and demodulated by the demodulation unit 2225, with the predetermined value.

When the calculated EVM exceeds the EVM threshold and the RSSI is higher than the predetermined value, the control unit 2240 of the radio base station 2200 decides to cause the radio terminal 2100 to execute the handover to the CDMA-supporting radio base station (step S2107). On the other hand, when the calculated EVM falls below the EVM threshold or when the RSSI is equal to or below the predetermined value, the control unit 2240 of the radio base station 2200 decides not to cause the radio terminal 2100 to execute the handover to the CDMA-supporting radio base station.

Here, when there are multiple CDMA-supporting radio base stations having the RSSI higher than the predetermined value in the case where the calculated EVM exceeds the EVM threshold, it is preferable that the control unit 2240 of the radio base station 2200 determine the CDMA-supporting radio base station having the highest RSSI as a handover destination. In the following, a case of causing the radio terminal 2100 to execute the handover to the radio base station 2300 will be described.

In step S2108, the transmission unit 2222 of the radio base station 2200 transmits a handover preparation instruction to the radio terminal 2100. The OFDM reception unit 2124B of the radio terminal 2100 receives the handover preparation instruction.

In step S2109, the OFDM transmission unit 2122B of the radio terminal 2100 transmits a request for connection to the radio base station 2300 to the radio base station 2200. This request for connection is forwarded to the radio base station 2300 by tunneling under the supervision of the MME 2025 (step S2110). When the request for connection is successful, the MME 2025 notifies the radio base station 2200 of the fact (step S2111).

In step S2112, the radio base station 2200 transmits an instruction for the handover to the radio base station 2300 to the radio terminal 2100 in response to the notification from the MME 2025. Upon receipt of the instruction for the handover to the radio base station 2300, the radio terminal 2100 executes the handover to the radio base station 2300.

(4. 2) Operation Pattern 2

Figure 18:
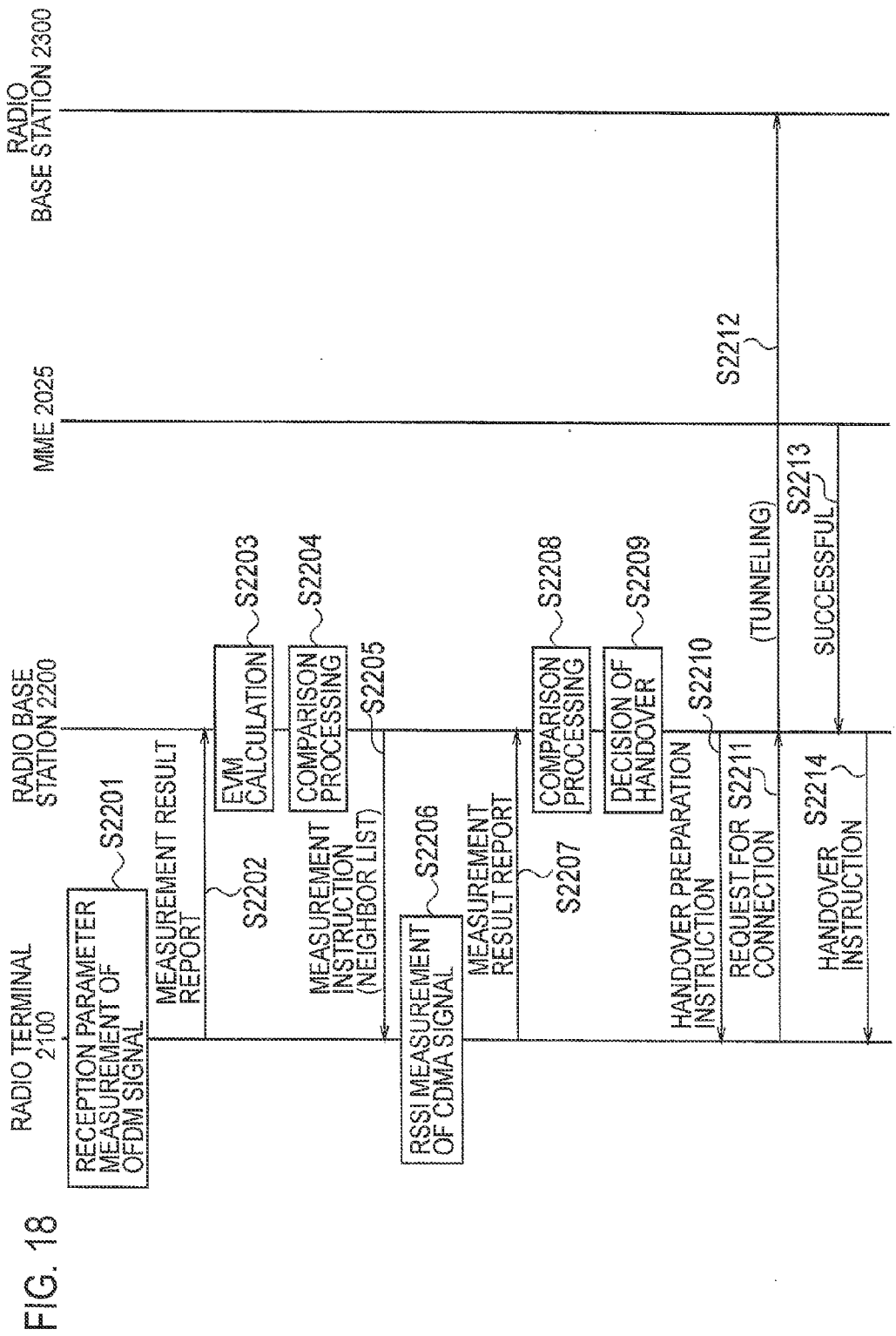
FIG. 18 is a sequence chart showing an operation pattern 2 of the radio communication system according to the third embodiment.

FIG. 18 is a sequence chart showing an operation pattern 2 of the radio communication system 2010. This sequence is executed when the radio terminal 2100 is in an active scheme.

In step S2201, the control unit 2160 of the radio terminal 2100 causes the OFDM measurement unit 2141 to measure the reception parameters of the OFDM signal received from the radio base station 2200.

In step S2202, the OFDM transmission unit 2122B of the radio terminal 2100 transmits the reception parameters measured by the OFDM measurement unit 2141 to the radio base station 2200. The reception unit 2224 of the radio base station 2200 receives the reception parameters.

In step S2203, the control unit 2240 of the radio base station 2200 calculates the EVM by use of the reception parameters which are received by the reception unit 2224 and demodulated by the demodulation unit 2225.

In step S2204, the control unit 2240 of the radio base station 2200 compares the calculated EVM with the EVM threshold corresponding to the modulation scheme.

When the calculated EVM exceeds the EVM threshold, the transmission unit 2222 of the radio base station 2200 transmits a RSSI measurement instruction to the radio terminal 2100 in step S2205. The above-described neighbor list is included in the measurement instruction. The OFDM reception unit 2124B of the radio terminal 2100 receives the measurement instruction.

In step S2206, the control unit 2160 of the radio terminal 2100 causes the CDMA measurement unit 2142 to measure the RSSI of the CDMA signal for each of the CDMA-supporting base stations corresponding to the IDs included in the neighbor list.

In step S2207, the OFDM transmission unit 2122B of the radio terminal 2100 transmits the measurement result report including the RSSI measured by the CDMA measurement unit 2142 to the radio base station 2200. The reception unit 2224 of the radio base station 2200 receives the measurement result report (the RSSI).

In step S2208, the control unit 2240 of the radio base station 2200 compares the RSSI, which is received by the reception unit 2224 and demodulated by the demodulation unit 2225, with the predetermined value.

When the RSSI is higher than the predetermined value, the control unit 2240 of the radio base station 2200 decides to cause the radio terminal 2100 to execute the handover to the CDMA-supporting radio base station (step S2209). On the other hand, when the RSSI is equal to or below the predetermined value, the control unit 2240 of the radio base station 2200 decides not to cause the radio terminal 2100 to execute the handover to the CDMA-supporting radio base station. Here, when there are multiple CDMA-supporting radio base stations having the RSSI higher than the predetermined value, it is preferable that the control unit 2240 of the radio base station 2200 determine the CDMA-supporting radio base station having the highest RSSI as the handover destination.

Each processing in steps S2210 to S2214 is executed as similar to the operation pattern 1.

(5) Effect of Third Embodiment

According to the third embodiment, the control unit 2240 of the radio base station 2200 decides to cause the radio terminal 2100 to execute the handover to the radio base station 2300 when the EVM exceeds the EVM threshold and the RSSI is higher than the predetermined value. Here, the EVM reflects the delay time difference Tdmax between the preceding wave and the delayed waves of the OFDM signal and the EVM threshold is set to the value of the EVM when the delay time difference Tdmax exceeds the guard interval length Tg. The state of the EVM exceeding the EVM threshold means that the delay time difference Tdmax exceeds the guard interval length Tg.

Accordingly, under the situation where the delay time difference Tdmax is estimated to exceed the guard interval length Tg, it is possible to avoid an intersymbol interference and to prevent deterioration in the communication performance by causing the radio terminal 2100 to execute the handover to the radio base station 2300 supporting the CDMA scheme after checking that a reception level of the CDMA signal is favorable. Moreover, it is possible to utilize the excellent communication performance of the OFDM scheme until the delay time difference Tdmax is estimated to exceed the guard interval length Tg.

Therefore, the radio terminal 2100 supporting both of the CDMA scheme and the OFDM scheme can prevent deterioration in the communication performance due to the intersymbol interference while utilizing the OFDM scheme in the active scheme.

Furthermore, the CDMA reception unit 2124A of the radio terminal 2100 can perform the RAKE reception in which the preceding wave and the delayed waves in the CDMA signal are combined. Accordingly, it is possible to achieve high resistance to the multi-path environment and to obtain a path diversity effect by the RAKE reception. Therefore, it is possible to utilize the characteristic of the CDMA scheme and to effectively suppress deterioration in the communication performance by switching the used communication scheme from the OFDM scheme to the CDMA scheme.

Meanwhile, the EVM (and reception parameter) has the advantageous features that it can be measured with a smaller amount of operation and that a shorter time is required for the measurement as compared to other reception quality indices including the SNR (Signal to Noise ratio), the BER (Bit Error Rate), the channel estimation value, and the like. For this reason, by using the EVM, it is possible to estimate whether or not the delay time difference Tdmax exceeds the guard interval length Tg easily and instantaneously. Therefore, it is possible to reduce a processing load and power consumption of the radio terminal 2100 as compared to the case of using other reception quality indices, and to shorten a period of deterioration in the communication performance due to the intersymbol interference.

In the third embodiment, the control unit 2240 sets the EVM threshold corresponding to the modulation scheme used for the downlink radio communication. Accordingly, it is possible to set the EVM threshold value appropriately even when using the adaptive modulation.

(6) Modified Examples of Third Embodiment

Figure 19:
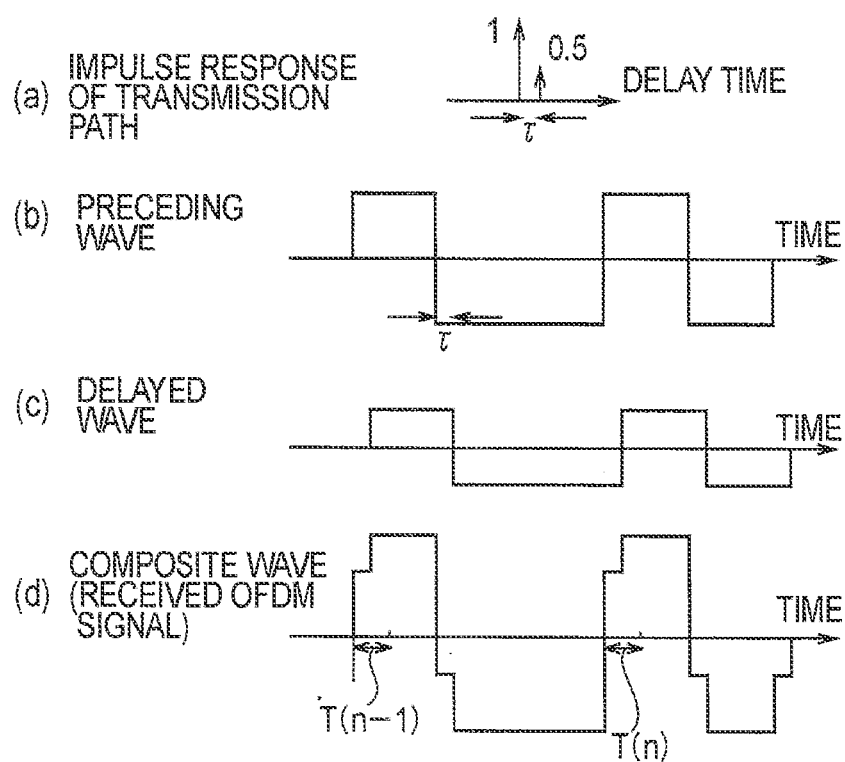
FIG. 19 is a view for explaining waveform measurement processing according to a modified example of the third embodiment.

It is also possible to measure the reception parameters of the OFDM signal only when the state of the voltage waveform of the received OFDM signal satisfies a certain condition. FIG. 19 shows waveform measurement processing by the OFDM measurement unit 2141. In the example of FIG. 19, the delay time difference is equal to T as shown in FIG. 19(*a*), and the preceding wave shown in FIG. 19(*b*) is combined with the delayed wave shown in FIG. 19(*c*), and the OFDM signal shown in FIG. 19(*d*) is received. The OFDM measurement unit 2141 specifies the guard interval period of the preceding wave based on a result of symbol synchronization, for example, and measures the state of the voltage waveform (a voltage value) of the OFDM signal at measurement timing corresponding to the guard interval period. The measurement is performed at each measurement timing corresponding to each of the guard interval periods. The OFDM measurement unit 2141 determines whether or not the state of the voltage waveform measured at the current measurement timing T(n) is equal to the state of the voltage waveform measured at the measurement timing precedent to the current measurement timing (hereinafter referred to as the "precedent measurement timing") T(n−1). The OFDM measurement unit 2141 omits the measurement of the reception parameters when the state of the voltage waveform measured at the current measurement timing T(n) is equal to the state of the voltage waveform measured at the precedent measurement timing T(n−1), or executes the measurement of the reception parameters when the state of the voltage waveform measured at the current measurement timing T(n) is different from the state of the voltage waveform measured at the precedent measurement timing T(n−1). In the case of performing the determination only by use of the EVM, there is a risk of erroneous determination if the EVM varies due to a factor (such as a circuit factor) other than a change in the multipath state. Accordingly, it is possible to improve determination accuracy by measuring the EVM only when the state of the voltage waveform measured at the current measurement timing T(n) is different from the state of the voltage waveform measured at the precedent measurement timing T(n−1).

The third embodiment has described the example of individually providing the CDMA communication unit (the CDMA transmission unit 2122A and the CDMA reception unit 2124A) and the OFDM communication unit (the OFDM transmission unit 2122B and the OFDM reception unit 2124B). However, it is also possible to use an aspect of forming the CDMA communication unit and the OFDM communication unit collectively as one communication unit. For example, in a radio terminal called a cognitive terminal, it is possible to switch the communication scheme by way of software by downloading software (SDR BB, Tunable RF) corresponding to the used communication scheme.

In the third embodiment, the reception parameters to be measured by the radio terminal 2100 include the amplitude error and the phase error and the EVM is calculated by the radio base station 2200. However, the radio terminal 2100 may calculate the EVM by use of the amplitude error and the phase error and transmit the EVM as the reception parameter to the radio base station 2200. In this case, the "value corresponding to the reception parameter" is the value of the EVM. Alternatively, without limitation to the case of using the EVM, it is also possible to use another reception quality index (such as the SNR, the BER or the channel estimation value).

In the third embodiment, the cellular phone terminal is shown as the example of the radio terminal 2100. However, without limitation to the cellular phone terminal, it is possible to use a terminal equipped with communication devices according to the CDMA scheme and the OFDM scheme, for example.

Although the third embodiment has described the example in which the guard interval length is a fixed length, the guard interval length may also be a variable length. For example, in the case of selectively using two types of guard intervals, namely, a short guard interval and a long guard interval longer than the short guard interval, it is preferable to measure the reception parameters (or the EVM) at the time of the long guard interval from the viewpoint of ensuring the measurement time.

In the third embodiment, the LTE has been described as the example of the radio communication system employing the OFDM scheme. However, without limitation to the LTE, it is also possible to use WiMAX standardized by IEEE 802.16, a next-generation PHS (XGP), and the like.

Fourth Embodiment

Next, a fourth embodiment of the present invention will be described. Specifically, (1) Outline of Radio Communication System, (2) Configuration of Radio Terminal, (3) Configuration of Radio Base Station, (4) Operations of Radio Communication System, (5) Effect of Fourth Embodiment, and (6) Modified Example of Fourth Embodiment will be described.

(1) Outline of Radio Communication System

Figure 20:
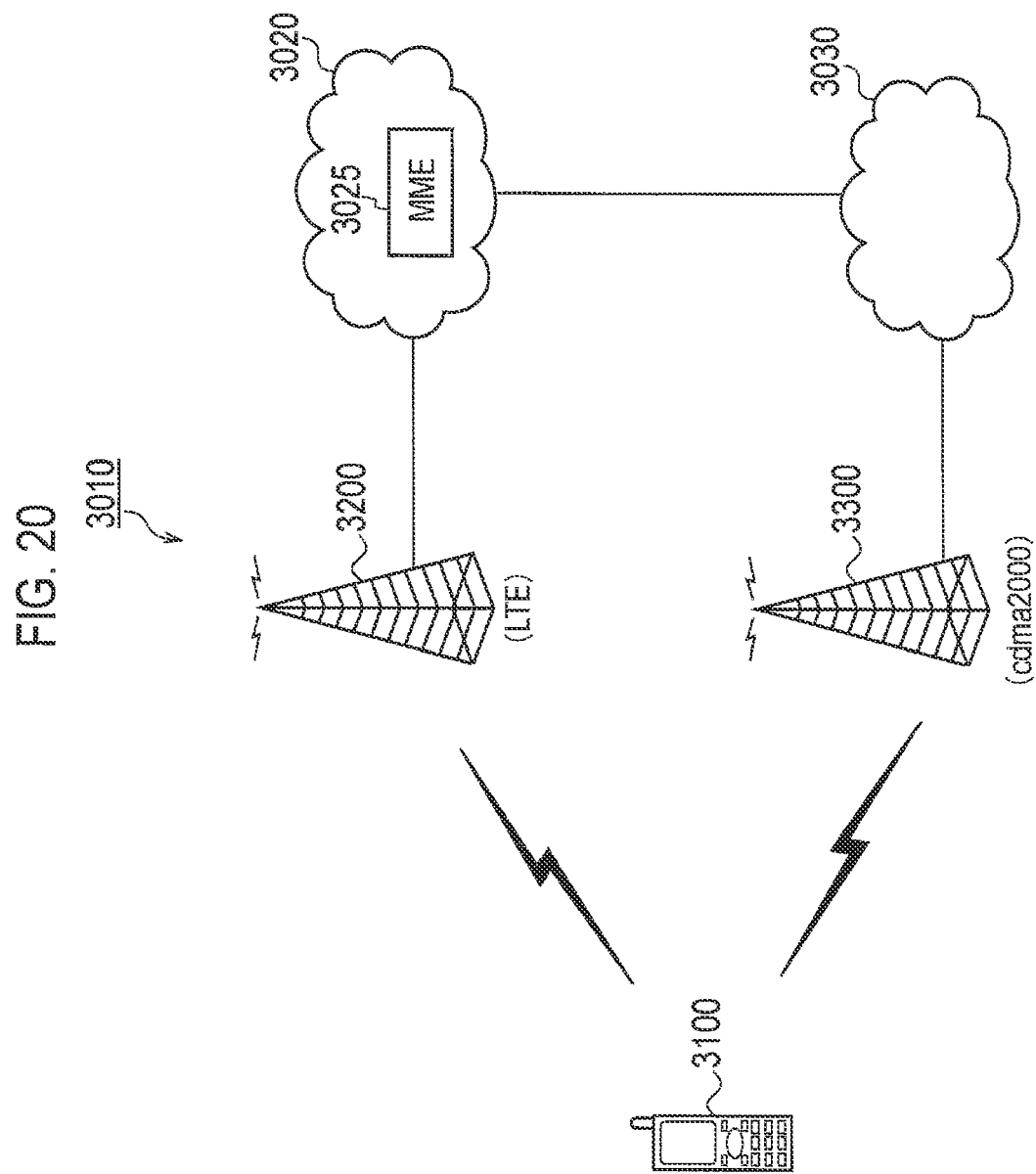
FIG. 20 is an overall schematic diagram showing a radio communication system according to a fourth embodiment.

FIG. 20 is an overall schematic diagram showing a radio communication system 3010 according to a fourth embodiment.

As shown in FIG. 20, the radio communication system 3010 includes a radio terminal 3100, a radio base station 3200, and a radio base station 3300.

In the fourth embodiment, the radio terminal 3100 is a dual terminal supporting both of a CDMA scheme and a next-generation communication scheme (a certain communication scheme). The radio base station 3200 supports the next-generation communication scheme, while the radio base station 3300 supports the CDMA scheme. Here, the next-generation communication scheme is any of the OFDM scheme and the SC-FDMA scheme. Note that an OFDMA (Orthogonal Frequency Division Multiplexing Access) scheme is assumed to be included in the OFDM scheme in this embodiment.

In the fourth embodiment, the communication standard of the next-generation communication scheme is the LTE (Long Term Evolution) standardized by the 3GPP (3rd Generation Partnership Project). In the LTE, the OFDM scheme is used for the downlink, while the SC-FDMA scheme is used for the uplink. In the following, the uplink will be mainly described.

In the fourth embodiment, the communication standard in the CDMA scheme is cdma2000 standardized by 3GPP2. In the cdma2000, the CDMA scheme is used for both of the uplink (a reverse link) and the downlink (a forward link).

The radio base station 3200 constitutes part of a LTE network (called "E-UTRAN") 3020. The radio base station 3300 constitutes part of a cdma2000 network 2030. The LTE network 3020 includes a MME (Mobility Management Entity) 3025 which is a management device configured to manage mobility of the radio terminal 3100.

The radio terminal 3100 is in a connected state of being connected to the radio base station 3200 (hereinafter referred to as an "active scheme"). Specifically, the radio terminal 3100 is connected to the radio base station 3200 and is performing communication with a communication destination device (such as a server or a communication terminal) via the radio base station 3200. The radio terminal 3100 is located in a communicatable area of the radio base station 3200 and is also located in a communicatable area of the radio base station 3300.

The OFDM scheme is the scheme configured to distribute data to multiple subcarriers that are orthogonal to one another and to modulate the subcarriers. A sender side generates the OFDM signal by subjecting each of the subcarriers either to multi-phase PSK modulation or to multi-value QAM modulation and then by subjecting each of the subcarriers to inverse fast Fourier transform (IFFT). A receiver side performs demodulation by subjecting the OFDM signal to fast Fourier transform (FFT). The OFDM scheme is not suitable for the uplink due to a high peak-to-average power ratio (PAPR). Accordingly, the SC-FDMA scheme is used for the uplink of the LTE as the technique that can reduce the PAPR. In the SC-FDMA scheme, a sender side generates a SC-FDMA signal by performing the IFFT on the transmission signal after being subjected to discrete Fourier transform (DFT).

When the radio terminal 3100 and the radio base station 3200 perform radio communication in an environment unable to see each other directly, for example, an antenna 3201 (see FIG. 24) of the radio base station 3200 receives multiple radio waves (multipath waves) taking different paths as shown in FIG. 21(*a*). In the example of FIG. 21(*a*), a path P1 directly reaching the antenna 3201 of the radio base station 3200 and paths P2 and P3 reaching the antenna 3201 of the radio base station 3200 after reflection by a building or the ground are formed between an antenna 3101 (see FIG. 23) of the radio terminal 3100 and the antenna 3201 of the radio base station 3200.

The radio wave received by the antenna 3201 of the radio base station 3200 through the path P1 is the preceding wave (the direct wave). The radio waves received by the antenna 3201 of the radio base station 3200 through the paths P2 and the P3 are the delayed waves which are delayed from the preceding wave.

As shown in FIG. 21(*b*), the radio waves on the respective paths have mutually different delay time. In the example shown in FIG. 21(*b*), the antenna 3201 of the radio base station 3200 receives the radio wave (the direct wave) on the path P1 at delay time τ1, receives the radio wave (the reflected wave) on the path P2 at delay time τ2, and receives the radio wave (the reflected wave) on the path P3 at delay time τ3. The antenna 3201 of the radio base station 3200 receives these waves collectively as the composite wave.

In the OFDM scheme and the SC-FDMA scheme, the sender side adds the redundant signal section called the guard interval to each symbol in order to absorb the delay time difference attributable to the above-described multiple paths.

FIG. 22(*a*) is a view showing a symbol structure in the SC-FDMA scheme. As shown in FIG. 22(*a*), the symbol in the SC-FDMA scheme (hereinafter the SC-FDMA symbol) includes an effective symbol section and a guard interval obtained by copying part of the effective symbol section.

By using the guard interval, if the time difference Tdmax (hereinafter referred to as the "delay time difference") between time of reception of the preceding wave and time of reception of the latest delayed wave falls within the time length of the guard interval Tg as shown in FIG. 22(*b*), the FFT functions normally on the receiver side whereby it is possible to avoid occurrence of an intersymbol interference.

On the other hand, if there arises a delayed wave exceeding the guard interval length Tg, an intersymbol interference occurs and the demodulation is not performed normally on the receiver side. Hence a large strain is generated and a communication performance is deteriorated. Accordingly, when it is estimated that there arises the intersymbol interference in the uplink, the radio base station 3200 according to the fourth embodiment causes the radio terminal 3100 to execute a handover to the radio base station 3300 supporting CDMA scheme.

(2) Configuration of Radio Terminal

Figure 23:
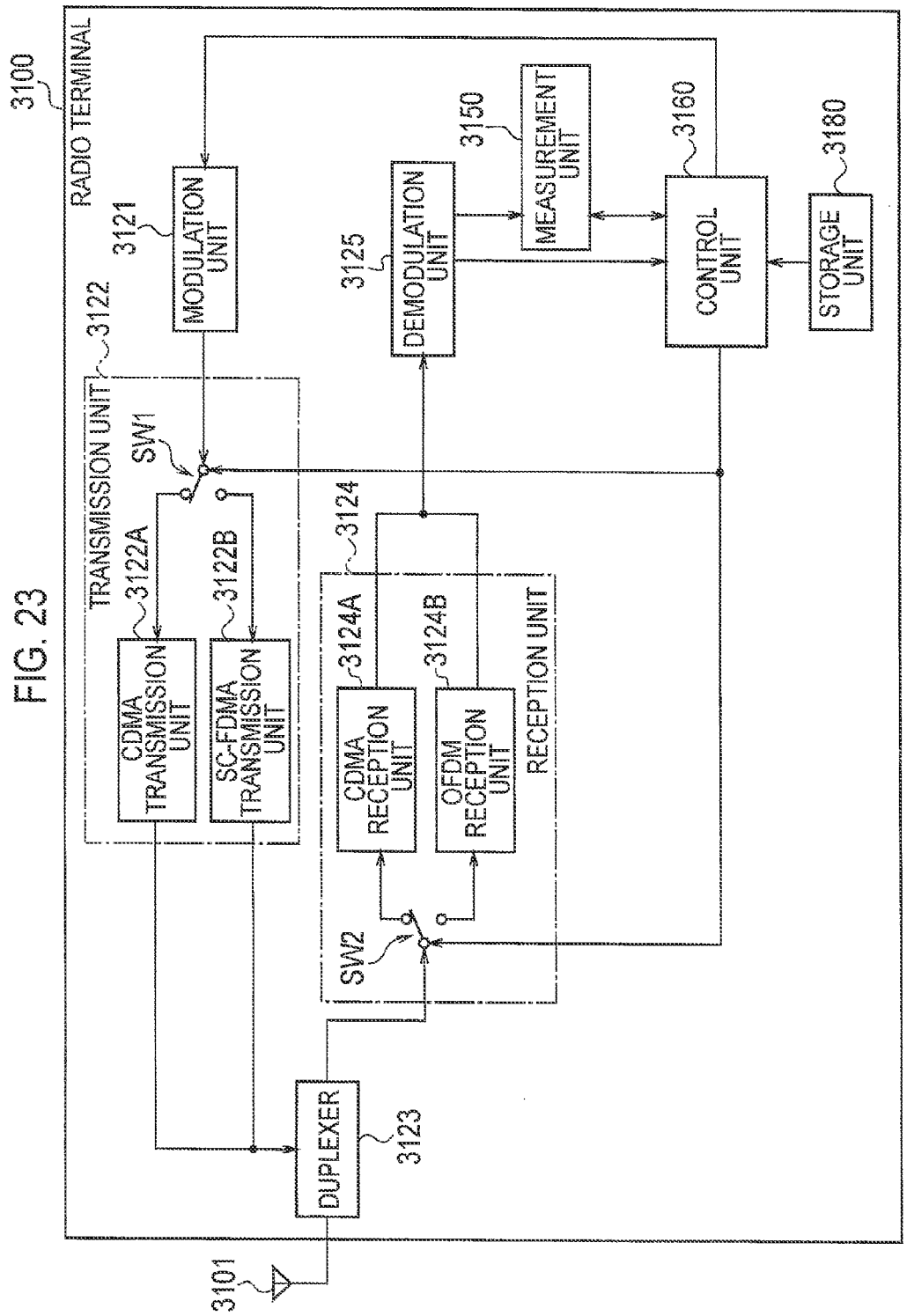
FIG. 23 is a block diagram showing a configuration of the radio terminal according to the fourth embodiment.

FIG. 23 is a block diagram showing a configuration of the radio terminal 3100.

As shown in FIG. 23, the radio terminal 3100 includes an antenna 3101, a modulation unit 3121, a transmission unit 3122, a duplexer 3123, a reception unit 3124, a demodulation unit 3125, a measurement unit 3150, a control unit 3160, and a storage unit 3180. The transmission unit 3122 includes a switch SW1, a CDMA transmission unit 3122, and an SC-FDMA transmission unit 3122B. The reception unit 3124 includes a switch SW2, a CDMA reception unit 3124A, and an OFDM reception unit 3124B.

The modulation unit 3121 modulates and encodes transmission data from the control unit 3160. The modulation unit 3121 has a configuration suitable for adaptive modulation. In the adaptive modulation, multiple modulation schemes are predetermined based on a combination of a modulation multi-value number and an encoding ratio. The modulation schemes are also called modulation classes or MCS (Modulation and Coding Scheme) levels. The modulation unit 3121 modulates and encodes the transmission data in accordance with a certain modulation scheme selected from the multiple modulation schemes.

The switch SW1 inputs the transmission data outputted from the modulation unit 3121 to any of the CDMA transmission unit 3122A or the SC-FDMA transmission unit 3122B in accordance with the control by the control unit 3160. The switch SW1 inputs the transmission data to the CDMA transmission unit 3122A when the used transmission scheme is the CDMA scheme, or inputs the transmission data to the SC-FDMA transmission unit 3122B when the used transmission scheme is the SC-FDMA scheme.

The CDMA transmission unit 3122A subjects the inputted transmission data to spread spectrum in accordance with the CDMA scheme and to conversion into a radio frequency band as well as to amplification processing, thereby generating a CDMA signal at the radio frequency band. The generated CDMA wave is transmitted via the duplexer 3123 and the antenna 3101.

The SC-FDMA transmission unit 3122B generates an SC-FDMA signal from the inputted transmission data, and performs conversion into a radio frequency band as well as amplification processing, thereby generating an SC-FDMA signal at the radio frequency band. The generated SC-FDMA signal is transmitted via the duplexer 3123 and the antenna 3101.

In the meantime, the duplexer 3123 inputs the radio signal (the CDMA signal or the OFDM signal) received by the antenna 3101 to the switch SW2 at the time of reception.

The switch SW2 inputs a radio signal from the duplexer 3123 to any of the CDMA reception unit 3124A or the OFDM reception unit 3124B in accordance with the control by the control unit 3160. The switch SW2 inputs the radio signal from the duplexer 3123 to the CDMA reception unit 3124A when the used transmission scheme is the CDMA scheme, or inputs a radio signal from the duplexer 3123 to the OFDM reception unit 3124B when the used transmission scheme is the OFDM scheme.

The CDMA reception unit 3124A subjects the inputted radio signal (the CDMA signal) to conversion into the baseband and the amplification processing, and performs inverse diffusion in accordance with the CDMA scheme. Moreover, the CDMA reception unit 3124A performs the RAKE reception which is the processing of combining the preceding wave and the delayed waves included in the received CDMA signal. In the RAKE reception, the reception quality is improved by combining the preceding wave and the delayed waves while aligning the phases thereof. The reception data thus obtained are inputted to the demodulation unit 3125.

The OFDM reception unit 3124B subjects the inputted radio signal (the OFDM signal) to conversion into the baseband and the amplification processing, and performs multi-carrier demodulation in accordance with the OFDM scheme. Moreover, the OFDM reception unit 3124B removes the guard intervals included in the received OFDM signal. The reception data thus obtained are inputted to the demodulation unit 3125.

The demodulation unit 3125 demodulates and decodes the inputted reception data. The demodulation unit 3125 demodulates and decodes the reception data in accordance with a method corresponding to the certain modulation scheme selected from the multiple modulation schemes. Moreover, the demodulation unit 3125 subjects the inputted reception data to the symbol determination.

The CDMA measurement unit 3150 measures the reception quality of the CDMA signal. In the fourth embodiment, the received signal strength indicator (RSSI) is used as the reception quality of the CDMA signal. However, without limitation to the RSSI, it is also possible to use the received SNR (Signal to Noise ratio) and the like. The RSSI measured by the CDMA measurement unit 3150 is inputted to the control unit 3160.

The control unit 3160 is formed by use of a CPU, for example, and is configured to control various functions incorporated in the radio terminal 3100. The storage unit 3180 is formed by use of a memory, for example, and is configured to store a variety of information used for the control by the control unit 3160.

The control unit 3160 controls the switches SW1, 2. The control unit 3160 switches between the switches SW1, 2 when switching the used communication scheme between the OFDM scheme and a next-generation communication scheme (SC-FDMA scheme, OFDM scheme). Moreover, the control unit 3160 may temporarily switches between the switches SW1, 2, when measuring the RSSI of the CDMA signal during the next-generation communication.

The control unit 3160 inputs the RSSI (hereinafter measured RSSI) measured by the measurement unit 3150 to the modulation unit 3221. The SC-FDMA transmission unit 3122B transmits the measured RSSI after the modulation to the radio base station 3200. Such a report on the measurement results is called a "Measurement Report".

The control unit 3160 operates the measurement unit 3150 in response to the instruction from the radio base station 3200, and executes the handover for switching from the radio base station 3200 to the radio base station 3300.

(3) Configuration of Radio Base Station

Figure 24:
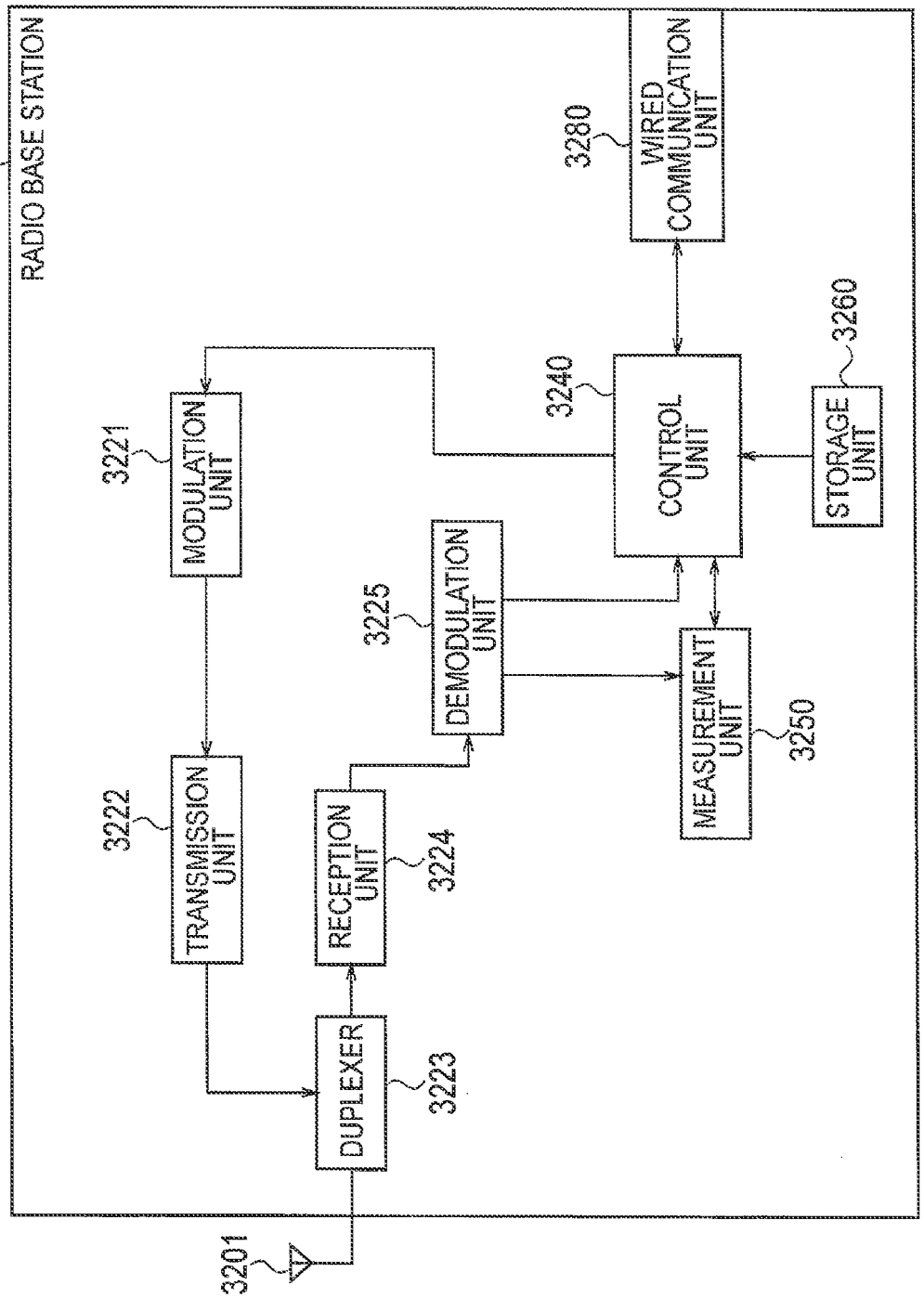
FIG. 24 is a block diagram showing a configuration of a radio base station according to the fourth embodiment.

FIG. 24 is a block diagram showing a configuration of the radio base station 3200.

As shown in FIG. 24, the radio base station 3200 includes an antenna 3201, a modulation unit 3221, a transmission unit 3222, a duplexer 3223, a reception unit 3224, a demodulation unit 3225, a control unit 3240, a measurement unit 3250, a storage unit 3260, and a wired communication unit 3280.

The modulation unit 3221 modulates and encodes the transmission data from the control unit 3240. The modulation unit 3221 modulates and encodes the transmission data based on the certain modulation scheme selected from the multiple modulation schemes in accordance with the adaptive modulation.

The CDMA transmission unit 3122 subjects the inputted transmission data to multi-carrier modulation in accordance with the OFDM scheme and to conversion into a radio frequency band as well as to amplification processing, thereby generating an OFDM signal at the radio frequency band. The generated OFDM signal is transmitted via the duplexer 3123 and the antenna 3201.

Meanwhile, at the time of reception, the duplexer 3223 inputs the SC-FDMA signal received by the antenna 3201 to the reception unit 3224. The reception unit 3224 subjects the inputted SC-FDMA signal to conversion into the baseband and the amplification processing, and performs demodulation in accordance with the SC-FDMA scheme. Moreover, the reception unit 3224 removes the guard intervals included in the received SC-FDMA signal. The reception data thus obtained are inputted to the demodulation unit 3225.

The demodulation unit 3225 demodulates and decodes the inputted reception data. The demodulation unit 3225 demodulates and decodes the reception data in accordance with a method corresponding to the certain modulation scheme selected from the multiple modulation schemes. Moreover, the demodulation unit 3225 subjects the inputted reception data to the symbol determination.

Figure 25:
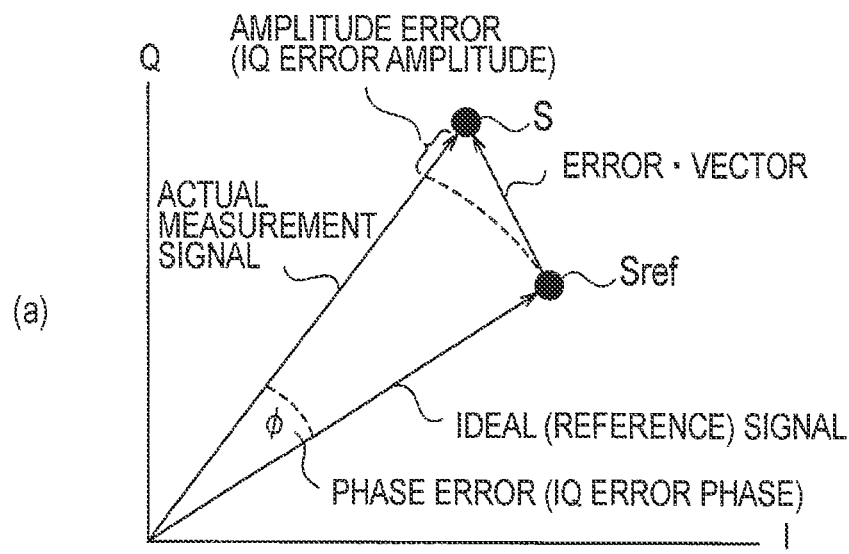
FIG. 25 is a view for explaining EVM and an EVM threshold according to the fourth embodiment.

The measurement unit 3250 measures a reception parameter which indicates a time difference between the preceding wave and the delayed waves of the received SC-FDMA signal. In the fourth embodiment, the reception parameter is the EVM (Error Vector Magnitude) which is calculated by use of an amplitude error and a phase error between a SC-FDMA symbol S included in the received SC-FDMA signal and a reference point Sref of the SC-FDMA symbol as shown in FIG. 25($a$). The value of the EVM grows larger as the delay time difference Tdmax exceeds the guard interval Tg by a larger degree. The EVM measured by the measurement unit 3250 is inputted to the control unit 3240.

The control unit 3240 is formed by use of a CPU, for example, and is configured to control various functions incorporated in the radio base station 3200. The storage unit 3260 is formed by use of a memory, for example, and is configured to store a variety of information used for the control by the control unit 3240. The wired communication unit 3280 performs communication with the LTE network 3020 side.

The control unit 3240 transmits the measurement instruction for the RSSI of the CDMA signal to the radio terminal 3100 by using the transmission unit 3222. In the fourth embodiment, the transmission unit 3222 transmits the measurement instruction either periodically or upon occurrence of a predetermined trigger.

The storage unit 3260 stores the neighbor list in advance, which includes the information on the radio base stations located near the radio base station 3200. In the fourth embodiment, the neighbor list includes the IDs, the used channel information, and the like of the radio base stations (such as the radio base station 3300) supporting the CDMA scheme. The control unit 3240 incorporates the neighbor list in the measurement instruction and transmits the information from the transmission unit 3222.

The control unit 3240 acquires the RSSI measured by the radio terminal 3100 in response to the measurement instruction via the reception unit 3224 and the demodulation unit 3225. The control unit 3240 determines whether or not to cause the radio terminal 3100 to perform the handover based on the acquired measured RSSI.

Specifically, the control unit 3240 compares the measured EVM with the EVM threshold. The EVM threshold is determined based on the guard interval used in the SC-FDMA scheme and is stored in advance in the storage unit 3260. The EVM threshold is preset to the value of the EVM when the delay time difference Tdmax exceeds the guard interval Tg. The value of the EVM at which the delay time difference Tdmax exceeds the guard interval Tg can be obtained on an experimental or an empirical basis.

In the fourth embodiment, the EVM threshold is provided for each of the modulation schemes to be used in the adaptive modulation. As shown in FIG. 25($a$), the EVM is also referred to as the modulation accuracy, which represents an effective value of an error vector based on the amount of deviation (EVM) for the phase and the amplitude of the observed symbol point S from the symbol reference point Sref where the symbol point is supposed to be located and is expressed as square root percentage of average power of an ideal signal. FIG. 25($c$) shows a calculation formula for the EVM.

The storage unit 3260 stores a table which links the modulation schemes with the EVM thresholds as shown in FIG. 25($b$). A modulation scheme which can achieve communication at a higher speed (a modulation scheme involving a larger bit number per symbol) has stricter restrictions on phase and amplitude errors. Accordingly, the EVM threshold is set to a lower value as the modulation scheme can achieve communication at a higher speed.

The control unit 3240 acquires the EVM threshold from the storage unit 3260 based on the modulation scheme used for the uplink and compares the EVM threshold with the calculated EVM.

Moreover, the control unit 3240 compares the measured RSSI of the CDMA signal with a predetermined value so as to determine whether or not the CDMA reception quality is favorable. When the measured RSSI is higher than the predetermined value, it is possible to assume that the reception quality is favorable. The predetermined value is preset to the value of the RSSI with which the radio terminal 3100 can execute the communication.

When the calculated EVM exceeds the EVM threshold and the RSSI is higher than the predetermined value, the control unit 3240 of the radio base station 3200 decides to cause the radio terminal 3100 to execute the handover to the radio base station (such as the radio base station 3300) supporting the CDMA scheme. When causing the radio terminal 3100 to carry out the handover, the control unit 3240 transmits an instruction for the handover to the radio terminal 3100 by use of the transmission unit 3222 after checking that the handover is feasible.

(4) Operations of Radio Communication System

Next, operations of the radio communication system 3010 will be described by using (4. 1) Operation Pattern 1 and (4. 2) Operation Pattern 2 as examples. In the fourth embodiment, the operations of the radio communication system 3010 are based on the 3GPP TS36.300 standards and the like. The operation pattern 1 is an operation pattern configured to cause the radio terminal 3100 to measure the RSSI of the CDMA signal periodically. The operation pattern 2 is an operation pattern configured to cause the radio terminal 3100 to measure the RSSI of the CDMA signal by using a certain event as a trigger.

(4. 1) Operation Pattern 1

Figure 26:
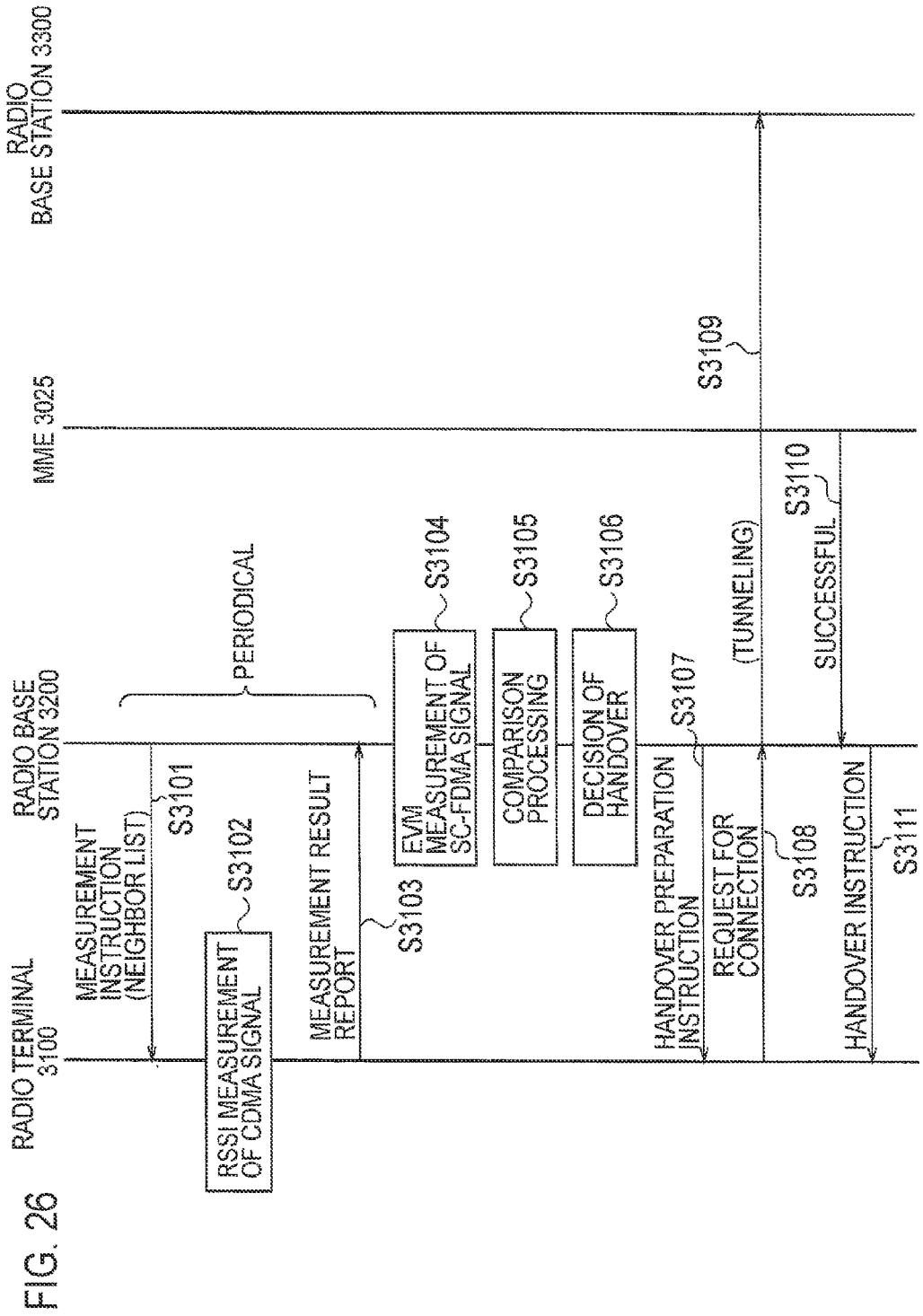
FIG. 26 is a sequence chart showing an operation pattern 1 of the radio communication system according to the fourth embodiment.

FIG. 26 is a sequence chart showing an operation pattern 1 of the radio communication system 3010. This sequence is executed when the radio terminal 3100 is in an active scheme.

In step S3101, the transmission unit 3222 of the radio base station 3200 transmits the measurement instruction to the radio terminal 3100. The above-described neighbor list is included in the measurement instruction. The OFDM reception unit 3124B of the radio terminal 3100 receives the measurement instruction.

In step S3102, the control unit 3160 of the radio terminal 3100 causes the measurement unit 3150 to measure the RSSI of the CDMA signal for each of the CDMA-supporting base stations corresponding to the IDs included in the neighbor list.

In step S3103, the SC-FDMA transmission unit 3122B of the radio terminal 3100 transmits a measurement result report including the RSSI measured by the measurement unit 3150 to the radio base station 3200. The reception unit 3224 of the radio base station 3200 receives the measurement result report (the measured RSSI).

In step S3104, the measurement unit 3150 of the radio base station 3200 measures the EVM of the SC-FDMA signal received from the radio terminal 3100 by the reception unit 3224.

In step S3105, the control unit 3240 of the radio base station 3200 compares the EVM measured by the measurement unit 3150 with the EVM threshold corresponding to the modulation scheme. Meanwhile, the control unit 3240 of the radio base station 3200 compares the measured RSSI, which is received by the reception unit 3224 and demodulated by the demodulation unit 3225, with the predetermined value.

When the measured EVM exceeds the EVM threshold and the measured RSSI is higher than the predetermined value, the control unit 3240 of the radio base station 3200 decides to cause the radio terminal 3100 to execute the handover to the CDMA-supporting radio base station (step S3106). On the other hand, when the measured EVM falls below the EVM threshold or when the measured RSSI is equal to or below the predetermined value, the control unit 3240 of the radio base station 3200 decides not to cause the radio terminal 3100 to execute the handover to the CDMA-supporting radio base station.

Here, when there are multiple CDMA-supporting radio base stations having the measured RSSI higher than the predetermined value in the case where the measured EVM exceeds the EVM threshold, it is preferable that the control unit 3240 of the radio base station 3200 determine the CDMA-supporting radio base station having the highest measured RSSI as a handover destination. In the following, a case of causing the radio terminal 3100 to execute the handover to the radio base station 3300 will be described.

In step S3107, the transmission unit 3222 of the radio base station 3200 transmits a handover preparation instruction to the radio terminal 3100. The OFDM reception unit 3124B of the radio terminal 3100 receives the handover preparation instruction.

In step S3108, the SC-FDMA transmission unit 3122B of the radio terminal 3100 transmits a request for connection to the radio base station 3300 to the radio base station 3200. This request for connection is forwarded to the radio base station 3300 by tunneling under the supervision of the MME 3025 (step S3109). When the request for connection is successful, the MME 3025 notifies the radio base station 3200 of the fact (step S3110).

In step S3111, the radio base station 3200 transmits an instruction for the handover to the radio base station 3300 to the radio terminal 3100 in response to the notification from the MME 3025. Upon receipt of the instruction for the handover to the radio base station 3300, the radio terminal 3100 executes the handover to the radio base station 3300.

(4. 2) Operation Pattern 2

Figure 27:
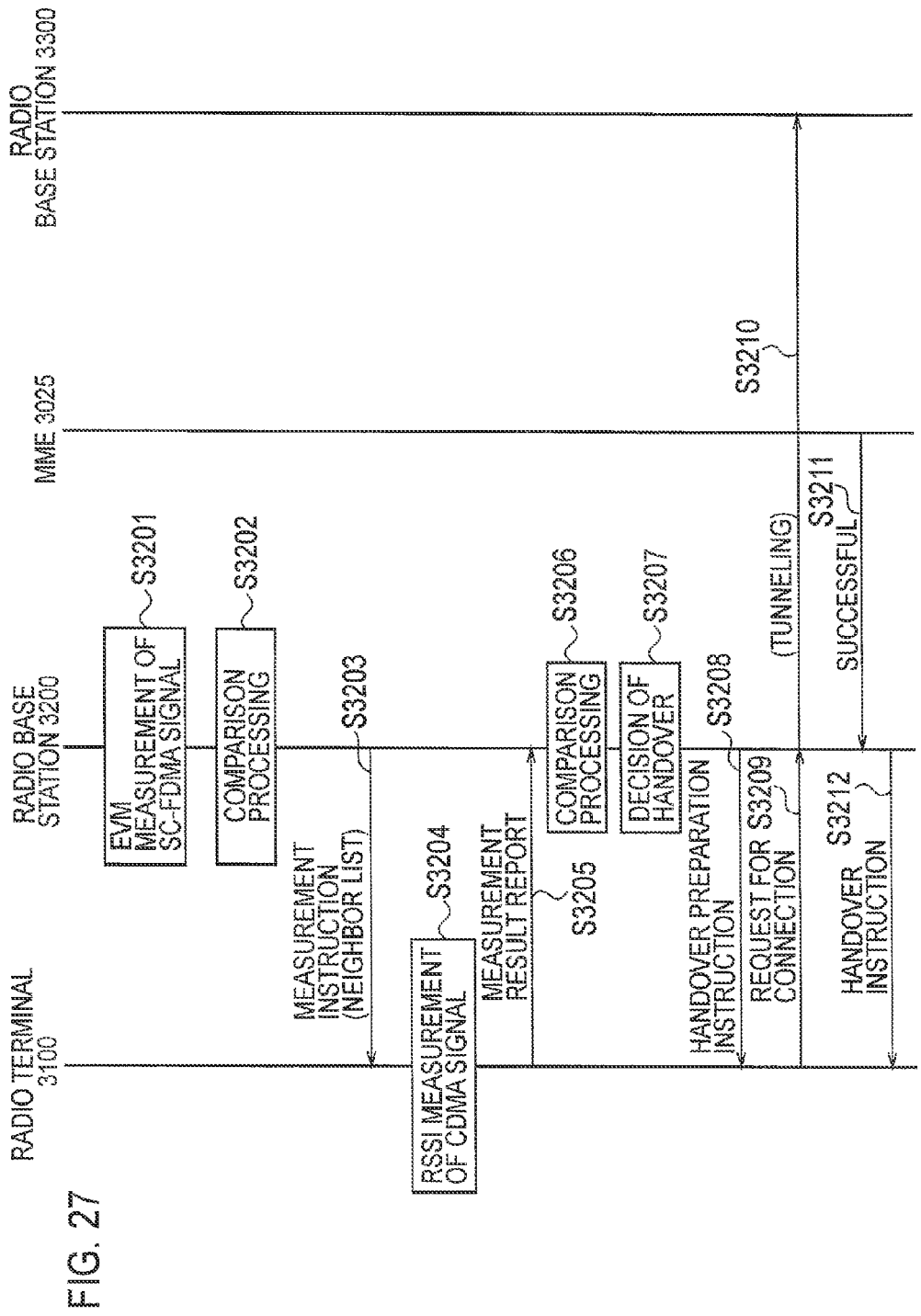
FIG. 27 is a sequence chart showing an operation pattern 2 of the radio communication system according to the fourth embodiment.

FIG. 27 is a sequence chart showing an operation pattern 2 of the radio communication system 3010. This sequence is executed when the radio terminal 3100 is in an active scheme.

In step S3201, the control unit 3240 of the radio base station 320 causes the measurement unit 3250 to measure the SC-FDMA signal received from the radio terminal 3100 by the reception unit 3224.

In step S3202, the control unit 3240 of the radio base station 3200 compares the EVM measured by the measurement unit 3250 with the EVM threshold corresponding to the modulation scheme of the uplink.

When the measured EVM exceeds the EVM threshold, the control unit 3240 of the radio base station 3200 causes the transmission unit 3222 to transmit a RSSI measurement instruction to the radio terminal 3100 in step S3203. The above-described neighbor list is included in the measurement instruction. The OFDM reception unit 3124B of the radio terminal 3100 receives the measurement instruction.

In step S3204, the control unit 3160 of the radio terminal 3100 causes the measurement unit 3150 to measure the RSSI of the CDMA signal for each of the CDMA-supporting base stations corresponding to the IDs included in the neighbor list.

In step S3205, the SC-FDMA transmission unit 3122B of the radio terminal 3100 transmits the measurement result report including the RSSI measured by the measurement unit 3150 to the radio base station 3200. The reception unit 3224 of the radio base station 3200 receives the measurement result report (the measured RSSI).

In step S3206, the control unit 3240 of the radio base station 3200 compares the measured RSSI, which is received by the reception unit 3224 and demodulated by the demodulation unit 3225, with the predetermined value.

When the measured RSSI is higher than the predetermined value, the control unit 3240 of the radio base station 3200 decides to cause the radio terminal 3100 to execute the handover to the CDMA-supporting radio base station (step S3207). On the other hand, when the measured RSSI is equal to or below the predetermined value, the control unit 3240 of the radio base station 3200 decides not to cause the radio terminal 3100 to execute the handover to the CDMA-supporting radio base station. Here, when there are multiple CDMA-supporting radio base stations having the measured RSSI higher than the predetermined value, it is preferable that the control unit 3240 of the radio base station 3200 determine the CDMA-supporting radio base station having the highest measured RSSI as the handover destination.

Each processing in steps S3208 to S3212 is executed as similar to the operation pattern 1.

(5) Effect of Fourth Embodiment

According to the fourth embodiment, the control unit 3240 of the radio base station 3200 decides to cause the radio terminal 3100 to execute the handover to the radio base station 3300 when the EVM of the SC-FDMA signal exceeds the EVM threshold and the measured RSSI is higher than the predetermined value. Here, the EVM reflects the delay time difference Tdmax between the preceding wave and the delayed waves of the SC-FDMA signal and the EVM threshold is set to the value of the EVM when the delay time difference Tdmax exceeds the guard interval Tg. The state of the measured EVM exceeding the EVM threshold means that the delay time difference Tdmax exceeds the guard interval length Tg.

Accordingly, under the situation where the delay time difference Tdmax of the SC-FDMA signal is estimated to exceed the guard interval length Tg, it is possible to avoid an intersymbol interference and to prevent deterioration in the communication performance by causing the radio terminal 3100 to execute the handover to the radio base station 3300 supporting the CDMA scheme after checking that a reception level of the CDMA signal is favorable. Moreover, it is possible to utilize the excellent communication performance of the next-generation communication scheme until the delay time difference Tdmax is estimated to exceed the guard interval Tg.

Therefore, the radio terminal 3100 supporting both of the CDMA scheme and the next-generation communication scheme can prevent deterioration in the communication performance due to the intersymbol interference while utilizing the next-generation communication scheme in the active scheme.

Furthermore, the CDMA reception unit 3124A of the radio terminal 3100 can perform the RAKE reception in which the preceding wave and the delayed waves in the CDMA signal are combined. Accordingly, it is possible to achieve high resistance to the multi-path environment and to obtain a path diversity effect by the RAKE reception. Therefore, it is possible to utilize the characteristic of the CDMA scheme and to effectively suppress deterioration in the communication performance by switching the used communication scheme from the next-generation communication scheme to the CDMA scheme.

Meanwhile, the EVM has the advantageous features that it can be measured with a smaller amount of operation and that a shorter time is required for the measurement as compared to other reception quality indices including the SNR (Signal to Noise ratio), the BER (Bit Error Rate), the channel estimation value, and the like. For this reason, by using the EVM, it is possible to estimate whether or not the delay time difference Tdmax exceeds the guard interval length Tg easily and instantaneously.

In the fourth embodiment, the control unit 3240 sets the EVM threshold corresponding to the modulation scheme used for the uplink radio communication. Accordingly, it is possible to set the EVM threshold value appropriately even when using the adaptive modulation in the uplink.

(6) Modified Examples of Fourth Embodiment

Figure 28:
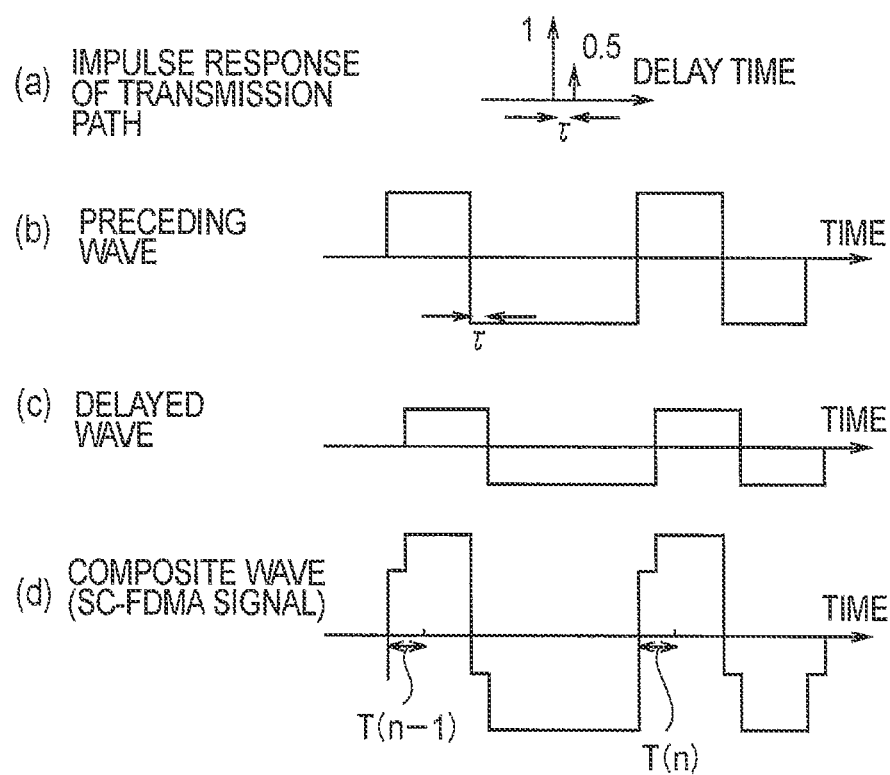
FIG. 28 is a view for explaining waveform measurement processing according to a modified example of the fourth embodiment.

It is also possible to measure the EVM of the SC-FDMA signal only when the state of the voltage waveform of the received SC-FDMA signal satisfies a certain condition. FIG. 28 shows waveform measurement processing by the measurement unit 3250. In the example of FIG. 28, the delay time difference is equal to τ as shown in FIG. 28(*a*), and the preceding wave shown in FIG. 28(*b*) is combined with the delayed wave shown in FIG. 28(*c*), and the SC-FDMA signal shown in FIG. 28(*d*) is received. The measurement unit 3250 specifies the guard interval period of the preceding wave based on a result of symbol synchronization, for example, and measures the state of the voltage waveform (a voltage value) of the SC-FDMA signal at measurement timing corresponding to the guard interval period. The measurement is performed at each measurement timing corresponding to each of the guard interval periods. The measurement unit 3250 determines whether or not the state of the voltage waveform measured at the current measurement timing T(n) is equal to the state of the voltage waveform measured at the measurement timing precedent to the current measurement timing (hereinafter referred to as the "precedent measurement timing") T(n−1). The measurement unit 3250 omits the measurement of the EVM when the state of the voltage waveform measured at the current measurement timing T(n) is equal to the state of the voltage waveform measured at the precedent measurement timing T(n−1), or executes the measurement of the EVM when the state of the voltage waveform measured at the current measurement timing T(n) is different from the state of the voltage waveform measured at the precedent measurement timing T(n−1). In the case of performing the determination only by use of the EVM, there is a risk of erroneous determination if the EVM varies due to a factor (such as a circuit factor) other than a change in the multipath state. Accordingly, it is possible to improve determination accuracy by measuring the EVM only when the state of the voltage waveform measured at the current measurement timing T(n) is different from the state of the voltage waveform measured at the precedent measurement timing T(n−1).

The fourth embodiment has described the example of individually providing the CDMA communication unit (the CDMA transmission unit 3122A and the CDMA reception unit 3124A) and the communication unit of the next-generation communication scheme (the SC-FDMA transmission unit 3122B and the OFDM reception unit 3124B). However, it is also possible to use an aspect of forming these communication units collectively as one communication unit. For example, in a radio terminal called a cognitive terminal, it is possible to switch the communication scheme by way of software by downloading software (SDR BB, Tunable RF) corresponding to the used communication scheme.

Although the fourth embodiment has described the example in which the guard interval length is a fixed length, the guard interval length may also be a variable length. For example, in the case of selectively using two types of guard intervals, namely, a short guard interval and a long guard interval longer than the short guard interval, it is preferable to measure the EVM at the time of the long guard interval from the viewpoint of ensuring the measurement time.

In the fourth embodiment, the reception parameter to be measured by the measurement unit 3250 is the EVM. However, without limitation to the EVM, it is also possible to use another reception quality index (such as the SNR, the BER or the channel estimation value).

In the fourth embodiment, the cellular phone terminal is shown as the example of the radio terminal 3100. However, without limitation to the cellular phone terminal, it is possible to use a terminal equipped with communication devices according to the CDMA scheme and the next-generation communication scheme, for example.

In the fourth embodiment, the LTE has been described as the example of the radio communication system employing the OFDM scheme. However, without limitation to the LTE, it is also possible to use WiMAX standardized by IEEE 802.16, a next-generation PHS (XGP), and the like. In the LTE, the SC-FDMA scheme is used for the uplink, while in the WiMAX or the like, the OFDM scheme is used for the uplink.

Fifth Embodiment

Next, a fifth embodiment of the present invention will be described. Specifically, (1) Outline of Radio Communication System, (2) Configuration of Radio Terminal, (3) Configuration of Radio Base Station, (4) Operations of Radio Communication System, (5) Effect of Fifth Embodiment, and (6) Modified Example of Fifth Embodiment will be described.

(1) Outline of Radio Communication System

Figure 29:
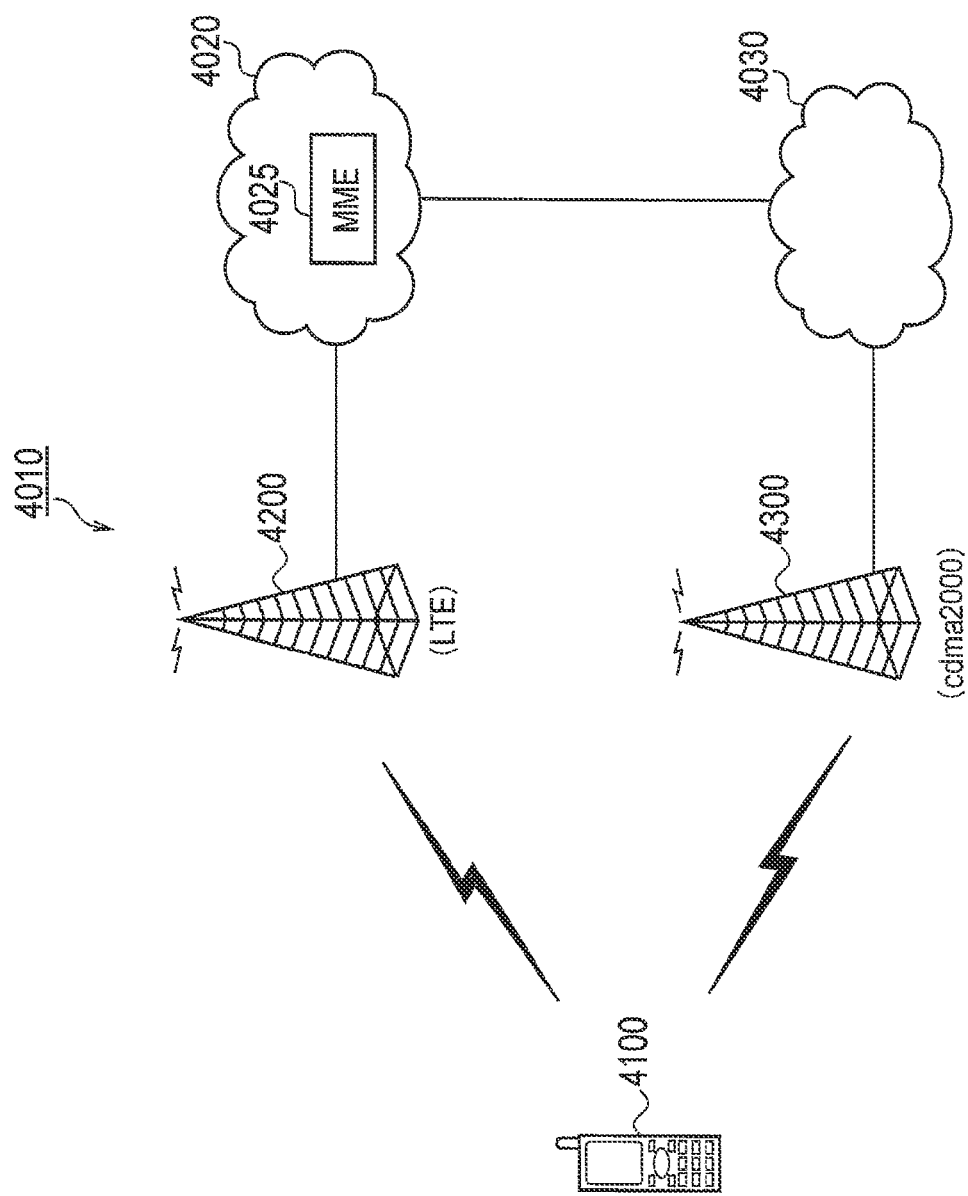
FIG. 29 is an overall schematic diagram showing a radio communication system according to a fifth embodiment.

FIG. 29 is an overall schematic diagram showing a radio communication system 4010 according to a fifth embodiment.

As shown in FIG. 29, the radio communication system 4010 includes a radio terminal 4100, a radio base station 4200 (a first radio base station), and a radio base station 4300 (a second radio base station).

The radio terminal 4100 is a dual terminal which supports both of the CDMA scheme and the OFDM scheme. The radio base station 4200 supports the OFDM scheme while the radio base station 4300 supports the CDMA scheme. Note that the OFDMA (Orthogonal Frequency Division Multiplexing Access) scheme is assumed to be included in the OFDM scheme in this embodiment.

In the fifth embodiment, the communication standard of the OFDM scheme is the LTE (Long Term Evolution) standardized by the 3GPP (3rd Generation Partnership Project). In the LTE, the OFDM scheme is used for the downlink. In the following, the downlink will be mainly described. Meanwhile, in the fifth embodiment, the communication standard in the CDMA scheme is cdma2000 standardized by 3GPP2. In the cdma2000, the CDMA scheme is used for both of the uplink (a reverse link) and the downlink (a forward link).

The radio base station 4200 constitutes part of a LTE network (called "E-UTRAN") 4020. The radio base station 4300 constitutes part of a cdma2000 network 4030. The LTE network 4020 includes a MME (Mobility Management Entity) 4025 which is a management device configured to manage mobility of the radio terminal 4100.

The radio terminal 4100 is in a connected state of being connected to the radio base station 4200 (hereinafter referred to as an "active scheme"). Specifically, the radio terminal 4100 is connected to the radio base station 4200 and is performing communication with a communication destination device (such as a server or a communication terminal) via the radio base station 4200. The radio terminal 4100 is located in a communicatable area of the radio base station 4200 and is also located in a communicatable area of the radio base station 4300.

The OFDM scheme is the scheme configured to distribute data to multiple subcarriers that are orthogonal to one another and to modulate the subcarriers. A sender side generates the OFDM signal by subjecting each of the subcarriers either to multi-phase PSK modulation or to multi-value QAM modulation and then by subjecting each of the subcarriers to inverse fast Fourier transform (IFFT). A receiver side performs demodulation by subjecting the OFDM signal to fast Fourier transform (FFT).

Figure 30:
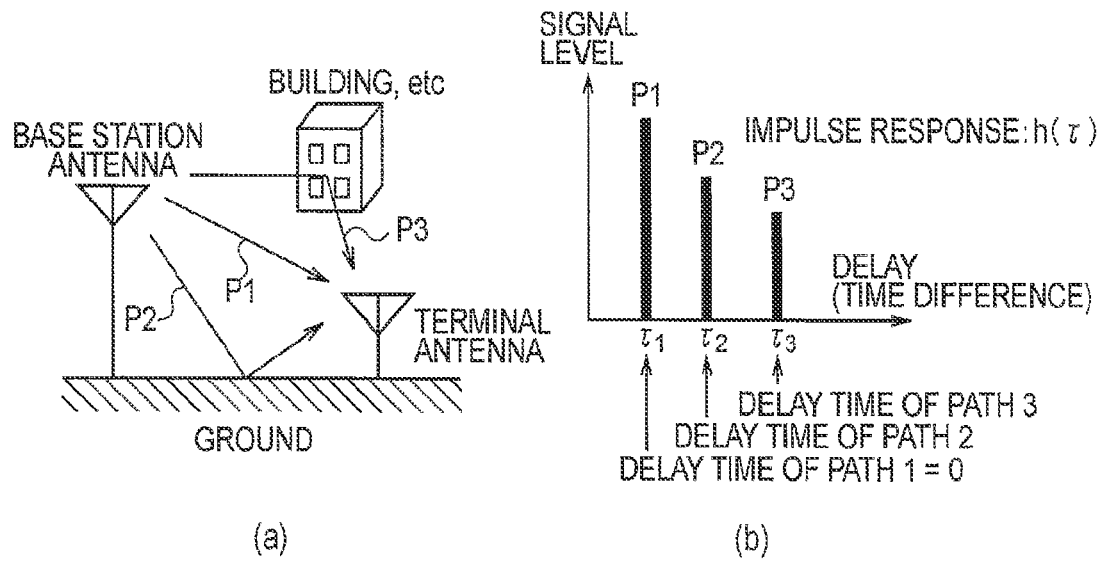
FIG. 30 is a view for explaining an OFDM signal to be received by a radio terminal according to the fifth embodiment.

When the radio terminal 4100 and the radio base station 4200 perform radio communication in an environment unable to see each other directly, for example, an antenna 4101 (see FIG. 32) of the radio terminal 4100 receives multiple radio waves (multipath waves) taking different paths as shown in FIG. 30(a). In the example of FIG. 30(a), a path P1 directly reaching the antenna 4201 of the radio terminal 4100 and paths P2 and P3 reaching the antenna 4101 of the radio terminal 4100 after reflection by a building or the ground are formed between an antenna 4201 (see FIG. 33) of the radio base station 4200 and the antenna 4101 of the radio terminal 4100.

The radio wave received by the antenna 4101 of the radio terminal 4100 through the path P1 is the preceding wave (the direct wave). The radio waves received by the antenna 4101 of the radio terminal 4100 through the paths P2 and the P3 are the delayed waves which are delayed from the preceding wave.

As shown in FIG. 30(b), the radio waves on the respective paths have mutually different delay time. In the example shown in FIG. 30(b), the antenna 4101 of the radio terminal 4100 receives the radio wave (the direct wave) on the path P1 at delay time τ1, receives the radio wave (the reflected wave) on the path P2 at delay time τ2, and receives the radio wave (the reflected wave) on the path P3 at delay time τ3. The antenna 4101 of the radio terminal 4100 receives these waves collectively as the composite wave.

In the OFDM scheme, the sender side adds the redundant signal section called the guard interval to each symbol in order to absorb the delay time difference attributable to the above-described multiple paths.

FIG. 31(a) is a view showing a symbol structure in the OFDM scheme. As shown in FIG. 31(a), the symbol in the OFDM scheme (hereinafter the OFDM symbol) includes the effective symbol section in a finite time generated by the IFFT and the guard interval obtained by copying part of the effective symbol section.

By using the guard interval, if the time difference Tdmax (hereinafter referred to as the "delay time difference") between time of reception of the preceding wave and time of reception of the latest delayed wave falls within the time length of the guard interval Tg as shown in FIG. 31(b), the FFT functions normally on the receiver side whereby it is possible to avoid occurrence of an intersymbol interference.

On the other hand, if there arises a delayed wave exceeding the guard interval length Tg, an intersymbol interference occurs and the FFT does not function normally on the receiver side. Hence a large strain is generated and a communication performance is deteriorated. Accordingly, when it is estimated that there arises the intersymbol interference at the radio terminal 4100, the radio base station 4200 according to the fifth embodiment causes the radio terminal 4100 to execute a handover from the radio base station 4200 to the radio base station 4300.

(2) Configuration of Radio Terminal

Figure 32:
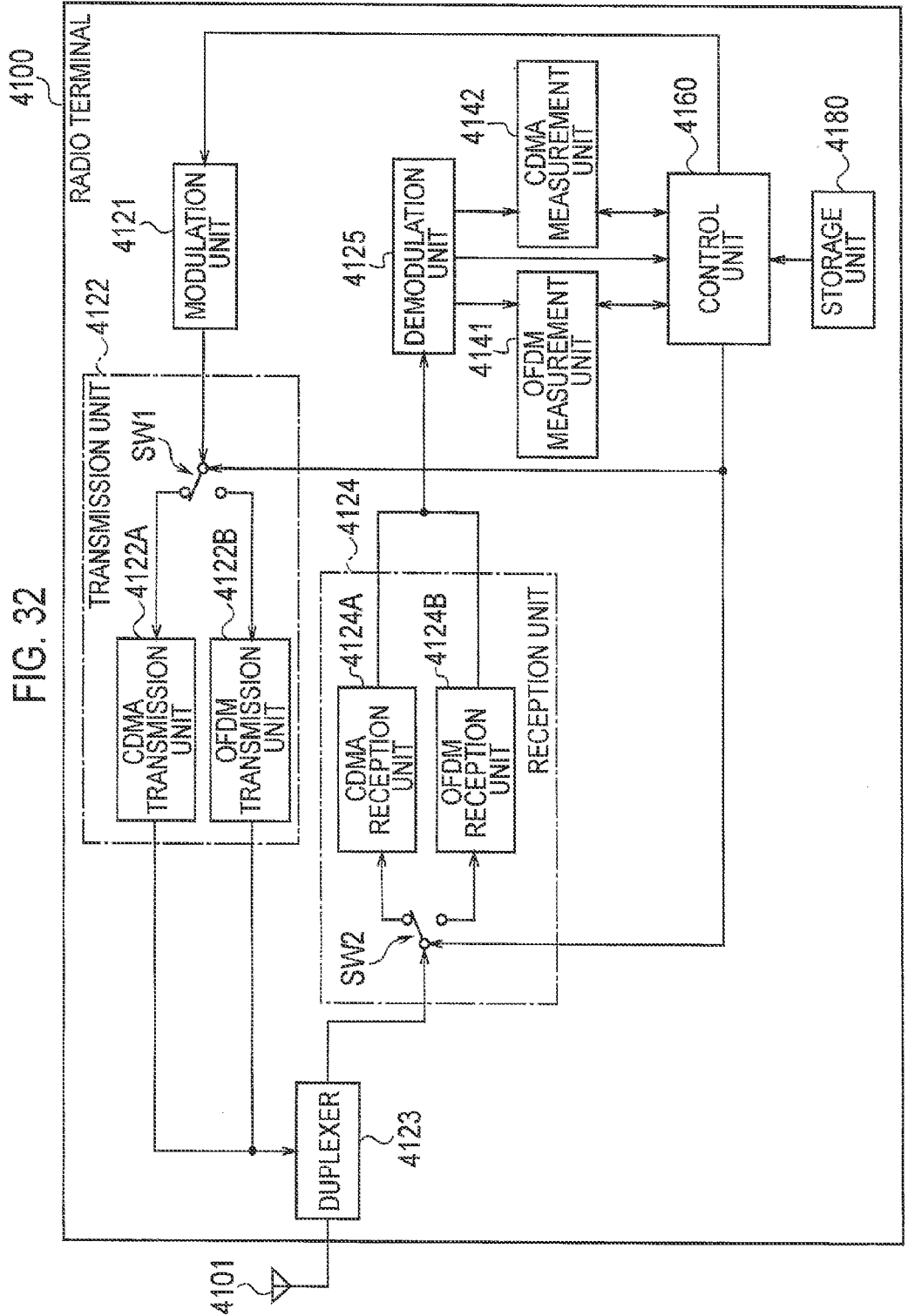
FIG. 32 is a block diagram showing a configuration of the radio terminal according to the fifth embodiment.

FIG. 32 is a block diagram showing a configuration of the radio terminal 4100.

As shown in FIG. 32, the radio terminal 4100 includes an antenna 4101, a modulation unit 4121, a transmission unit 4122 (terminal transmission unit), a duplexer 4123, a reception unit 4124 (terminal reception unit), a demodulation unit 4125, an OFDM measurement unit 4141 (a first measurement unit), a CDMA measurement unit 4142 (a second measurement unit), a control unit 4160, and a storage unit 4180. The transmission unit 4122 includes a switch SW1, a CDMA transmission unit 4122A, and an OFDM transmission unit 4122B. The reception unit 4124 includes a switch SW2, a CDMA reception unit 4124A, and an OFDM reception unit 4124B.

The modulation unit 4121 modulates and encodes transmission data from the control unit 4160. The modulation unit 4121 has a configuration suitable for adaptive modulation. In the adaptive modulation, multiple modulation schemes are predetermined based on a combination of a modulation multi-value number and an encoding ratio. The modulation schemes are also called modulation classes or MCS (Modulation and Coding Scheme) levels. The modulation unit 4121 modulates and encodes the transmission data in accordance with a certain modulation scheme selected from the multiple modulation schemes.

The switch SW1 inputs the transmission data outputted from the modulation unit 4121 to any of the CDMA transmission unit 4122A or the OFDM transmission unit 4122B in accordance with the control by the control unit 4160. The switch SW1 inputs the transmission data to the CDMA transmission unit 4122A when the used transmission scheme is the CDMA scheme, or inputs the transmission data to the OFDM transmission unit 4122B when the used transmission scheme is the OFDM scheme.

The CDMA transmission unit 4122A subjects the inputted transmission data to spread spectrum in accordance with the CDMA scheme and to conversion into a radio frequency band as well as to amplification processing, thereby generating a CDMA signal at the radio frequency band. The generated CDMA signal is transmitted via the duplexer 4123 and the antenna 4101.

The OFDM transmission unit 4122B subjects the inputted transmission data to multi-carrier modulation in accordance with the OFDM scheme and to conversion into a radio frequency band as well as to amplification processing, thereby generating an OFDM signal at the radio frequency band. The generated OFDM signal is transmitted via the duplexer 4123 and the antenna 4101.

The duplexer 4123 inputs the radio signal (either the CDMA signal or the OFDM signal) to the antenna 4101. Meanwhile, at the time of reception, the duplexer 4123 inputs the radio signal (either the CDMA signal or the OFDM signal) received by the antenna 4101 to the switch SW2.

The switch SW2 inputs a radio signal from the duplexer 4123 to any of the CDMA reception unit 4124A or the OFDM reception unit 4124B in accordance with the control by the control unit 4160. The switch SW2 inputs the radio signal from the duplexer 4123 to the CDMA reception unit 4124A when the used transmission scheme is the CDMA scheme, or inputs a radio signal from the duplexer 4123 to the OFDM reception unit 4124B when the used transmission scheme is the OFDM scheme.

The CDMA reception unit 4124A subjects the inputted radio signal (the CDMA signal) to conversion into the baseband and the amplification processing, and performs inverse diffusion in accordance with the CDMA scheme. Moreover, the CDMA reception unit 4124A performs the RAKE reception which is the processing for combining the preceding wave and the delayed waves included in the received CDMA signal. In the RAKE reception, the reception quality is improved by combining the preceding wave and the delayed waves while aligning the phases thereof. The reception data thus obtained are inputted to the demodulation unit 4125.

The OFDM reception unit 4124B subjects the inputted radio signal (the OFDM signal) to conversion into the baseband and the amplification processing, and performs multi-carrier demodulation in accordance with the OFDM scheme. Moreover, the OFDM reception unit 4124B removes the guard intervals included in the received OFDM signal. The reception data thus obtained are inputted to the demodulation unit 4125.

The demodulation unit 4125 demodulates and decodes the inputted reception data. The demodulation unit 4125 demodulates and decodes the reception data in accordance with a method corresponding to the certain modulation scheme selected from the multiple modulation schemes. Moreover, the demodulation unit 4125 subjects the inputted reception data to the symbol determination.

Figure 34:
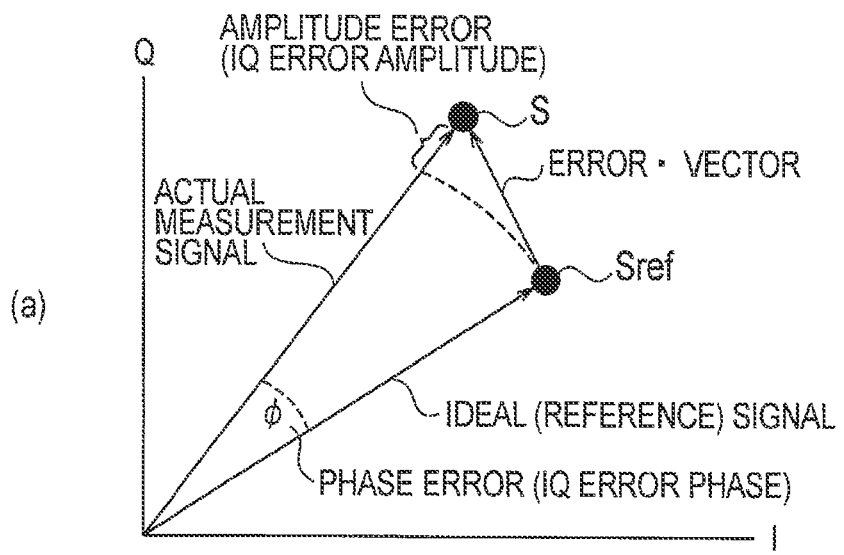
FIG. 34 is a view for explaining EVM and an EVM threshold according to the fifth embodiment.

The OFDM measurement unit 4141 measures reception parameters which indicate the time difference between the preceding wave and the delayed waves of the received OFDM signal. In the fifth embodiment, the reception parameters include an amplitude error and a phase error between the OFDM symbol S included in the received OFDM signal and the reference point Sref of the OFDM symbol as shown in FIG. 34(*a*). The values of the reception parameters (the amplitude error and the phase error) grow larger as the delay time difference Tdmax exceeds the guard interval Tg by a larger degree. The reception parameters measured by the OFDM measurement unit 4141 are inputted to the control unit 4160.

The CDMA measurement unit 4142 measures the reception quality of the CDMA signal. In the fifth embodiment, the received signal strength indicator (RSSI) is used as the reception quality of the CDMA signal. However, without limitation to the RSSI, it is also possible to use the received SNR (Signal to Noise ratio) and the like. The RSSI measured by the CDMA measurement unit 4142 is inputted to the control unit 4160.

The control unit 4160 is formed by use of a CPU, for example, and is configured to control various functions incorporated in the radio terminal 4100. The storage unit 4180 is formed by use of a memory, for example, and is configured to store a variety of information used for the control by the control unit 4160.

The control unit 4160 controls the switches SW1, 2. The control unit 4160 switches between the switches SW1, 2 when switching the used communication scheme between the OFDM scheme and the CDMA scheme. Moreover, the control unit 4160 may temporarily switches between the switches SW1, 2, when measuring the RSSI of the CDMA signal during the OFDM communication.

The control unit 4160 inputs the reception parameters measured by the OFDM measurement unit 4141 and the RSSI measured by the OFDM measurement unit 4141 to the modulation unit 4121. The OFDM transmission unit 4122B transmits the reception parameters and the RSSI after the modulation to the radio base station 4200. Such a report on the measurement results is called a "Measurement Report".

The control unit 4160 operates the OFDM measurement unit 4141 and the CDMA measurement unit 4142 in response to the instruction from the radio base station 4200, and executes the handover for switching from the radio base station 4200 to the radio base station 4300. Meanwhile, the control unit 4160 performs the control so as to switch the connection destination from the radio base station 4300 (the CDMA base station) to a radio base station 4400 (illustrated in FIG. 38) serving as the OFDM base station. Here, the radio base station 4200 means a first OFDM base station that causes an intersymbol interference. Meanwhile, the radio base station 4400 means a second OFDM station that does not cause an intersymbol interference.

(3) Configuration of Radio Base Station

Figure 33:
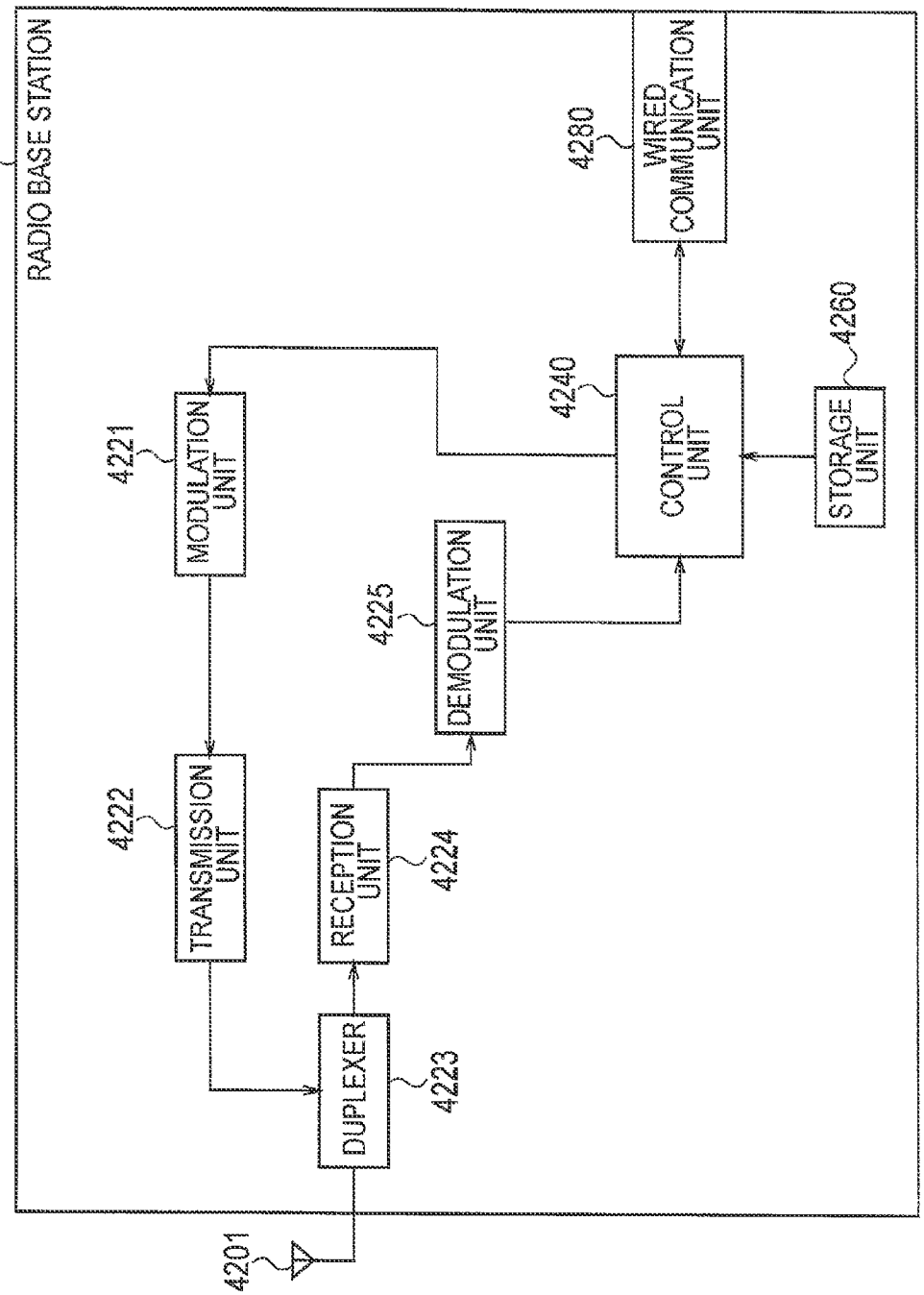
FIG. 33 is a block diagram showing a configuration of a radio base station according to the fifth embodiment.

FIG. 33 is a block diagram showing a configuration of the radio base station 4200.

As shown in FIG. 33, the radio base station 4200 includes an antenna 4201, a modulation unit 4221, a transmission unit 4222 (base-station transmission unit), a duplexer 4223, a reception unit 4224 (base-station reception unit), a demodulation unit 4225, a control unit 4240, a storage unit 4260, and a wired communication unit 4280.

The modulation unit 4221 modulates and encodes the transmission data from the control unit 4240. The modulation unit 4221 modulates and encodes the transmission data based on the certain modulation scheme selected from the multiple modulation schemes in accordance with the adaptive modulation.

The transmission unit 4222 subjects the inputted transmission data to multi-carrier modulation in accordance with the OFDM scheme and to conversion into a radio frequency band as well as to amplification processing, thereby generating an OFDM signal at the radio frequency band. The generated OFDM signal is transmitted via the duplexer 4223 and the antenna 4201.

The duplexer 4223 inputs the OFDM signal to the antenna 4201. Meanwhile, at the time of reception, the duplexer 4223 inputs the OFDM signal received by the antenna 4201 to the reception unit 4224.

The reception unit 4224 subjects the inputted OFDM signal to conversion into the baseband and the amplification processing, and performs multi-carrier demodulation in accordance with the OFDM scheme. Moreover, the reception unit 4224 removes the guard intervals included in the received OFDM signal. The reception data thus obtained are inputted to the demodulation unit 4225.

The demodulation unit 4225 demodulates and decodes the inputted reception data. The demodulation unit 4225 demodulates and decodes the reception data in accordance with a method corresponding to the certain modulation scheme selected from the multiple modulation schemes. Moreover, the demodulation unit 4225 subjects the inputted reception data to the symbol determination.

The control unit 4240 is formed by use of a CPU, for example, and is configured to control various functions incorporated in the radio base station 4200. The storage unit 4260 is formed by use of a memory, for example, and is configured to store a variety of information used for the control by the control unit 4240. The wired communication unit 4280 performs communication with the LTE network 4020 side.

The control unit 4240 transmits the measurement instruction for the RSSI of the CDMA signal to the radio terminal 4100 by using the transmission unit 4222. In the fifth embodiment, the transmission unit 4222 transmits the measurement instruction either periodically or upon occurrence of a predetermined trigger.

The storage unit 4260 stores a neighbor list in advance, which includes information on radio base stations (hereinafter nearby base stations) located near the radio base station 4200. In the fifth embodiment, the neighbor list includes IDs, used channel information, and the like of the radio base stations (such as the radio base station 4300) supporting the CDMA scheme. The control unit 4240 incorporates the neighbor list in the measurement instruction and transmits the information from the transmission unit 4222.

The control unit 4240 acquires the reception parameters and the RSSI transmitted from the radio terminal 4100 in response to the measurement instruction via the reception unit 4224 and the demodulation unit 4225. The control unit 4240 determines whether or not to cause the radio terminal 4100 to perform the handover based on the reception parameters and the RSSI.

Specifically, the control unit 4240 calculates the EVM (Error Vector Magnitude) by use of the reception parameters and compares the calculated EVM with the EVM threshold. The EVM threshold is determined based on the guard interval used in the OFDM scheme and is stored in advance in the storage unit 4260.

The EVM threshold is preset to the value of the EVM when the delay time difference Tdmax exceeds the guard interval length Tg. The value of the EVM at which the delay time difference Tdmax exceeds the guard interval length Tg can be obtained on an experimental or an empirical basis.

In the fifth embodiment, the EVM threshold is provided for each of the modulation schemes to be used in the adaptive modulation. As shown in FIG. 34(*a*), the EVM is also referred to as the modulation accuracy, which represents an effective value of an error vector based on the amount of deviation (reception parameter) for the phase and the amplitude of the observed symbol point S from the symbol reference point Sref where the symbol point is supposed to be located and is expressed as square root percentage of average power of an ideal signal. FIG. 34(*c*) shows a calculation formula for the EVM.

The storage unit 4260 stores a table which links the modulation schemes with the EVM thresholds as shown in FIG. 34(*b*). A modulation scheme which can achieve communication at a higher speed (a modulation scheme involving a larger bit number per symbol) has stricter restrictions on phase and amplitude errors. Accordingly, the EVM threshold is set to a lower value as the modulation scheme can achieve communication at a higher speed.

The control unit 4240 acquires the EVM threshold from the storage unit 4260 based on the modulation scheme used for the downlink and compares the EVM threshold with the calculated EVM.

Moreover, the control unit 4240 compares the RSSI of the CDMA signal with a predetermined value. When the RSSI is higher than the predetermined value, it is possible to assume that the reception quality is favorable. The predetermined value is preset to the value of the RSSI with which the radio terminal 4100 can execute the communication.

Regarding the control unit 4240, when the calculated EVM exceeds the EVM threshold and the RSSI is higher than the predetermined value, the control unit 4240 of the radio base station 4200 decides to cause the radio terminal 4100 to execute the handover to the radio base station (such as the radio base station 4300) supporting the CDMA scheme. When causing the radio terminal 4100 to carry out the handover, the control unit 4240 transmits an instruction for the handover to the radio terminal 4100 by use of the transmission unit 4222 after checking that the handover is feasible.

(4) Operations of Radio Communication System

Next, operations of the radio communication system 4010 will be described by using (4. 1) Operation Pattern 1 and (4. 2) Operation Pattern 2 as examples. In the fifth embodiment, the operations of the radio communication system 4010 are based on the 3GPPTS36.300 standards and the like. The operation pattern 1 is an operation pattern configured to cause the radio terminal 4100 to measure the RSSI of the CDMA signal periodically. The operation pattern 2 is an operation pattern configured to cause the radio terminal 4100 to measure the RSSI of the CDMA signal by using a certain event as a trigger.

(4. 1) Operation Pattern 1

Figure 35:
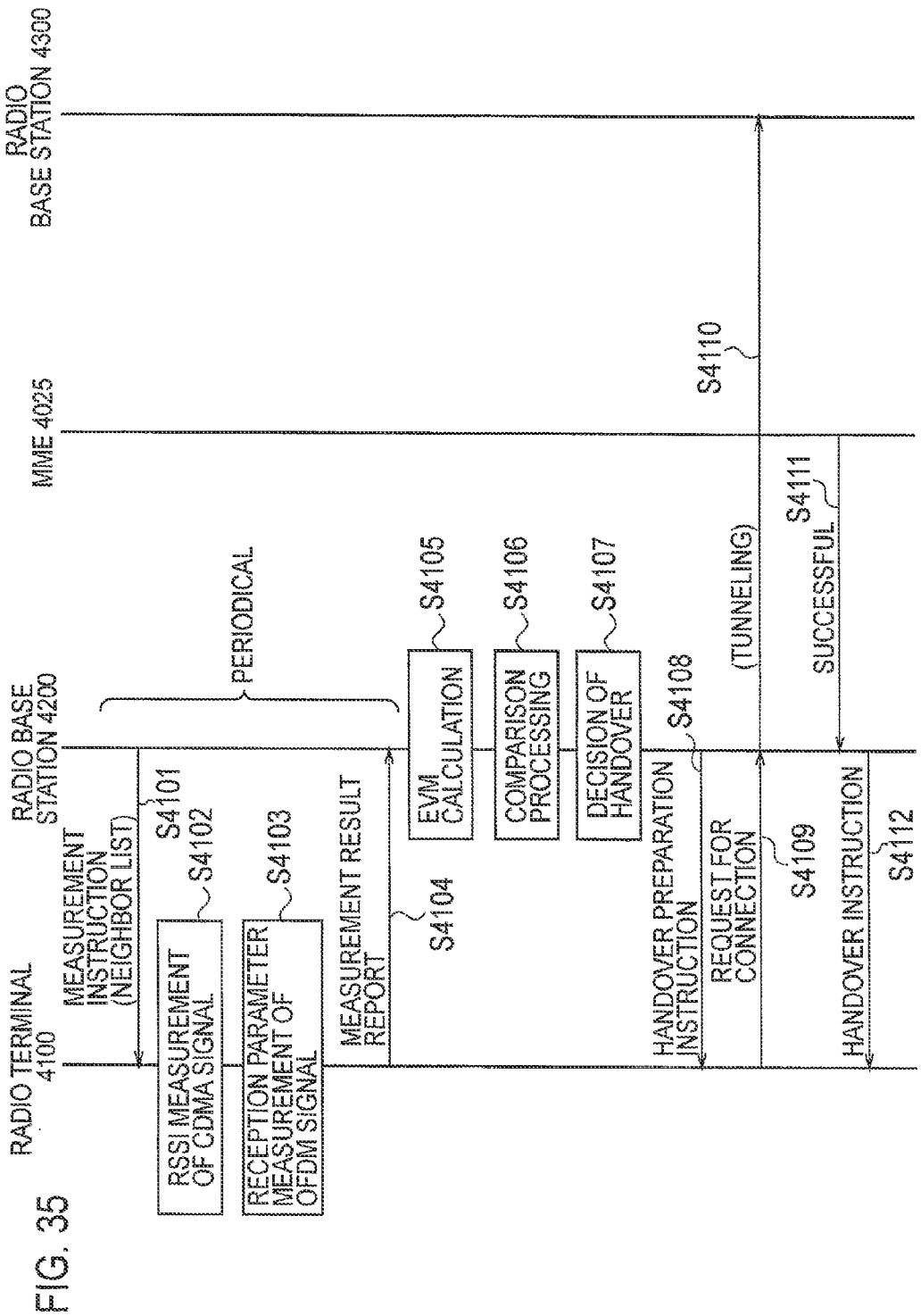
FIG. 35 is a sequence chart showing an operation pattern 1 of the radio communication system according to the fifth embodiment.

FIG. 35 is a sequence chart showing an operation pattern 1 of the radio communication system 4010. This sequence is executed when the radio terminal 4100 is in an active scheme.

In step S4101, the transmission unit 4222 of the radio base station 4200 transmits the measurement instruction to the radio terminal 4100. The above-described neighbor list is included in the measurement instruction. The OFDM reception unit 4124B of the radio terminal 4100 receives the measurement instruction.

In step S4102, the control unit 4160 of the radio terminal 4100 causes the CDMA measurement unit 4142 to measure the RSSI of the CDMA signal for each of the CDMA-supporting base stations corresponding to the IDs included in the neighbor list.

In step S4103, the control unit 4160 of the radio terminal 4100 causes the OFDM measurement unit 4141 to measure the reception parameters of the OFDM signal received from the radio base station 4200.

In step S4104, the OFDM transmission unit 4122B of the radio terminal 4100 transmits a measurement result report including the reception parameters measured by the OFDM measurement unit 4141 and the RSSI measured by the CDMA measurement unit 4142 to the radio base station 4200. The reception unit 4224 of the radio base station 4200 receives the measurement result report (the reception parameters and the RSSI).

In step S4105, the control unit 4240 of the radio base station 4200 calculates the EVM by use of the reception parameters which are received by the reception unit 4224 and demodulated by the demodulation unit 4225.

In step S4106, the control unit 4240 of the radio base station 4200 compares the calculated EVM with the EVM threshold corresponding to the modulation scheme. Meanwhile, the control unit 4240 of the radio base station 4200 compares the RSSI, which is received by the reception unit 4224 and demodulated by the demodulation unit 4225, with the predetermined value.

When the calculated EVM exceeds the EVM threshold and the RSSI is higher than the predetermined value, the control unit 4240 of the radio base station 4200 decides to cause the radio terminal 4100 to execute the handover to the CDMA-supporting radio base station (step S4107). On the other hand, when the calculated EVM falls below the EVM threshold or when the RSSI is equal to or below the predetermined value, the control unit 4240 of the radio base station 4200 decides not to cause the radio terminal 4100 to execute the handover to the CDMA-supporting radio base station.

Here, when there are multiple CDMA-supporting radio base stations having the RSSI higher than the predetermined value in the case where the calculated EVM exceeds the EVM threshold, it is preferable that the control unit 4240 of the radio base station 4200 determine the CDMA-supporting radio base station having the highest RSSI as a handover destination. In the following, a case of causing the radio terminal 4100 to execute the handover to the radio base station 4300 will be described.

In step S4108, the transmission unit 4222 of the radio base station 4200 transmits a handover preparation instruction to the radio terminal 4100. The OFDM reception unit 4124B of the radio terminal 4100 receives the handover preparation instruction.

In step S4109, the OFDM transmission unit 4122B of the radio terminal 4100 transmits a request for connection to the radio base station 4300 to the radio base station 4200. This request for connection is forwarded to the radio base station 4300 by tunneling under the supervision of the MME 4025 (step S4110). When the request for connection is successful, the MME 4025 notifies the radio base station 4200 of the fact (step S4111).

In step S4112, the radio base station 4200 transmits an instruction for the handover to the radio base station 4300 to the radio terminal 4100 in response to the notification from the MME 4025. Upon receipt of the instruction for the handover to the radio base station 4300, the radio terminal 4100 executes the handover to the radio base station 4300.

(4. 2) Operation Pattern 2

Figure 36:
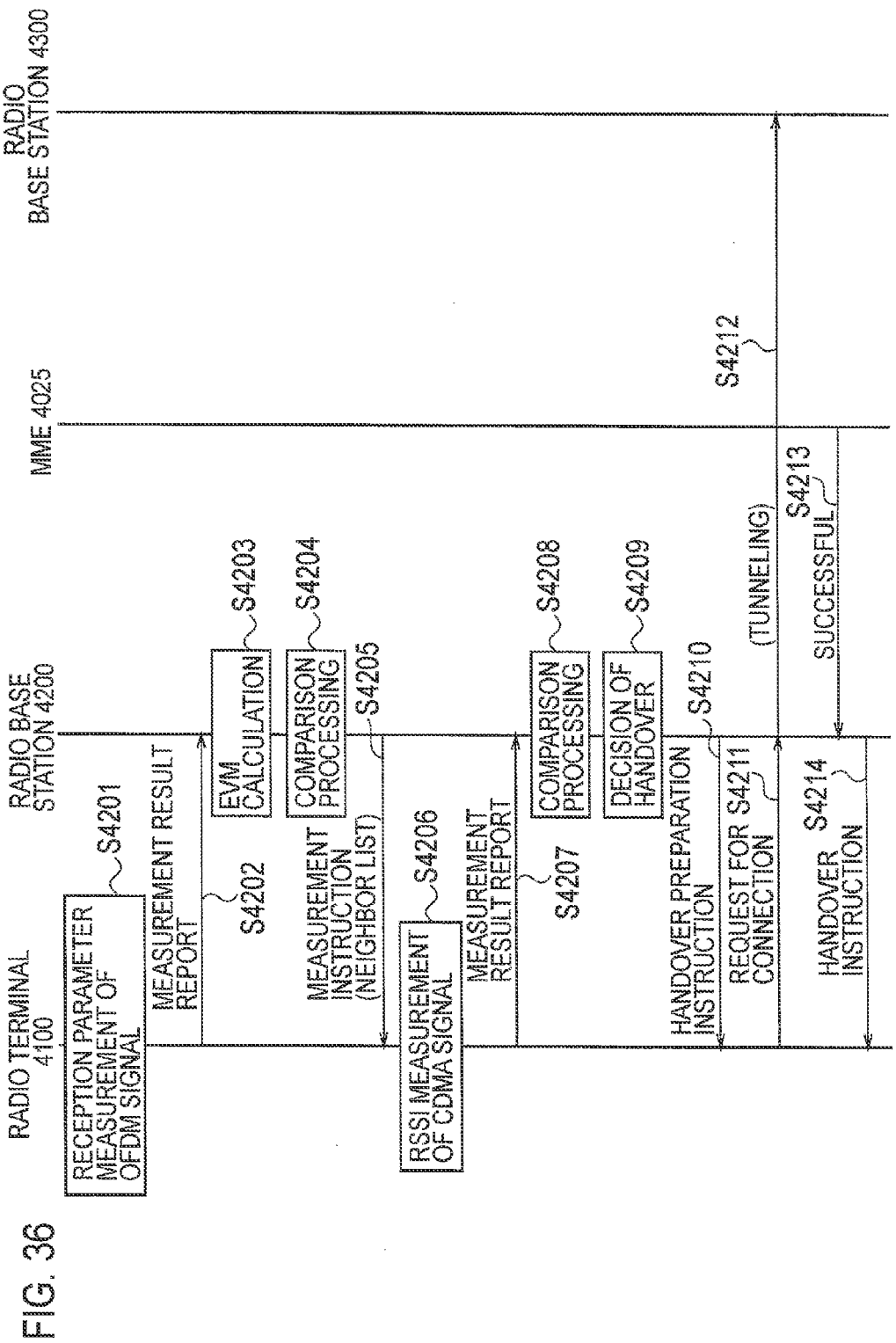
FIG. 36 is a sequence chart showing an operation pattern 2 of the radio communication system according to the fifth embodiment.

FIG. 36 is a sequence chart showing an operation pattern 2 of the radio communication system 4010. This sequence is executed when the radio terminal 4100 is in an active scheme.

In step S4201, the control unit 4160 of the radio terminal 4100 causes the OFDM measurement unit 4141 to measure the reception parameters of the OFDM signal received from the radio base station 4200.

In step S4202, the OFDM transmission unit 4122B of the radio terminal 4100 transmits the reception parameters measured by the OFDM measurement unit 4141 to the radio base station 4200. The reception unit 4224 of the radio base station 4200 receives the reception parameters.

In step S4203, the control unit 4240 of the radio base station 4200 calculates the EVM by use of the reception parameters which are received by the reception unit 4224 and demodulated by the demodulation unit 4225.

In step S4204, the control unit 4240 of the radio base station 4200 compares the calculated EVM with the EVM threshold corresponding to the modulation scheme.

When the calculated EVM exceeds the EVM threshold, the transmission unit 4222 of the radio base station 4200 transmits a RSSI measurement instruction to the radio terminal 4100 in step S4205. The above-described neighbor list is included in the measurement instruction. The OFDM reception unit 4124B of the radio terminal 4100 receives the measurement instruction.

In step S4206, the control unit 4160 of the radio terminal 4100 causes the CDMA measurement unit 4142 to measure the RSSI of the CDMA signal for each of the CDMA-supporting base stations corresponding to the IDs included in the neighbor list.

In step S4207, the OFDM transmission unit 4122B of the radio terminal 4100 transmits the measurement result report including the RSSI measured by the CDMA measurement unit 4142 to the radio base station 4200. The reception unit 4224 of the radio base station 4200 receives the measurement result report (the RSSI).

In step S4208, the control unit 4240 of the radio base station 4200 compares the RSSI, which is received by the reception unit 4224 and demodulated by the demodulation unit 4225, with the predetermined value.

When the RSSI is higher than the predetermined value, the control unit 4240 of the radio base station 4200 decides to cause the radio terminal 4100 to execute the handover to the CDMA-supporting radio base station (step S4209). On the other hand, when the RSSI is equal to or below the predetermined value, the control unit 4240 of the radio base station 4200 decides not to cause the radio terminal 4100 to execute the handover to the CDMA-supporting radio base station. Here, when there are multiple CDMA-supporting radio base stations having the RSSI higher than the predetermined value, it is preferable that the control unit 4240 of the radio base station 4200 determine the CDMA-supporting radio base station having the highest RSSI as the handover destination.

Each processing in steps S4210 to S4214 is executed as similar to the operation pattern 1.

(4. 3) Operation Pattern 3

Figure 38:
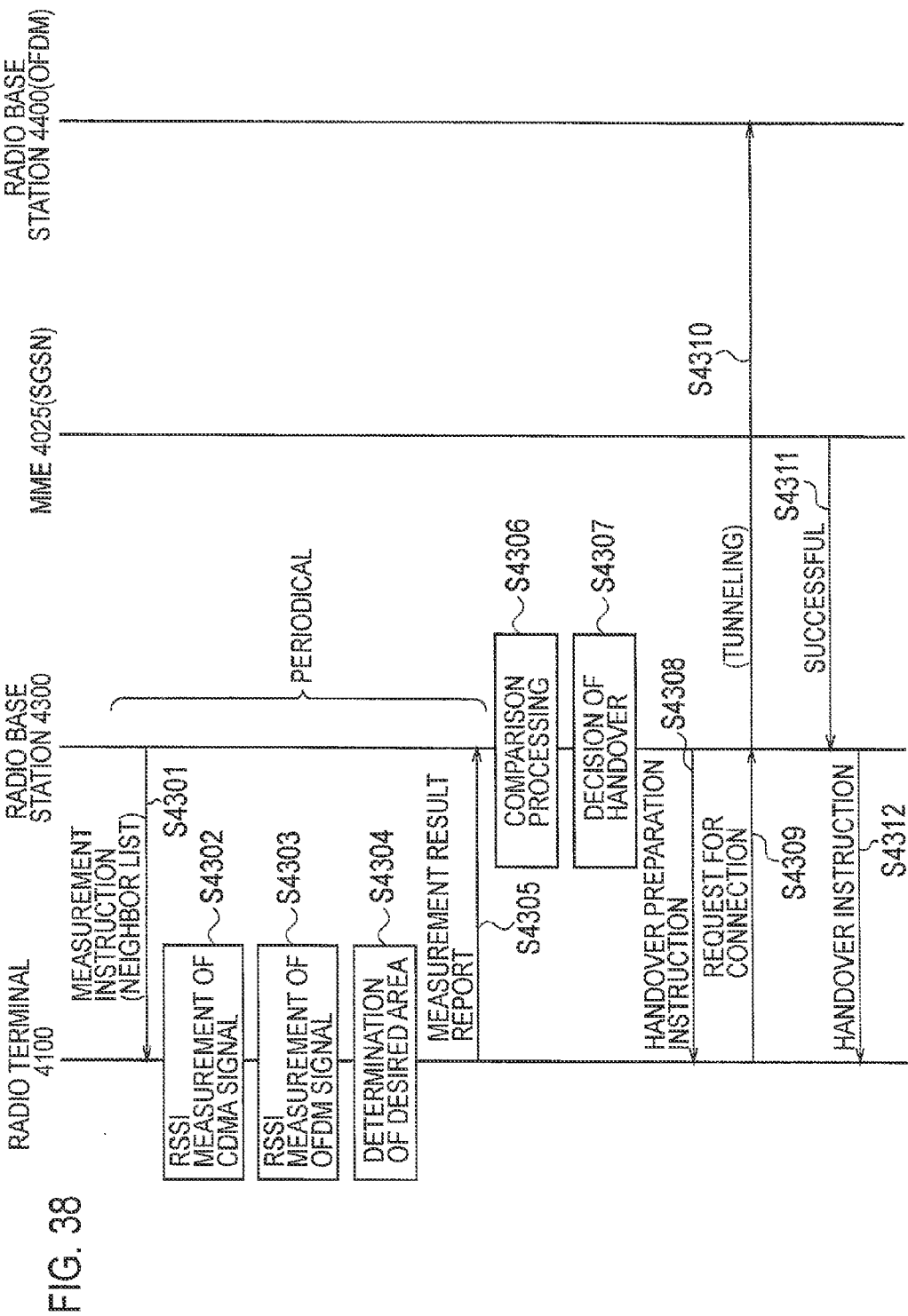
FIG. 38 is a sequence chart showing an operation pattern 3 of the radio communication system according to the fifth embodiment.

In this pattern, when the control unit 4160 of the radio terminal 4100 temporarily switches from connection to the radio base station 4200 (the OFDM radio base station) to connection to the radio base station 4300 (the CDMA radio base station) in light of a data transmission capacity and then determines that the radio terminal 4100 moves to an area (a desired area) predicted to achieve a higher data transmission capacity by communication through the base station in the OFDM scheme than communication through the CDMA radio base station, the control unit 4160 controls so as to switch to connection to the radio base station 4400 (the OFDM radio base station in FIG. 38).

FIG. 38 is a sequence chart showing an operation pattern 3 of the radio communication system 4010. This sequence is executed when the radio terminal 4100 is in an active scheme.

In step S4301, the radio base station 4300 transmits the measurement instruction to the radio terminal 4100. The above-described neighbor list is included in the measurement instruction. The CDMA reception unit 4124B of the radio terminal 4100 receives the measurement instruction.

In step S4302, the control unit 4160 of the radio terminal 4100 causes the CDMA measurement unit 4142 to measure the RSSI of the CDMA signal for each of the CDMA-supporting base stations corresponding to the IDs included in the neighbor list.

In step S4303, the control unit 4160 of the radio terminal 4100 causes the OFDM measurement unit 4141 to measure the RSSI of the OFDM signal received from the radio base station 4200.

In step S4304, the control unit 4160 determines that the radio terminal 4100 has moved, when a reception intensity (the RSSI of the radio base station 4300 among the RSSI of the CDMA signal measured by the CDMA measurement unit 4142) at the present moment becomes smaller than a reception intensity at the time of switching to connection to the radio base station 4300 (the CDMA radio base station). Based on the fact that the reception intensity at the present moment becomes smaller, the radio terminal 4100 presumably moves away from the radio base station 4300, and is expected to have moved to an area where the radio terminal 4100 can achieve the higher data transmission capacity by performing communication through the base station in the OFDM scheme than by performing communication through the CDMA radio base station.

In step S4305, the control unit 4160 transmits the measurement result report including the RSSI of the OFDM signal measured by the OFDM measurement unit 4141 and the RSSI of the CDMA signal measured by the CDMA measurement unit 4142 to the radio base station 4300. Here, when the control unit 4160 determines that the radio terminal 4100 has moved, the fact of the movement of the radio terminal 4100 is set to the measurement result report by the control unit 4160.

In step S4306, the radio base station 4300 receives this measurement result report and compares the RSSI of the OFDM signal with the RSSI of the CDMA signal.

In step S4307, the radio base station 4300 decides to cause the radio terminal 4100 to execute the handover to the OFDM-supporting radio base station 4400 when the highest RSSI of the OFDM signal is greater than the highest RSSI of the CDMA signal and when the fact of the movement of the radio terminal 4100 is set to the measurement result report.

In step S4308, the radio base station 4300 transmits the handover preparation instruction to the radio terminal 4100. The CDMA reception unit 4124A of the radio terminal 4100 receives the handover preparation instruction.

In step S4309, the CDMA reception unit 4124A of the radio terminal 4100 transmits the request for connection to the radio base station 4400 to the radio base station 4300. This request for connection is forwarded to the radio base station 4400 by tunneling via the SGSN/MME 4025 (step S4310). When the request for connection is successful, the SGSN/MME 4025 notifies the radio base station 4300 of the fact (step S4311).

In step S4312, the radio base station 4300 transmits the instruction for the handover to the radio base station 4400 to the radio terminal 4100 in response to the notification from the MME 4025. Upon receipt of the instruction for the handover to the radio base station 4400, the radio terminal 4100 executes the handover to the radio base station 4400.

In the operation pattern 3, the control unit 4160 of the radio terminal 4100 is configured to determine that the radio terminal 4100 has moved when the reception intensity at the present moment becomes smaller than the reception intensity at the time of switching to connection to the radio base station 4300 (the CDMA radio base station). Instead, the control unit 4160 may be configured to acquire the current communication area from the radio base station 4300 (the CDMA radio base station) and to determine that the radio terminal 4100 has moved if identification information of the communication area at the time of switching to the radio base station 4300 does not coincide with identification information of the acquired current communication area. Here, the identification information of the communication area may be designed to identify a location registration area. If a GPS is loaded on the radio terminal 4100, the identification information of the communication area may be locational information on the own radio terminal acquired by the GPS.

Meanwhile, although the operation pattern 3 is described as the embodiment configured to execute the handover to the radio base station 4400, there is also a possibility to execute the handover again to the radio base station 4200 depending on the magnitude of the signal intensity of the OFDM signal and the like.

In the operation pattern 3, after switching from the OFDM scheme to the CDMA scheme due to the intersymbol interference, the radio terminal 4100 determines that the radio terminal 4100 has moved. This determination prevents the radio terminal 4100 from communicating in the OFDM scheme in the same location as the location at the time point of switching to the CDMA scheme. Accordingly, even when the CDMA scheme is switched to the OFDM scheme again, deterioration in the communication performance due to the intersymbol interference is avoided.

(5) Effect of Fifth Embodiment

According to the fifth embodiment, the control unit 4240 of the radio base station 4200 decides to cause the radio terminal 4100 to execute the handover to the radio base station 4300 when the EVM exceeds the EVM threshold and the RSSI is higher than the predetermined value. Here, the EVM reflects the delay time difference Tdmax between the preceding wave and the delayed waves of the OFDM signal and the EVM threshold is set to the value of the EVM when the delay time difference Tdmax exceeds the guard interval length Tg. The state of the EVM exceeding the EVM threshold means that the delay time difference Tdmax exceeds the guard interval length Tg.

Accordingly, under the situation where the delay time difference Tdmax is estimated to exceed the guard interval length Tg, it is possible to avoid an intersymbol interference and to avoid deterioration in the communication performance by causing the radio terminal 4100 to execute the handover to the radio base station 4300 supporting the CDMA scheme after checking that a reception level of the CDMA signal is favorable. Moreover, it is possible to utilize the excellent communication performance of the OFDM scheme until the delay time difference Tdmax is estimated to exceed the guard interval length Tg.

Therefore, the radio terminal 4100 supporting both of the CDMA scheme and the OFDM scheme can avoid deterioration in the communication performance due to the intersymbol interference while utilizing the OFDM scheme in the active scheme.

Furthermore, the CDMA reception unit 4124A of the radio terminal 4100 can perform the RAKE reception in which the preceding wave and the delayed waves in the CDMA signal are combined. Accordingly, it is possible to achieve high resistance to the multi-path environment and to obtain a path diversity effect by the RAKE reception. Therefore, it is possible to utilize the characteristic of the CDMA scheme and to effectively suppress deterioration in the communication performance by switching the used communication scheme from the OFDM scheme to the CDMA scheme.

Meanwhile, the EVM (and reception parameter) has the advantageous features that it can be measured with a smaller amount of operation and that a shorter time is required for the measurement as compared to other reception quality indices including the SNR (Signal to Noise ratio), the BER (Bit Error Rate), the channel estimation value, and the like. For this reason, by using the EVM, it is possible to estimate whether or not the delay time difference Tdmax exceeds the guard interval length Tg easily and instantaneously. Therefore, it is possible to reduce a processing load and power consumption of the radio terminal 4100 as compared to the case of using other reception quality indices, and to shorten a period of deterioration in the communication performance due to the intersymbol interference.

In the fifth embodiment, the control unit 4240 sets the EVM threshold corresponding to the modulation scheme used for the downlink radio communication. Accordingly, it is possible to set the EVM threshold value appropriately even when using the adaptive modulation.

In the case of the radio base station and the radio terminal constituting the radio communication system of the fifth embodiment, the radio terminal determines that the radio terminal has moved after switching from the OFDM scheme to the CDMA scheme due to the intersymbol interference, and does not communicate in the OFDM scheme in the same location as the location at the time point of switching to the CDMA scheme. Accordingly, deterioration in the communication performance due to the intersymbol interference is avoided even when the CDMA scheme is switched to the OFDM scheme again.

(6) Modified Examples of Fifth Embodiment

Figure 37:
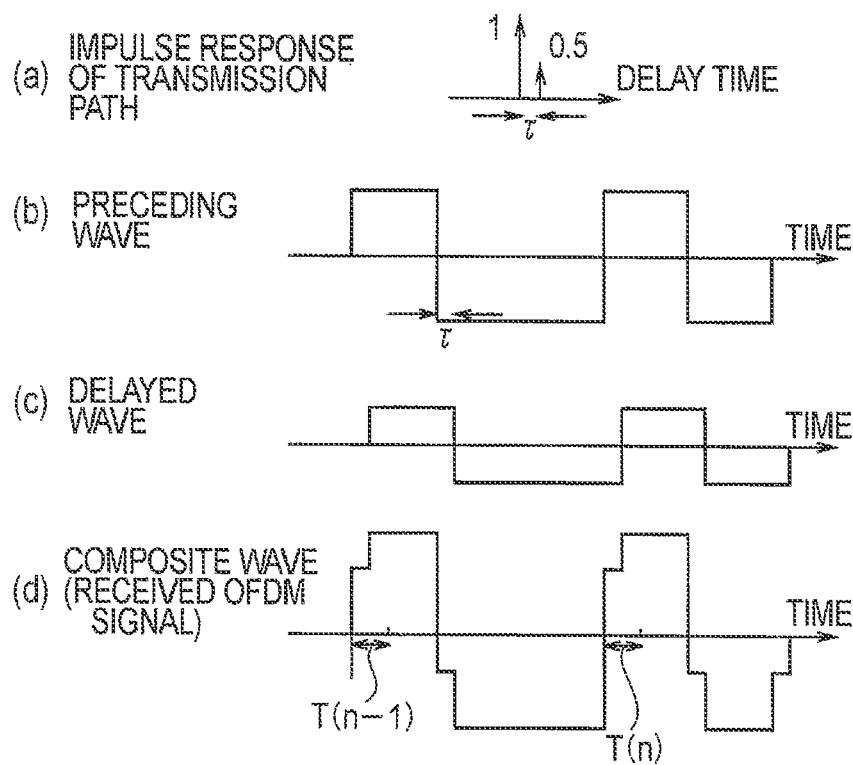
FIG. 37 is a view for explaining waveform measurement processing according to a modified example of the fifth embodiment.

It is also possible to measure the reception parameters of the OFDM signal only when the state of the voltage waveform of the received OFDM signal satisfies a certain condition. FIG. 37 shows waveform measurement processing by the OFDM measurement unit 4141. In the example of FIG. 37, the delay time difference is equal to T as shown in FIG. 37(*a*), and the preceding wave shown in FIG. 37(*b*) is combined with the delayed wave shown in FIG. 37(*c*), and the OFDM signal shown in FIG. 37(*d*) is received. The OFDM measurement unit 4141 specifies the guard interval period of the preceding wave based on a result of symbol synchronization, for example, and measures the state of the voltage waveform (a voltage value) of the OFDM signal at measurement timing corresponding to the guard interval period. The measurement is performed at each measurement timing corresponding to each of the guard interval periods. The OFDM measurement unit 4141 determines whether or not the state of the voltage waveform measured at the current measurement timing T(n) is equal to the state of the voltage waveform measured at the measurement timing precedent to the current measurement timing (hereinafter referred to as the "precedent measurement timing") T(n−1). The OFDM measurement unit 4141 omits the measurement of the reception parameters when the state of the voltage waveform measured at the current measurement timing T(n) is equal to the state of the voltage waveform measured at the precedent measurement timing T(n−1), or executes the measurement of the reception parameters when the state of the voltage waveform measured at the current measurement timing T(n) is different from the state of the voltage waveform measured at the precedent measurement timing T(n−1). In the case of performing the determination only by use of the EVM, there is a risk of erroneous determination if the EVM varies due to a factor (such as a circuit factor) other than a change in the multipath state. Accordingly, it is possible to improve determination accuracy by measuring the EVM only when the state of the voltage waveform measured at the current measurement timing T(n) is different from the state of the voltage waveform measured at the precedent measurement timing T(n−1).

The fifth embodiment has described the example of individually providing the CDMA communication unit (the CDMA transmission unit 4122A and the CDMA reception unit 4124A) and the OFDM communication unit (the OFDM transmission unit 4122B and the OFDM reception unit 4124B). However, it is also possible to use an aspect of forming the CDMA communication unit and the OFDM communication unit collectively as one communication unit. For example, in a radio terminal called a cognitive terminal, it is possible to switch the communication scheme by way of software by downloading software (SDR BB, Tunable RF) corresponding to the used communication scheme.

In the fifth embodiment, the reception parameters to be measured by the radio terminal 4100 include the amplitude error and the phase error and the EVM is calculated by the radio base station 4200. However, the radio terminal 4100 may calculate the EVM by use of the amplitude error and the phase error and transmit the EVM as the reception parameter to the radio base station 4200. In this case, the "value corresponding to the reception parameter" is the value of the EVM. Alternatively, without limitation to the case of using the EVM, it is also possible to use another reception quality index (such as the SNR, the BER or the channel estimation value).

In the fifth embodiment, the cellular phone terminal is shown as the example of the radio terminal 4100. However, without limitation to the cellular phone terminal, it is possible to use a terminal equipped with communication devices according to the CDMA scheme and the OFDM scheme, for example.

Although the fifth embodiment has described the example in which the guard interval length is a fixed length, the guard interval length may also be a variable length. For example, in the case of selectively using two types of guard intervals, namely, a short guard interval and a long guard interval longer than the short guard interval, it is preferable to measure the reception parameters (or the EVM) at the time of the long guard interval from the viewpoint of ensuring the measurement time.

In the fifth embodiment, the LTE has been described as the example of the radio communication system employing the OFDM scheme. However, without limitation to the LTE, it is also possible to use WiMAX standardized by IEEE 802.16, a next-generation PHS (XGP), and the like.

Note that the entire content of Japanese Patent Application No. 2009-77744 (filed on Mar. 26, 2009), Japanese Patent Application No. 2009-127064 (filed on May 26, 2009), Japanese Patent Application No. 2009-127068 (filed on May 26, 2009), and Japanese Patent Application No. 2009-269471 (filed on Nov. 27, 2009) is incorporated herein by reference.

INDUSTRIAL APPLICABILITY

As described above, a radio terminal, a radio communication system, and a radio base station according to the present invention can prevent deterioration in a communication performance due to an intersymbol interference, and are therefore useful for radio communication such as mobile telecommunication.

The invention claimed is:

1. A radio terminal comprising:
a transceiver that performs radio communication by selecting any of a Code Division Multiple Access (CDMA) scheme and an Orthogonal Frequency Division Multiplexing (OFDM) scheme as a used communication scheme to be used in a cell formed by a radio base station; and
a processor that controls measuring reception quality of a reception signal of the OFDM scheme and measuring reception quality of a reception signal of the CDMA scheme;
wherein, while the OFDM scheme is selected as the used communication scheme, the processor controls measuring the reception quality of the reception signal of the CDMA scheme only when both the user terminal is in an idle state and the reception quality measured in the OFDM scheme is less than a first threshold used in the OFDM scheme, and
wherein, when both the user terminal is in the idle state and a reception quality measured in the CDMA scheme is greater than a second threshold, the processor controls reselecting a cell formed by a radio base station supporting the CDMA scheme, and controls the transceiver to cause the transceiver to switch the used communication scheme from the OFDM scheme to the CDMA scheme.

2. The radio terminal according to claim 1, wherein when adaptive modulation is used for the radio communication, the processor sets the first threshold based on a modulation scheme used for the radio communication.

3. A radio terminal comprising:
a transceiver that performs radio communication by selecting any of a Code Division Multiple Access (CDMA) scheme and an Orthogonal Frequency Division Multiplexing (OFDM) scheme as a used communication scheme to be used in a cell formed by a radio base station;
one or more processors;
memory; and
one or more modules stored in the memory and configured for execution by the one or more processors, the one or more modules including instructions to
measure reception quality of a reception signal of the OFDM scheme,
while the OFDM scheme is selected as the used communication scheme, measure reception quality of a reception signal of the CDMA scheme only when both the OFDM scheme is in an idle state and the reception quality measured in the OFDM scheme is less than a first threshold used in the OFDM scheme, and,
when both the OFDM scheme is in the idle state and a reception quality measured in the CDMA scheme is greater than a second threshold, control reselecting a cell formed by a radio base station supporting the CDMA scheme, and control the transceiver to cause the transceiver to switch the used communication scheme from the OFDM scheme to the CDMA scheme.

4. A communication control method used in a radio terminal, the method comprising:
performing, by the radio terminal, radio communication by selecting any of a Code Division Multiple Access (CDMA) scheme and an Orthogonal Frequency Division Multiplexing (OFDM) scheme as a used communication scheme to be used in a cell formed by a radio base station;
measuring, by the radio terminal, reception quality of a reception signal of the OFDM scheme;
while the OFDM scheme is selected as the used communication scheme, measuring, by the radio terminal, reception quality of a reception signal of the CDMA scheme only when both the OFDM scheme is in an idle state and the reception quality obtained by the radio terminal in the OFDM scheme is less than a first threshold used in the OFDM scheme; and,
when both the OFDM scheme is in the idle state and a reception quality measured in the CDMA scheme is greater than a second threshold, reselecting a cell formed by a radio base station supporting the CDMA scheme, and switching the used communication scheme from the OFDM scheme to the CDMA scheme.

* * * * *